United States Patent
Kondo

(10) Patent No.: US 6,381,369 B1
(45) Date of Patent: *Apr. 30, 2002

(54) IMAGE CODING APPARATUS, IMAGE CODING METHOD, IMAGE DECODING METHOD, IMAGE DECODING APPARATUS, IMAGE DATA TRANSMITTING METHOD AND RECORDING MEDIUM

(75) Inventor: Tetsujiro Kondo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,216

(22) Filed: Jul. 15, 1997

(51) Int. Cl.$^7$ .......................... G06K 9/36; H04N 1/415; H04N 7/12; H04B 1/66

(52) U.S. Cl. ....................... 382/238; 382/232; 382/233; 382/236; 382/239; 382/244; 382/251; 358/261.2; 358/426; 358/430; 348/387.1; 348/394.1; 348/404.1; 375/240; 375/240.02; 375/240.03; 375/240.12

(58) Field of Search ................................. 382/238, 239, 382/240, 232, 233–236, 242, 244–248, 251; 348/394, 404, 409–419, 384.1, 387.1, 394.1, 395.1, 404.1; 358/261.2, 430, 426; 375/240, 240.02, 240.03, 240.12, 240.21, 240.01

(56) References Cited

U.S. PATENT DOCUMENTS

| | | | |
|---|---|---|---|
| 4,307,420 A | * 12/1981 | Ninomiya et al. | ..... 375/240.14 |
| 4,562,468 A | * 12/1985 | Koga | ..... 375/240.14 |
| 4,703,352 A | 10/1987 | Kondo | ..... 358/135 |
| 5,122,873 A | 6/1992 | Golin | ..... 358/133 |

(List continued on next page.)

FOREIGN PATENT DOCUMENTS

| | | | |
|---|---|---|---|
| EP | 0293041 A1 | 11/1988 | ..... H04N/7/13 |
| EP | 0 546 845 A2 | 6/1993 | ..... H04N/7/01 |
| EP | 0 635 978 A1 | 1/1995 | ..... H04N/7/01 |
| EP | 0635978 A1 | 1/1995 | ..... H04N/7/01 |
| JP | 3-53778 | 3/1991 | ..... H04N/7/13 |
| JP | 8-88856 | 4/1994 | ..... H04N/7/32 |
| WO | WO 91/20159 | 12/1991 | ..... H04N/7/13 |
| WO | WO 92/07445 | 4/1992 | ..... H04N/7/13 |
| WO | WO 93/13624 | 7/1993 | ..... H04N/7/13 |

OTHER PUBLICATIONS

Chang, et al "Adaptive Subsampling JPEG Image Coding", IEEE, pp. 264–265, 1995.*

(List continued on next page.)

*Primary Examiner*—Leo Boudreau
*Assistant Examiner*—Daniel G. Mariam
(74) *Attorney, Agent, or Firm*—Bell, Boyd & Lloyd LLC

(57) ABSTRACT

In order to produce a decoded image substantially identical to an original image by processing a small amount of data, utilizing a thinning circuit (subsampler) a level of compression data obtained by extracting 9 pixels of an original image by 1 pixel is limited by a level limiting circuit by extracting 2 bits thereof from an MSB. In a local decoder, the original image is predicted based on correction data to output a predicted values thereof. Then, in an error calculator, a prediction error of the predicted values with respect to the original image is calculated. The compression data is corrected by a correcting circuit in such a manner that this prediction error becomes small.

137 Claims, 35 Drawing Sheets

U.S. PATENT DOCUMENTS

| | | | | |
|---|---|---|---|---|
| 5,150,379 A | * | 9/1992 | Baugh et al. | 375/232 |
| 5,193,003 A | | 3/1993 | Kondo | 358/136 |
| 5,200,962 A | * | 4/1993 | Kao et al. | 714/774 |
| 5,289,549 A | * | 2/1994 | Rattey et al. | 382/238 |
| 5,293,230 A | | 3/1994 | Golin | 348/410 |
| 5,331,414 A | | 7/1994 | Golin | 348/390 |
| 5,349,385 A | | 9/1994 | Glenn | 348/458 |
| 5,384,869 A | | 1/1995 | Wilkinson et al. | 382/56 |
| 5,469,216 A | | 11/1995 | Takahashi et al. | 348/441 |
| 5,488,618 A | | 1/1996 | Kondo et al. | 714/819 |
| 5,495,297 A | | 2/1996 | Fujimori et al. | 348/590 |
| 5,504,535 A | | 4/1996 | Abe | 348/565 |
| 5,517,245 A | | 5/1996 | Kondo et al. | 348/392 |
| 5,528,606 A | | 6/1996 | Kondo et al. | 714/755 |
| 5,553,160 A | * | 9/1996 | Dawson | 382/239 |
| 5,565,921 A | * | 10/1996 | Sasaki et al. | 375/240.13 |
| 5,598,214 A | | 1/1997 | Kondo et al. | 348/414 |
| 5,610,658 A | | 3/1997 | Uchida et al. | 348/416 |
| 5,625,712 A | * | 4/1997 | Schoenzeit et al. | 382/239 |
| 5,663,764 A | | 9/1997 | Kondo et al. | 348/414 |
| 5,666,164 A | | 9/1997 | Kondo et al. | 348/441 |
| 5,680,225 A | | 10/1997 | HIrabayashi et al. | 358/451 |
| 5,687,257 A | * | 11/1997 | Paik et al. | 382/239 |
| 5,731,842 A | * | 3/1998 | Suzuki | 375/240.12 |
| 5,734,433 A | | 3/1998 | Kondo et al. | 348/241 |
| 5,739,873 A | | 4/1998 | Kondo | 348/720 |
| 5,754,702 A | | 5/1998 | Simpson | 382/240 |
| 5,796,442 A | | 8/1998 | Gove et al. | 348/556 |
| 5,812,699 A | * | 9/1998 | Zhu et al. | 348/419 |
| 5,825,313 A | | 10/1998 | Kondo et al. | 341/67 |
| 5,867,593 A | | 2/1999 | Fukuda et al. | 382/176 |
| 5,870,434 A | | 2/1999 | Kondo et al. | 375/242 |
| 5,880,784 A | * | 3/1999 | Lillevold | 382/239 |
| 5,912,708 A | | 6/1999 | Kondo et al. | 348/415 |
| 5,930,394 A | | 6/1999 | Kondo et al. | 382/232 |
| 5,960,116 A | * | 9/1999 | Kajiwara | 382/239 |
| 5,966,179 A | | 10/1999 | Kondo et al. | 348/408 |
| 8,969,764 | * | 10/1999 | Sun et al. | 348/419 |
| 6,016,164 A | | 1/2000 | Kawaguchi et al. | 348/424 |

OTHER PUBLICATIONS

Patent Abstracts of Japan, vol. 017, No. 331 (E–1386), Jun. 23, 1993 & JP 05 037916 A (Mitsubishi Electric Corp), Feb. 12, 1993 *Abstract*.

Patent Abstracts of Japan, vol. 1995, No. 09, Oct. 31, 1995 & JP 07 147681 A (Sony Corp), Jun. 6, 1995.

U.S. application No. 09/213,460, filed Dec. 17, 1998.

Patent Abstracts of Japan, JP 7–147681, Published Jun. 6, 1995, Sony Corporation.

U.S. application No. 08/893,134, filed Jul. 15, 1997.

U.S. application No. 08/892,570, filed Jul. 15, 1997.

U.S. application No. 08/893,022, filed Jul. 15, 1997.

U.S. application No. 08/893,202, filed Jul. 15, 1997.

* cited by examiner block for class classification

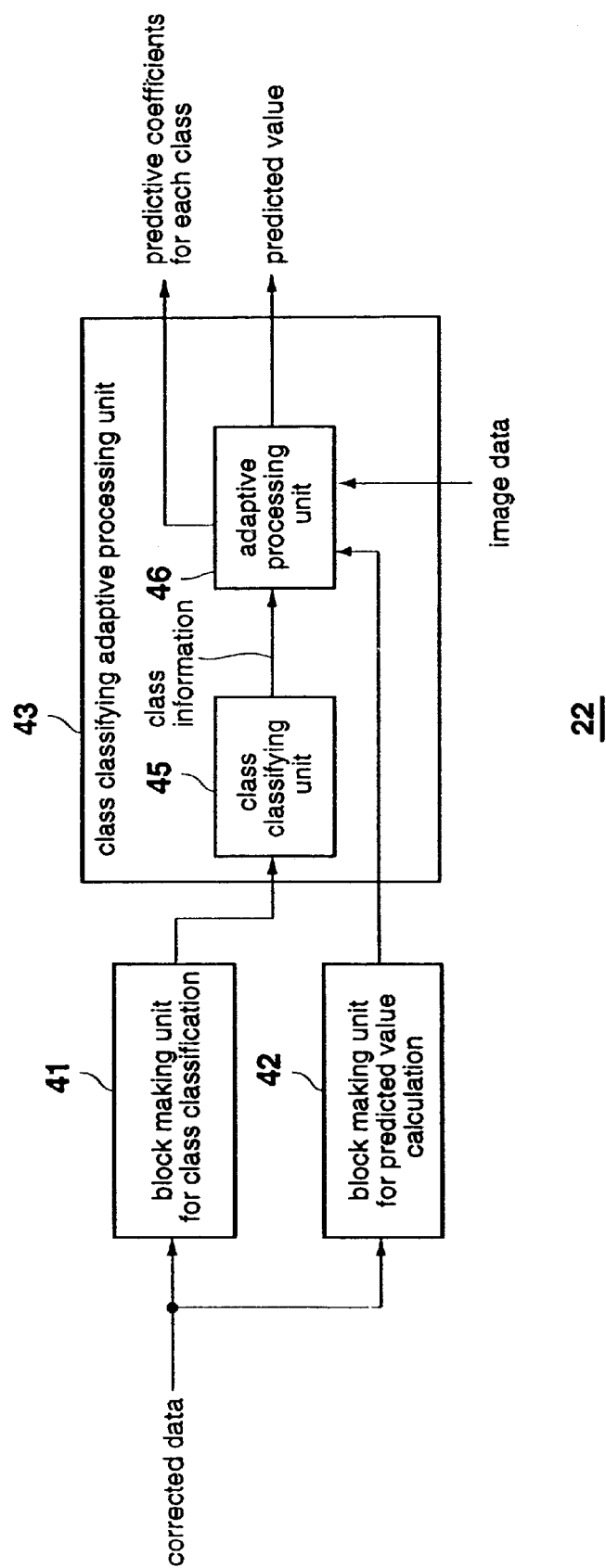

IMAGE CODING APPARATUS, IMAGE CODING METHOD, IMAGE DECODING METHOD, IMAGE DECODING APPARATUS, IMAGE DATA TRANSMITTING METHOD AND RECORDING MEDIUM

BACKGROUND OF THE INVENTION

1. Field of the Invention

The present invention relates an image coding apparatus, an image coding method, an image decoding apparatus, an image decoding method, a record medium and an image transmitting method, and more specifically, to an image coding apparatus and an image coding method, an image encoding apparatus, an image decoding method, a record medium and an image transmitting method capable of producing a prediction image with a higher image quality in a high efficiency by executing less data process operation.

2. Description of the Related Art

Conventionally, various sorts of image compressing methods have been proposed. Among these conventional image compressing methods, there is one image compressing method which compresses by thinning (subsampling) pixels of an image.

However, when pixel data produced by simply thinning an image to compress the thinned image is directly coded, the total amount of data to be processed becomes huge. Therefore, because of the huge processing requirements, prediction images having a high image quality could not effectively be obtained effectively. Accordingly, it would be desirable to obtain a high efficiency prediction image with a higher image quality utilizing a small amount of data.

SUMMARY OF THE INVENTION

It is an object of the present invention to efficiently code image data.

It is a feature of the present invention to provide high image quality utilizing a small amount of data.

It is an advantage of the present invention to reduce the amount of transmitted or recorded data necessary to provide high quality images.

In accordance with an aspect of the present invention an apparatus for coding image data having a plurality of pixels includes means for reducing a number of pixels of original image data to generate compressed data, means for limiting a level of pixels of the compressed data to generate limited compressed data, means for correcting the limited compressed data to generate corrected data, means for predicting the original image data in accordance with the corrected data and for generating predicted data having a plurality of predicted pixels, means for calculating, with respect to the original image data, a predictive error of the predicted data, means for determining suitability of the corrected data as coded data based upon the predicted error and means for outputting the corrected data as coded data of the original image data based upon the determined suitability.

According to another aspect of the present invention an apparatus for decoding coded data generated by coding image data includes means for receiving the coded data, and means for decoding the coded data and generating decoded image data, wherein the coded data is generated by the steps of reducing a number of pixels of original image data to generate compressed data, limiting a level of pixels of the compressed data to generate limited compressed data, correcting the limited compressed data to generate corrected data, predicting the original image data in accordance with the corrected data and generating predicted data having a plurality of predicted pixels, calculating, with respect to the original image data, a predictive error of the predicted data, determining suitability of the corrected data as coded data based upon the predicted error, repeating the step of correcting until the corrected data becomes an optimum corrected data, and outputting the optimum corrected data as coded data.

According to yet another aspect of the present invention a method for coding image data having a plurality of pixels includes the steps of reducing a number of pixels of original image data to generate compressed data, limiting a level of pixels of the compressed data to generate limited compressed data, correcting the limited compressed data to generate corrected data, predicting the original image data in accordance with the corrected data and generating predicted data having a plurality of predicted pixels, calculating, with respect to the original image data, a predictive error of the predicted data, determining suitability of the corrected data as coded data of the original image based upon the predicted error, and outputting the corrected data as coded data of the original image data based upon the determined suitability.

According to a further aspect of the present invention a method for decoding coded data generated by coding image data, includes the steps of receiving the coded data, and decoding the coded data and generating decoding image data, wherein the coded data is generated by the steps of reducing a number of pixels of original image data to generate compressed data, limiting a level of pixels of the compressed data to generate limited compressed data, correcting the limited compressed data to generate corrected data, predicting the original image data in accordance with the corrected data and for generating predicted data having a plurality of predicted pixels, calculating, with respect to the original image data, a predictive error of the predicted data, determining suitability of the corrected data as coded data based upon the predicted error, and outputting the corrected data as coded data of the original image data based upon the determined suitability.

According to yet a further aspect of the present invention an apparatus for coding image data having a plurality of pixels, includes a subsampling circuit for reducing a number of pixels of original image data to generate compressed data, a limiting circuit for limiting a level of pixels of the compressed data to generate limited compressed data, a correcting circuit for correcting the limited compressed data to generate corrected data, a predicting circuit for predicting the original image data in accordance with the corrected data and for generating predicted data having a plurality of predicted pixels, a calculator for calculating, with respect to the original image data, a predictive error of the predicted data, a determining circuit for determining suitability of the corrected data as coded data based upon the predicted error, and an output circuit for outputting the corrected data as coded data of the original image data based upon the determined suitability.

According to an additional aspect of the present invention an apparatus for decoding coded data generated by coding image data includes a circuit for receiving the coded data, and a decoder for decoding the coded data and generating decoding image data, wherein the coded data is generated by the steps of reducing a number of pixels of original image data to generate compressed data, limiting a level of pixels of the compressed data to generate limited compressed data, correcting the limited compressed data to generate corrected data, predicting the original image data in accordance with the corrected data and for generating predicted data having a plurality of predicted pixels, calculating, with respect to the original image data, a predictive error of the predicted data, determining suitability of the corrected data as coded data based upon the predicted error, and outputting the corrected data as coded data of the original image data based upon the determined suitability.

According an aspect of the present invention a method for transmitting image data having a plurality of pixels, includes the steps of reducing a number of pixels of original image data to generate compressed data, limiting a level of pixels of the compressed data to generate limited compressed data, correcting the limited compressed data to generate corrected data, predicting the original image data in accordance with the corrected data and for generating predicted data having a plurality of predicted pixels, calculating, with respect to the original image data, a predictive error of the predicted data, determining suitability of the corrected data as coded data based upon the predicted error, outputting the corrected data as coded data of the original image data based upon the determined suitability, and transmitting the outputted corrected data.

According to a further aspect of the present invention a recording medium has an encoded digital signal recorded thereon, the recording medium being prepared by the steps of reducing a number of pixels of original image data to generate compressed data, limiting a level of pixels of the compressed data to generate limited compressed data, correcting the limited compressed data to generate corrected data, predicting the original image data in accordance with the corrected data and for generating predicted data having a plurality of predicted pixels, calculating, with respect to the original image data, a predictive error of the predicted data, determining suitability of the corrected data as coded data based upon the predicted error, outputting the corrected data as coded data of the original image data based upon the determined suitability, and recording the coded data on the recording medium.

According to an additional aspect of the present invention a method for coding data having a plurality of samples, includes the steps of reducing a number of samples of original data to generate compressed data, limiting a level of samples of the compressed data to generate limited compressed data, correcting the limited compressed data to generate corrected data, predicting the original data in accordance with the corrected data and generating predicted data having a plurality of predicted samples, calculating, with respect to the original data, a predictive error of the predicted data, determining suitability of the corrected data as coded data of the original data based upon the predicted error, and outputting the corrected data as coded data of the original data based upon the determined suitability.

According to yet another aspect of the present invention, a method for decoding coded data generated by coding data, includes the steps of receiving the coded data, and decoding the coded data and generating decoding data, wherein the coded data is generated by the steps of limiting a level of samples of the compressed data to generate limited compressed data, correcting the limited compressed data to generate corrected data, predicting the original data in accordance with the corrected data and for generating predicted data having a plurality of predicted samples, calculating, with respect to the original data, a predictive error of the predicted data, determining suitability of the corrected data as coded data based upon the predicted error, and outputting the corrected data as coded data of the original data based upon the determined suitability.

According to a further aspect of the present invention, an apparatus for coding data having a plurality of samples includes a subsampling circuit for reducing a number of samples of original data to generate compressed data, a limiting circuit for limiting a level of samples of the compressed data to generate limited compressed data, a correcting circuit for correcting the limited compressed data to generate corrected data, a predicting circuit for predicting the original data in accordance with the corrected data and for generating predicted data having a plurality of predicted samples, a calculator for calculating, with respect to the original data, a predictive error of the predicted data, a determining circuit for determining suitability of the corrected data as coded data based upon the predicted error, and an output circuit for outputting the corrected data as coded data of the original data based upon the determined suitability.

According to yet another aspect of the present invention an apparatus for decoding coded data generated by coding data, includes a circuit for receiving the coded data, and a decoder for decoding the coded data and generating decoding data, wherein the coded data is generated by the steps of reducing a number of samples of original data to generate compressed data, correcting the compressed data to generate corrected data, predicting the original data in accordance with the corrected data and for generating predicted data having a plurality of predicted samples, calculating, with respect to the original data, a predictive error of the predicted data, determining suitability of the corrected data as coded data based upon the predicted error, and outputting the corrected data as coded data of the original data based upon the determined suitability.

According to an aspect of the present invention, an apparatus for coding image data having a plurality of pixels includes means for extracting a plurality of pixels of the image data and generating class information corresponding to characteristics of the extracted plurality of pixels, means for storing mapping coefficients for each class, means for reading mapping coefficients for each class, means for reading mapping coefficients corresponding to the class information and for producing corrected data using the image data and the read mapping coefficients, and means for producing coded data by limiting a level of pixels of the corrected data.

According to another aspect of the present invention, an apparatus for decoding coded data generated by coding image data, includes means for receiving the coded data, and means for decoding the coded data to produce decoded image data, said coded data generated by the steps of extracting a plurality of pixels of the image data and generating class information corresponding to characteristics of the extracted plurality of pixels, storing mapping coefficients for each class, reading mapping coefficients for each class, reading mapping coefficients corresponding to the class information and for producing corrected data using the image data and the read mapping coefficients, and producing coded data by limiting a level of pixels of the corrected data.

According to yet a further aspect of the present invention, a method for coding image data having a plurality of pixels, includes the steps of extracting a plurality of pixels of the image data and generating class information corresponding to characteristics of the extracted plurality of pixels, storing mapping coefficients for each class, reading mapping coefficients for each class, reading mapping coefficients corresponding to the class information and for producing corrected data using the image data and the read mapping coefficients, and producing coded data by limiting a level of pixels of the corrected data.

According to another aspect of the present invention, a method for decoding coded data generated by coding image data, includes the steps of receiving the coded data, and decoding the coded data to produce decoded image data, said coded data generated by the steps of extracting a plurality of pixels of the image data and generating class information corresponding to characteristics of the extracted plurality of pixels, storing mapping coefficients for each class, reading mapping coefficients for each class, reading mapping coefficients corresponding to the class information and for producing corrected data using the image data and the read mapping coefficients, and producing coded data by limiting a level of pixels of the corrected data.

According to an additional aspect of the present invention, a method for transmitting image data having a plurality of pixels, includes the steps of extracting a plurality of pixels of the image data and generating class information corresponding to characteristics of the extracted plurality of pixels, storing mapping coefficients for each class, reading mapping coefficients for each class, reading mapping coefficients corresponding to the class information and for producing corrected data using the image data and the read mapping coefficients, producing coded data by limiting a level of pixels of the corrected data, and transmitting the coded data.

According to an aspect of the present invention, a method for transmitting image data having a plurality of pixels, includes the steps of extracting a plurality of pixels of the image data and generating class information corresponding to characteristics of the extracted plurality of pixels, storing mapping coefficients for each class, reading mapping coefficients for each class, reading mapping coefficients corresponding to the class information and for producing corrected data using the image data and the read mapping coefficients, producing coded data by limiting a level of pixels of the corrected data, and transmitting the coded data.

According to an additional aspect of the present invention, a recording medium has an encoded digital signal recorded thereon, the recording medium being prepared by the steps of extracting a plurality of pixels of the image data and generating class information corresponding to characteristics of the extracted plurality of pixels, storing mapping coefficients for each class, reading mapping coefficients for each class, reading mapping coefficients corresponding to the class information and for producing corrected data using the image data and the read mapping coefficients, producing coded data by limiting a level of pixels of the corrected data, and recording the coded data on the recording medium.

According to a further aspect of the present invention, an apparatus for coding image data having a plurality of pixels, includes a subsampling circuit for extracting a plurality of pixels of the image data and generating class information corresponding to characteristics of the extracted plurality of pixels, a memory storing mapping coefficients for each class, a circuit for reading mapping coefficients for each class, a circuit for reading mapping coefficients corresponding to the class information and for producing corrected data using the image data and the read mapping coefficients, and a limiting circuit for producing coded data by limiting a level of pixels of the corrected data.

According to another aspect of the present invention, an apparatus for decoding coded data generated by coding image data, includes a circuit for receiving the coded data, and a decoder for decoding the coded data to produce decoded image data, said coded data generated by the steps of extracting a plurality of pixels of the image data and generating class information corresponding to characteristics of the extracted plurality of pixels, storing mapping coefficients for each class, reading mapping coefficients for each class, reading mapping coefficients corresponding to the class information and for producing corrected data using the image data and the read mapping coefficients, and producing coded data by limiting a level of pixels of the corrected data.

According to an additional aspect of the present invention, a method of transmitting coded image data, includes the steps of receiving the coded image data, and transmitting the coded image data, wherein the coded image data is produced by the steps of reducing a number of pixels of original image data to generate compressed data, limiting a level of pixels of the compressed data to generate limited compressed data, correcting the limited compressed data to generate corrected data, predicting the original image data in accordance with the corrected data and for generating predicted data having a plurality of predicted pixels, calculating, with respect to the original image data, a predictive error of the predicted data, determining suitability of the corrected data as coded data based upon the predicted error, and outputting the corrected data as coded data of the original image data based upon the determined suitability.

These and other objects, features, advantages and aspects of the invention will become apparent when considered with reference to the following description and the accompanying drawings.

BRIEF DESCRIPTION OF THE DRAWINGS

FIG. 8 is a block diagram of the local decoder 22 of FIG. 3.

DETAILED DESCRIPTION OF THE PREFERRED EMBODIMENTS

In order to clarify the corresponding relationship between each of the means of the various embodiments described herein, certain characteristics of the present invention are first briefly described with reference to the Figures. It is to be understood that the term "unit" is to be interpreted in the broadest sense, including a hard wired circuit, a main frame loaded with appropriate software, a programmed microprocessor or micro-controller, or a combination of these.

Figure 1:
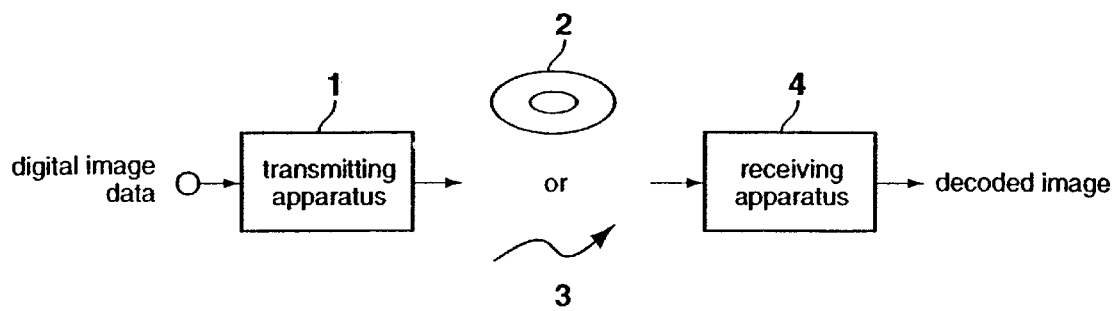
FIG. 1 is a block diagram showing a configuration of an embodiment of the present invention applied to an image processing system.

FIG. 1 illustrates an arrangement of an embodiment of an image processing apparatus to which the present invention is applied. To a transmitting apparatus 1, digitalized image data is supplied. The transmitting apparatus 1 thins (namely, reduces the pixel number thereof, for example by subsampling) the inputted image data to compress/code the thinned image data in order to obtain coded image data, and records this coded data on a recording medium 2 such as an optical disk, a magneto-optical disk, a magnetic tape, and other recording media, otherwise transmits this coded data via a transmission path 3 such as ground waves, a satellite line, a telephone line, a CATV network or other paths.

In a receiving apparatus 4, the coded data which has been recorded on the recording medium 2 is reproduced, or the coded data which has been transmitted via the transmission path 3 is received, and this coded data is expanded and decoded to obtain a decoded image which is supplied to a display (not shown) so as to be displayed on this display.

It should also be noted that the above-described image processing apparatus may utilized with image recording/reproducing apparatuses, for instance, an optical disk apparatus, a magneto-optical disk apparatus, a magnetic tape apparatus, and the like. Alternatively, this image processing apparatus may be utilized with two image transferring apparatuses, for example, a television telephone apparatus, a television broadcasting system, a CATV system and the like. Also, since a data amount of coded data outputted from the transmitting apparatus 1 is small, the image processing apparatus of FIG. 1 may be utilized with, for example, a portable telephone, and other portable terminal, the transfer rates of which are low.

Figure 2:
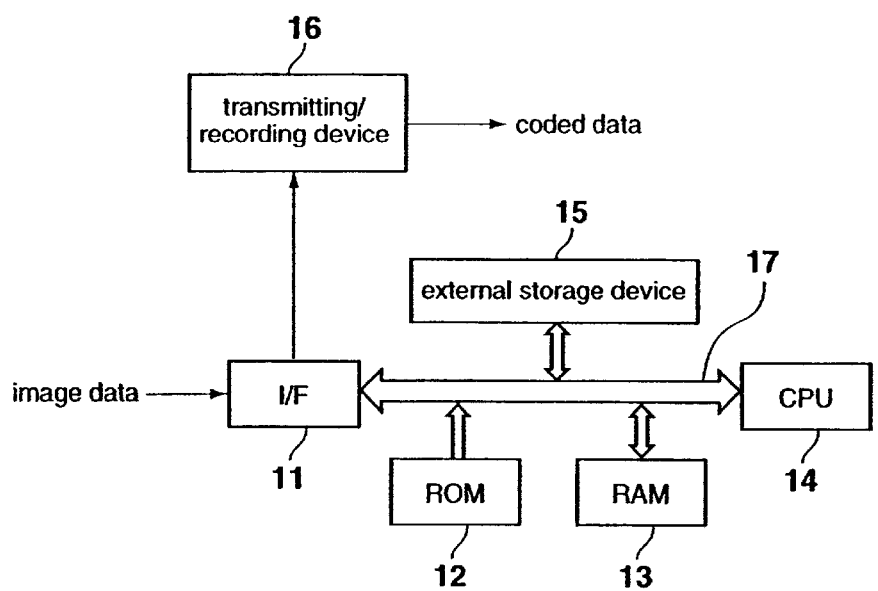
FIG. 2 is a block diagram showing an example configuration of the transmitting apparatus 1.

FIG. 2 shows an example of an arrangement of the above-described transmitting apparatus 1.

An I/F (Interface) 11 is provided to perform a reception process of image data externally supplied thereto, and a transmission process of coded data with respect to a transmitting/recording device 16. A ROM (Read Only memory) 12 stores therein a program for an IPL (Initial Program Loading), and other programs. A RAM (Random Access Memory) 13 is employed so as to store therein a system program (i.e., an operating system) saved in an external storage device 15, an application program, and also data required for operation of a CPU (Central Processing Unit) 14. The CPU 14 extends the system program and the application program from the external storage apparatus 15 in accordance with the IPL program stored in the ROM 12 to RAM 13, and also executes a decoding process operation (will be explained later) as to image data supplied from the I/F 11 by executing the application program under control of this system program. The external storage apparatus 15 is constituted by, for example, a magnetic disk apparatus, and as previously described, stores therein the system program and the application program executed by the CPU 11, and further stores data required in operations of the CPU 14. The transmitting/recording device 16 records the coded data supplied from the I/F 11 on the recording medium 2, or transmits this coded data via the transmission path 3.

It should be noted that the above-described I/F 11, ROM 12, RAM 13, CPU 14, and external storage apparatus 15 are mutually connected via a bus 17.

In the transmitting apparatus 1 constructed in the above manner, when image data is supplied to the I/F 11, this image data is supplied to the CPU 14. The CPU 14 codes the image data, and then supplies the resultant coded data to the I/F 11. Upon receipt of the coded data, the I/F 11 supplies this coded data to the transmitting/recording apparatus 16. In the transmitting/recording apparatus 16, the coded data derived from the I/F 11 is recorded on the recording medium 2, or is transmitted via the transmission path 3.

First Embodiment

Figure 3:
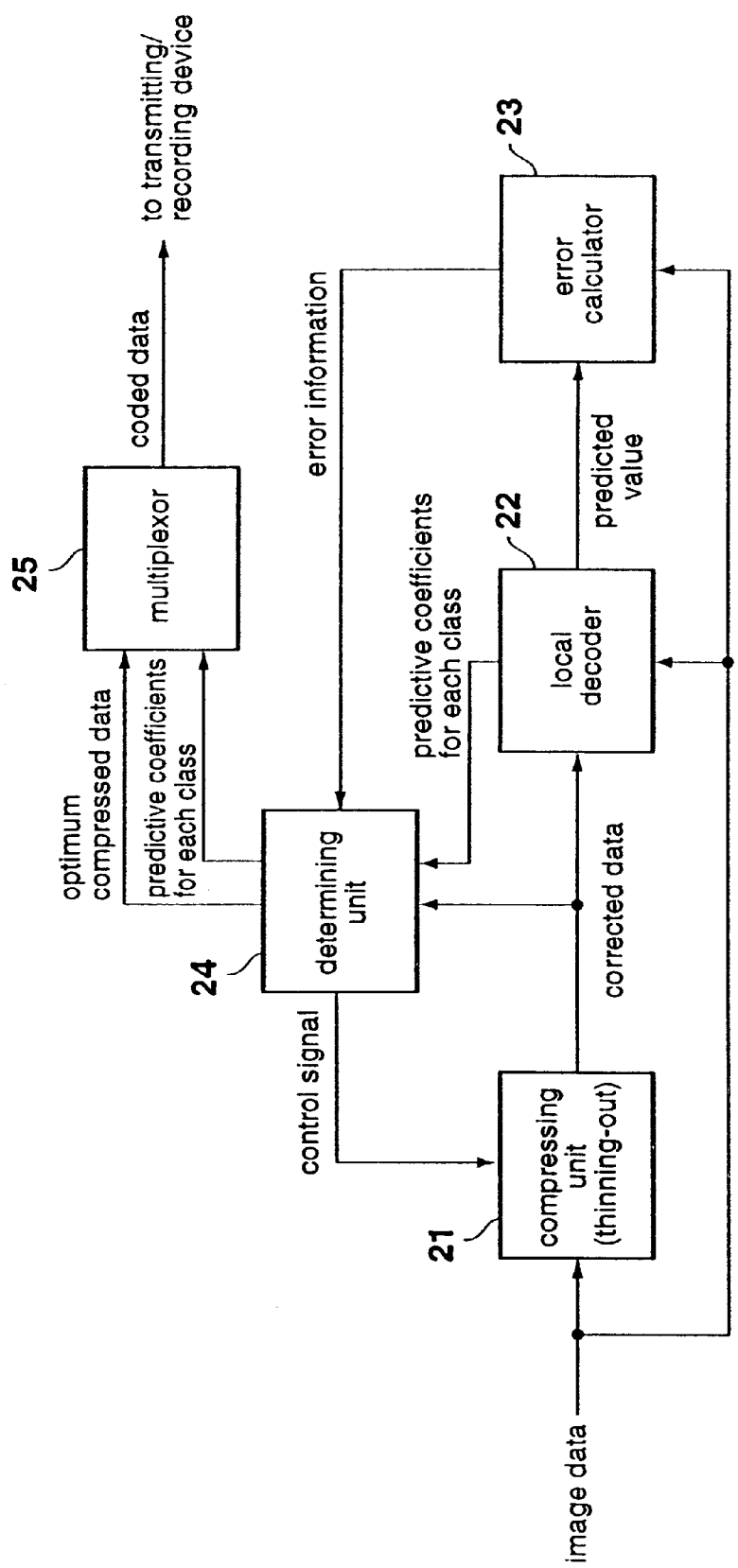
FIG. 3 is a block diagram of a first embodiment of the transmitting apparatus 1 of FIG. 2 (excluding transmitting/recording device 16).

With reference now to FIGS. 3, 4, 5, 6, 8, 10, 11, 12, 13, 14 and, 15 a configuration of a first embodiment of the invention is described. FIG. 3 is a functional block diagram for showing an internal arrangement of the transmitting apparatus 1 of FIG. 2 except for the transmitting/recording device 16.

The image data (the original image data) to be coded is supplied to a compressing unit 21, a local decoder 22, and an error calculator 23. The compressing unit 21 compresses the image data by simply thinning pixels (subsampling) of this image data, and also corrects such compression data (namely, image data which has been thinned and level-limited) under control of the determining unit 24 by limiting the levels of the extracted pixel data. The corrected data obtained by correcting the compression data in the compressing unit 21 is supplied to the local decoder 22 and the determining unit 24.

The local decoder 22 predicts an original image-based on the corrected data supplied from the compressing unit 21, and then supplies predicted values to the error calculator 23. As will be described later, the local decoder 22 executes an adaptive process operation so as to obtain predictive coefficients used to calculate the predicted values by way of the linear coupling with the correction data. Based upon these predictive coefficients, the local decoder 22 obtains the predicted values, which are in turn supplied to error calculator 23. The resultant predictive coefficients are supplied to the determining unit 24.

The error calculator 23 calculates a prediction error of the predicted values derived from the local decoder 22 with respect to the original image data (original image), which is entered into this error calculator 23. This prediction error is supplied as error information to the determining unit 24.

Based on the error information derived from the error calculator 23, the determining unit 24 judges whether or not the corrected data outputted from the compressing unit 21 is correctly equal to the coded result of the original image. Then, when the determining unit 24 judges that the corrected data outputted from the compressing unit 21 is not equal to the coded result of the original image, this determining unit 24 controls the compressing unit 21 to further correct the compression data, so that newly obtained corrected data is outputted from this compressing unit 21. Also, when the determining unit 24 judges that the corrected data outputted by the compressing unit 21 is correctly equal to the coded result of the original image data, the corrected data supplied from the compressing unit 21 is furnished to a multiplexor 25 as optimum compression data (to be referred to as "optimum compression data" hereinafter, if necessary), and the predictive coefficients supplied from the local decoder 22 is supplied to the multiplexor 25.

The multiplexor 25 multiplexes the optimum compression data derived from the determining unit 24 with the predictive coefficients, and then supplies the multiplexed result as coded data to the transmitting/recording device 16 (FIG. 2).

Figure 4:
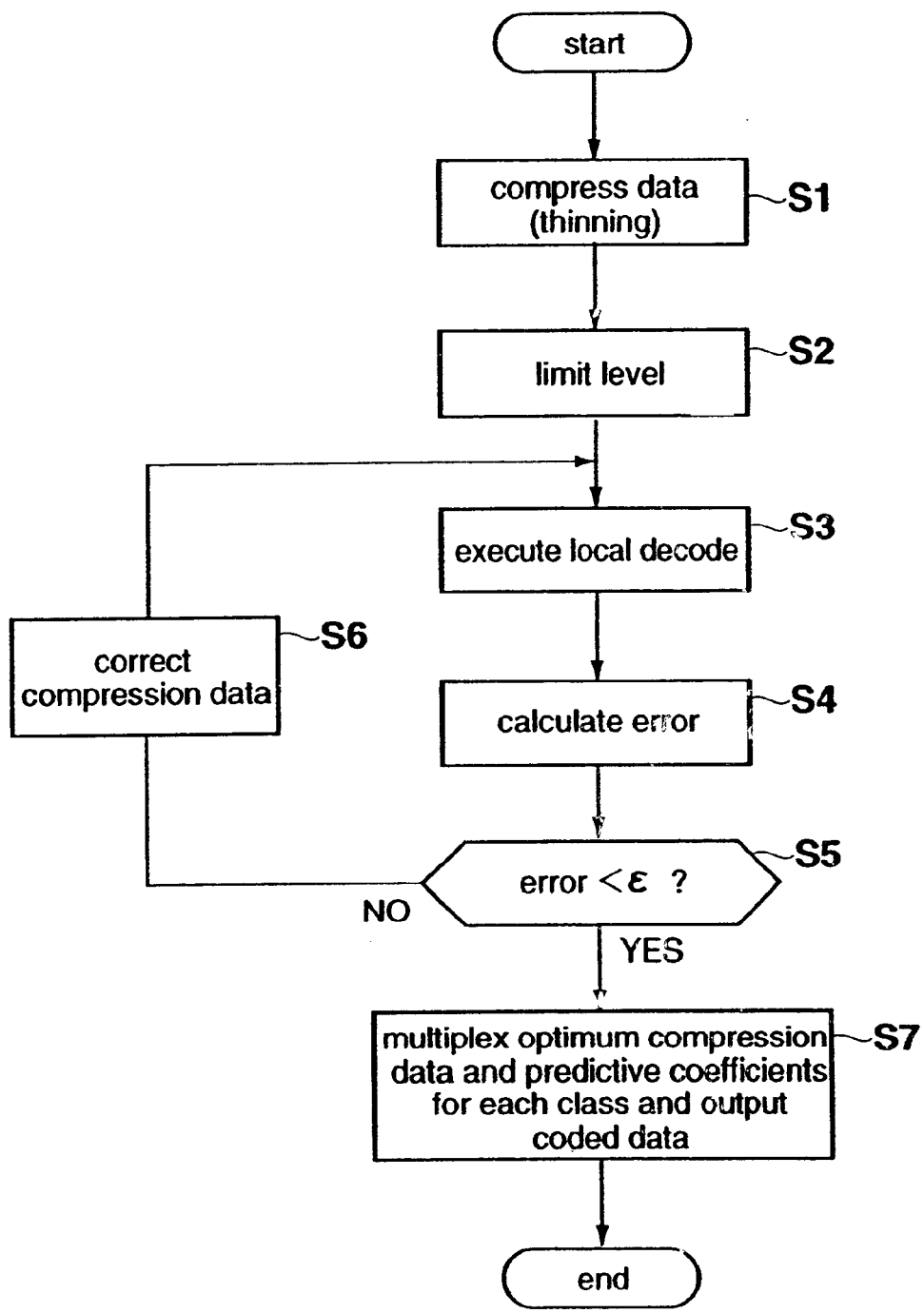
FIG. 4 is a flow chart illustrating the operation of the transmitting apparatus 1 of FIG. 3.

Referring now to a flow chart of FIG. 4, the operation of the transmitting apparatus of FIG. 3 is further explained. When the image data (the original image data) is supplied to the compressing unit 21, the compressing unit 21 first compresses this image data, at a step S1, while thinning the image data (namely, extracting plural pixels from a large number of pixels). At a step S2, levels of the extracted pixel data are limited by extracting 2 bits of this pixel data on the MSB side thereof. Then, this pixel data is outputted to the local decoder 22 and the determining unit 24 without any correction in the beginning. In the local decoder 22, at a step S3, the corrected data derived from the compressing unit 21 is locally decoded. This corrected data is equal to such a compression data that, as previously explained, the image data is simply thinned and also level-controlled in the beginning.

In other words, at the step S3, the adaptive process operation for obtaining predictive coefficients used to calculate predicted values of the original image data is carried out by way of the linear coupling operation with the correction data from the compressing unit 21. Then, based on these predictive coefficients, the predicted values are calculated. The predicted values calculated in the local decoder 22 are supplied to the error calculator 23, and the predictive coefficients are supplied to the determining unit 24.

In this case, an image constructed of the predicted values outputted from the local decoder 22 is identical to the decoded image obtained on the side of the receiving apparatus 4 (FIG. 1).

When the predicted values of the original image data are received from the local decoder 22 by the error calculator 23, at a step S4, the error calculator 23 calculates the prediction error of the predicted values derived from the local decoder 22 with respect to the original image data, and supplies this prediction error as the error information to the determining unit 24. When the error information is received from the error calculator 23, the determining unit 24 judges at a step S5 as to whether or not the corrected data outputted from the compressing unit 21 is correctly equal to the coded result of the original image data.

In other words, at a step S5, for instance, a judgment is made as to whether or not the error information is less than a predetermined threshold value "$\epsilon$". At the step S5, when it is so judged that the error information is not less than the predetermined threshold value "$\epsilon$", a recognition is made that the corrected data outputted from the compressing unit 21 is not equal to the coded data of the original image data. Then, the process operation is advanced to a step S6 at which the determining unit 24 controls the compressing unit 21 so as to correct the compression data. The compressing unit 21 varies a correction amount (namely, correction value "$\Delta$" will be discussed later) under control of the determining unit 24 in order to correct the data. The resultant corrected data is outputted to the local decoder 22 and the determining unit 24. Then, the process operation is returned to the previous step S3, and a similar process operation will now be repeatedly carried out.

On the other hand, at the step S5, when it is so judged that the error information is less than the predetermined threshold value "$\epsilon$", a recognition that the corrected data outputted from the compressing unit 21 is correctly equal to the coded result of the original image data. The determining unit 24 outputs the correction data when the error information less than the predetermined threshold value "$\epsilon$" as the optimum correction data in combination with the predictive coefficient to the multiplexor 25. At a step S7, the multiplexor 25 multiplexes the predictive coefficient with the optimum compressed data derived from the determining unit 24, and outputs the multiplexed result as the coded data. Then, the process operation is ended.

As previously explained, since the corrected data produced by correcting the compressed data, such a condition that the error information becomes less than a preselected threshold value "$\epsilon$" is used as the coded result of the original image data, it is possible to obtain such an image substantially identical to the original image data based on this corrected data on the side of the receiving apparatus 4.

Figure 5:
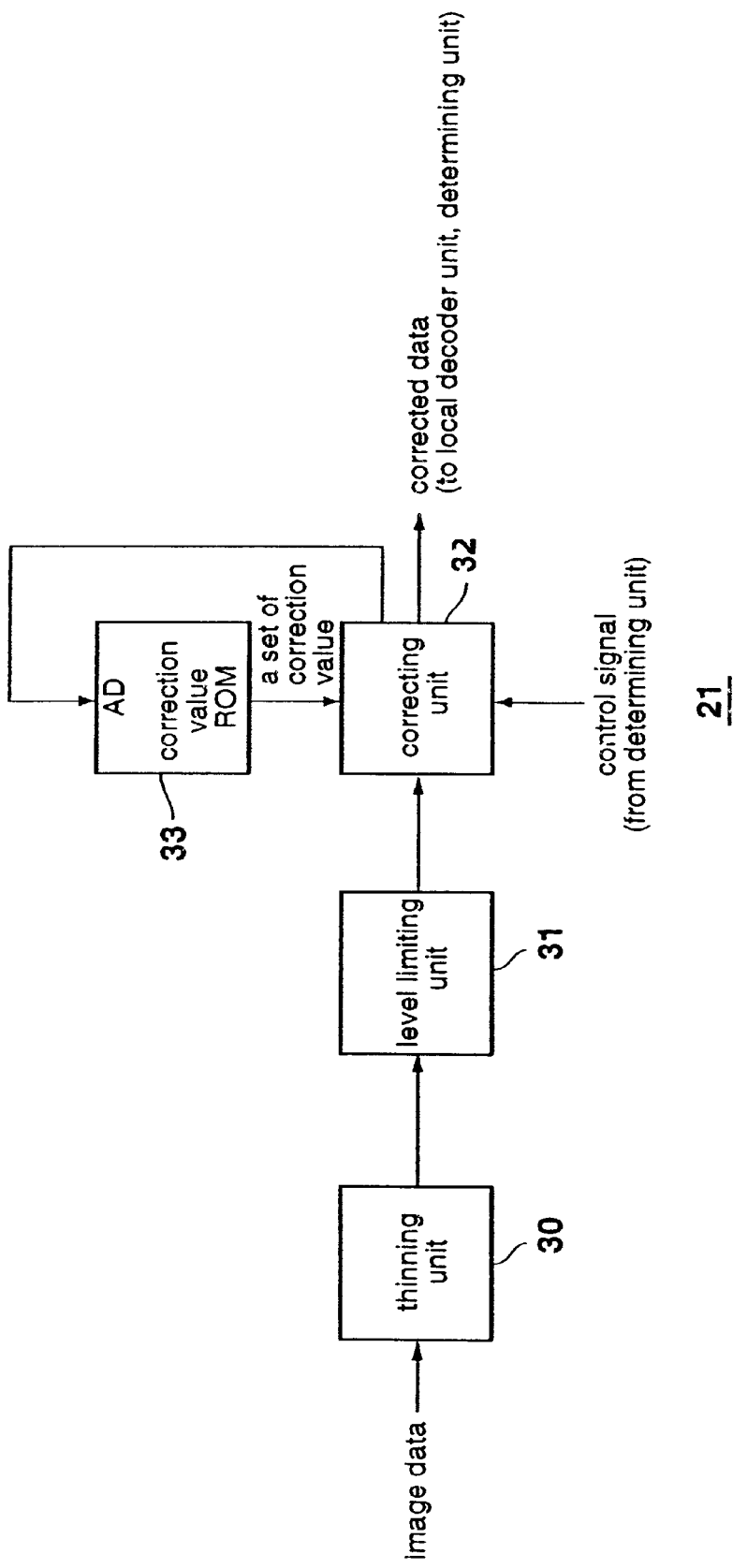
FIG. 5 is a block diagram of the compressing unit 21 of each of FIGS. 3, 19 and 21.

Next, FIG. 5 illustrates an arrangement of the compressing unit 21 of FIG. 3.

The image data (the original image data) to be coded is inputted into a thinning unit 30. The thinning unit 30 may thin the inputted image data by 1/N. As a result, such compression data that the image data is compressed by 1/N is outputted from the thinning unit 30. This compression data is entered into a level limiting unit 31 so as to limit the level of this compression data by extracting, for instance, only 2-bit data of the respective pixel data on the side of the MSB thereof, and this pixel data is expressed by 8 bits. Then, the level-limited compression data is supplied to a correcting unit 32.

In response to a control signal sent from the determining unit 24 (FIG. 3), the correcting unit 32 supplies an address to a correction value ROM 33, so that the correction value "Δ" is read out from this ROM. Then, the correcting unit 32 produces the corrected data by, for example, adding the correction value Δ read from the correction value ROM 33 to the compression data from the level limiting unit 31, and then supplies the produced corrected data to the local decoder 22 and the determining unit 24. The correction value ROM 33 stores therein combinations of various sorts of correction values Δ (for instance, a combination of corrected values for correcting compression data for 1 frame) so as to correct the compression data outputted from the level limiting unit 31. A combination of correction values Δ corresponding to the address supplied from the correcting unit 32 is read from this correction value ROM 32 to be supplied to the correcting unit 32.

Figure 6:
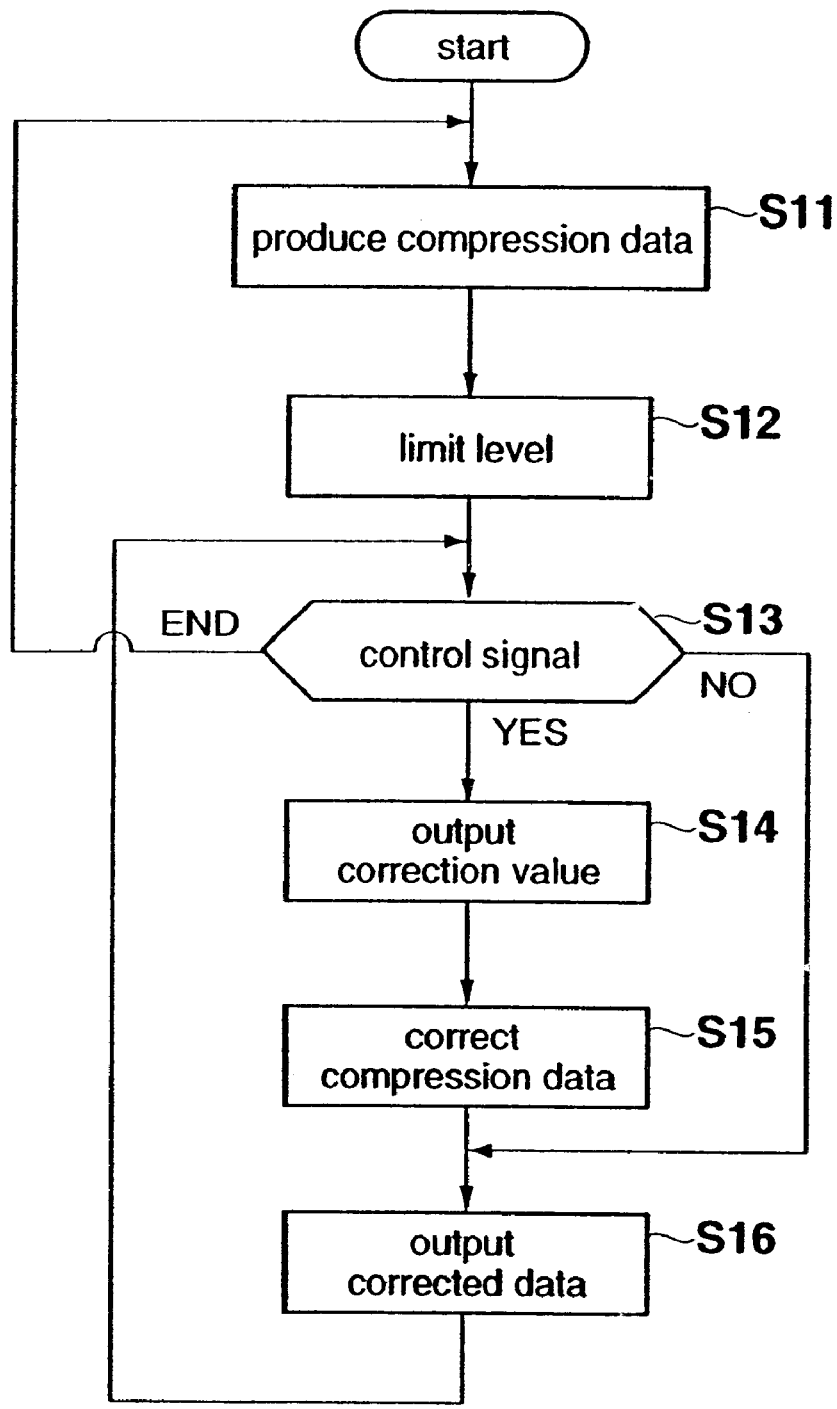
FIG. 6 is a flow chart illustrating the operation of the compressing unit 21 of FIG. 5.

Referring now to FIG. 6, the operation of the compressing unit 21 shown in FIG. 5 is further explained.

For example, when the image data for 1 frame is supplied to the correcting unit 30, the thinning unit 30 thins this image data by 1/N at a step S11, and outputs the resultant compression data to the level limiting unit 31.

Figure 7:
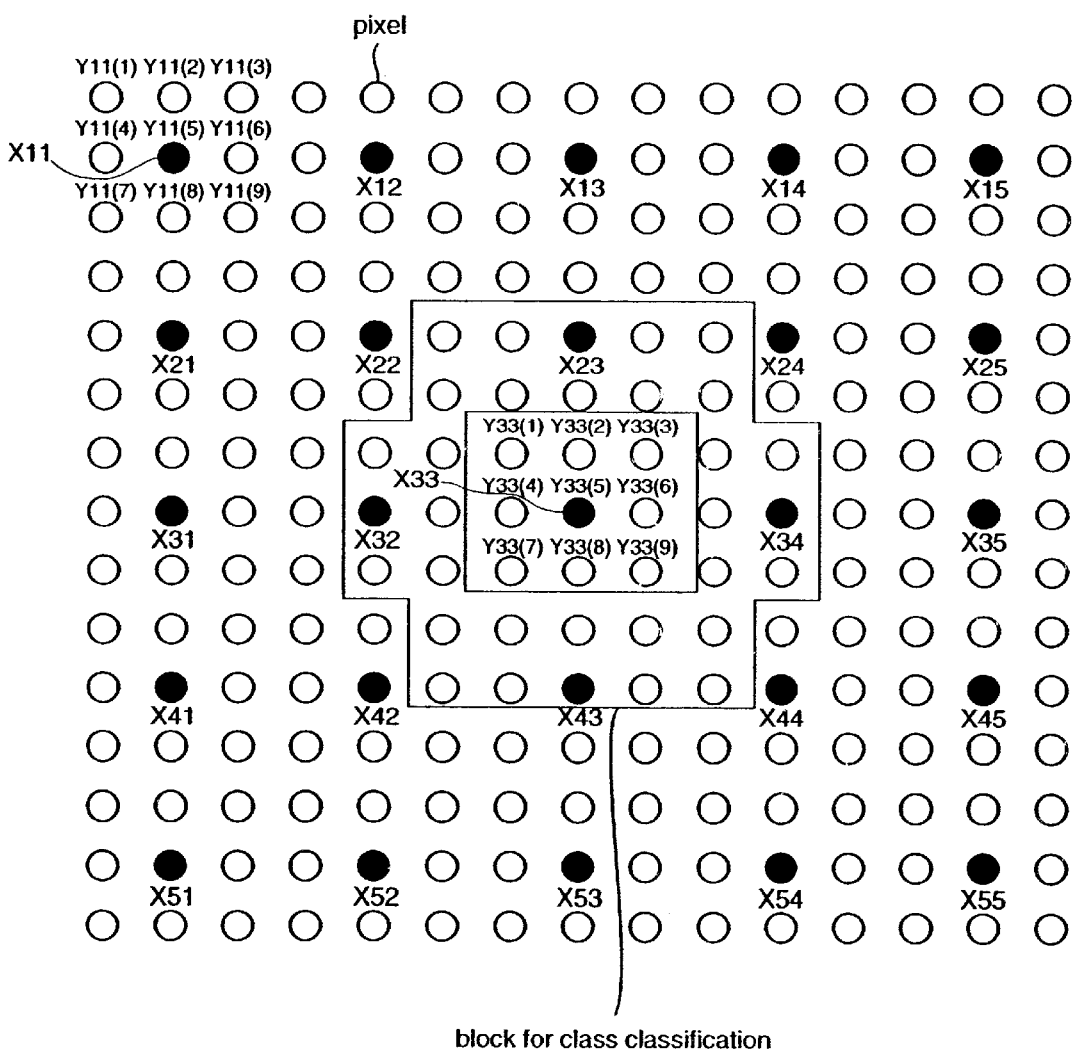
FIG. 7 is an illustration of the process of the thinning-out unit 31 of FIG. 5.

In this case, as indicated in FIG. 7, the thinning unit 30 is designed to thin the image data by, for instance, 1/9. That is, the thinning unit 30 extracts only a pixel value about a central pixel (portion indicated by symbol "●" in FIG. 7) in each unit, while 9 pixels of 3×3 (transverse direction× longitudinal direction) are used as 1 unit, and also deletes other portions (portions indicated by symbol "○" in FIG. 7). It should be noted that the thinning unit 30 performs the above-described process operation in unit of, for instance, 1 frame. As a result, the data produced by that image data for 1 frame is thinned by 1/9) is supplied as the compression data from the thinning unit 30 to the level limiting unit 31. It also should be noted that the thinning process operation executed in the thinning unit 30 may be alternatively carried out in such a manner that an image of 1 frame is subdivided into several blocks, and the thinning process operation is performed in units of one block.

Upon receipt of the supply of the pixel data thinned by 1/9 from the thinning unit 30, at step S12 the level limiting unit 31 limits the level of the thinned pixel data by extracting 2-bit data from the pixel data indicated by 8 bits, from the MSB side thereof. In other words, as a consequence, the respective pixel data are expressed by 2 bits, so that the subsequent process operation may be made simple.

Upon receipt of the compression data from the level limiting unit 31, the correcting unit 32 judges as to whether or not a control signal sent from the determining unit 24 (FIG. 3) is received. When it is so judged at the step S13 that the control signal is not yet received, the process operation is advanced to a step S16, at which the correcting unit 32 directly outputs the compression data derived from the level limiting unit 31 as correction data to the local decoder 22 and the determining unit 24. Then, the process operation is returned to the step S13.

That is to say, as explained above, the determining unit 24 controls the compressing unit 21 (correcting unit 32) based on the error information. Since the error information is not yet acquired immediately after the compression data is received by the level limiting unit 31 (because the error information is not outputted from the error calculator 23), no control signal is outputted from the determining unit 24. As a result, just after the compression data is outputted from the level limiting unit 31, the correcting unit 32 does not correct this compression data (to correct by add 0), but directly outputs this compression data as the corrected data to the local decoder 22 and the determining unit 24.

On the other hand, in the case that it is so judged at the step S13 that the control signal from the determining unit 24 is received, the correcting unit 32 outputs an address defined in accordance with this control signal to the correction value ROM 33 at a step S14. As a result, at this step S14, the combination (set) of the correction values Δ stored at this address and used to correct the compression data for 1 frame is read at from the correction value ROM 33, and then is supplied to the correcting unit 32. Upon receipt of the combination of the correction value Δ read from the correction value ROM 33, the correcting unit 32 adds the corresponding correction values Δ to the respective compression data for 1 frame, so that the corrected data produced by correcting the compression data for 1 frame is calculated at a step S15. Thereafter, the process operation is advanced to a step S16, at which the correction data is outputted from the correcting unit 32 to the local decoder 22 and the determining unit 24, and then is returned to the step S13. When it is determined in step S13 that a control signal having an end of operation state has been received from the determining unit 24, the process is returned to step S11, where the thinning unit 30 thins out this image data in step S11 by 1/N and then the following compressed data is processed in the same way.

As previously explained, the compressing unit 21 repeatedly outputs the corrected data obtained by correcting the compression data into the various values under control of the determining unit 24.

It should be noted that when the coding operation as to the image of 1 frame is accomplished, the determining unit 24 supplies to the compressing unit 21, such a control signal for indicating this completion of the coding operation. Upon receipt of this control signal, the compressing unit 21 executes the process operation defined in the flow chart of FIG. 6 with respect to an image of the next frame.

Also, in the above-described case, the compression data is produced by the thinning unit 30 by extracting only the pixel data (pixel value) about the central pixel of the 3×3 pixels. Alternatively, for example, an average value of the 3×3 pixels is calculated, and thus, the compression data may be produced by using this average value as the pixel value of the central pixel in the 3×3 pixels.

Next, FIG. 8 illustrates an arrangement of the local decoder 22 shown in FIG. 3.

The corrected data derived from the compressing unit 21 is supplied to a block making unit for class classification 41 and a block making unit for predicted values calculation 42. The block making unit 41 for the class classification makes class classifying blocks centered about the noted corrected data in units used to classify the corrected data into a preselected class, depending upon a nature thereof.

In other words, for instance, assuming now that in FIG. 7, corrected data (compression data) (or, pixel) (portion indicated by symbol "●") located at an i-th position from the upper position and at a j-th position from the left position is expressed as "$X_{ij}$", the block making unit 41 for the class classification will constitute a class classifying block arranged by 5 pixels in total, namely, a pixel "$X_{ij}$" of interest and the following 4 pixels adjacent to this pixel of interest at upper, left, right, and lower positions: $X_{(i-1)j}$, $X_{i(j-1)}$, $X_{i(j+1)}$, $X_{(i-1)j}$. This class classifying block is supplied to a class classification adaptive processing circuit 43.

It should be noted, in this case, the class classifying block is constituted by a cross-shaped block, but the shape of the class classifying block is not required to be such a cross shape. Alternatively, other shapes, for example, a rectangular shape, a square shape, and other arbitrary shapes may be employed. Also, a total number of the pixels for constituting the class classifying block is not limited to 5 pixels.

The block making unit for the predicted value calculation 42 processes the corrected data to make a predicted values calculating block centered about the noted corrected data in units used to calculate the predicted values of the original image data. In other words, in FIG. 7, assuming now that pixel values of 9 pixels (=3×3) in an original image data, while positioning the corrected data Xij (portion denoted by symbol "●" in FIG. 7) are expressed from the leftmost direction to the rightmost direction, and from the upper direction to the lower direction, by: $Y_{ij}(1)$, $Y_{ij}(2)$, $Y_{ij}(3)$, $Y_{ij}(4)$, $Y_{ij}(5)$, $Y_{ij}(6)$, $Y_{ij}(7)$, $Y_{ij}(8)$, $Y_{ij}(9)$, the block making unit for the predicted values calculation 42 will constitute a square-shaped predicted values calculating block in order to calculate predicted values of the pixels $Y_{ij}(1)$ through the pixel $Y_{ij}(9)$. This predicted values calculating block is arranged by, for example, the below-mentioned 25 pixels (=5×5), while a pixel $X_{ij}$ is set as a center: $X_{(i-2)(j-2)}$, $X_{(i-2)(j-1)}$, $X_{(i-2)j}$, $X_{(i-2)(j+1)}$, $X_{(i-2)(j+2)}$, $X_{(i-1)(j-2)}$, $X_{(i-1)(j-1)}$, $X_{(i-1)j}$, $X_{(i-1)(j+1)}$, $X_{(i-1)(j+2)}$, $X_{i(j-2)}$, $X_{i(j-1)}$, $X_{ij}$, $X_{i(j+1)}$, $X_{i(j+2)}$, $X_{(i+1)(j-2)}$, $X_{(i+1)(j-2)}$, $X_{(i+1)(j-1)}$, $X_{(i+1)j}$, $X_{(i+1)(j+1)}$, $X_{(i+1)(j+2)}$, $X_{(i+2)(j-2)}$, $X_{(i+2)(j-1)}$, $X_{(i+2)j}$, $X_{(i+2)(j+1)}$, $X_{(i+2)(j+2)}$.

Concretely speaking, for instance, in FIG. 7, to calculate the predicted values of the pixels Y33(1) to Y33(9) in the original image data surrounded by a rectangle, the predicted values calculating block is constructed by the following pixels: $X_{11}$, $X_{12}$, $X_{13}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$, $X_{55}$.

The predicted values calculating block obtained in the block making unit for the predicted values calculation 42 is supplied to the class classification adaptive processing circuit 43.

Similar to the case of the class classifying block, the pixel number and the shape as to the predicted values calculating block are not limited to the above-described examples. It should be noted that the total number of pixels for constituting the predicted values calculating block is preferably made larger than the total number of pixels for constituting the class classifying block.

Also, when the above-explained block making process is carried out (similar to process operations other than block making), there are no corresponding pixels near the image frame of the image. In this case, for example, the process operation may be performed, assuming now that the same pixels as those for constituting the image frame are located outside this image frame.

The class classification adaptive processing circuit 43 is arranged by a class classifying unit 45, and an adaptive processing unit 46, and is designed to perform class classification adaptive processing operation.

A class classification adaptive processing operation implies that an input signal is classified into several classes based on features thereof, and then, an adaptive process operation suitable for each of these classes is executed for the input signal of each of these classes. Roughly speaking, this class classification adaptive process operation is subdivided into a class classification process operation and an adaptive process operation.

Now, both the class classification process operation and the adaptive process operation will be simply explained.

First, the class classification processing operation will now be explained.

Figure 9A:
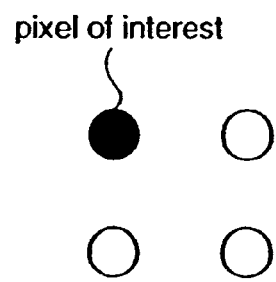
FIGS. 9(A) and 9(B) illustrate a class classifying process.
Figure 9B:
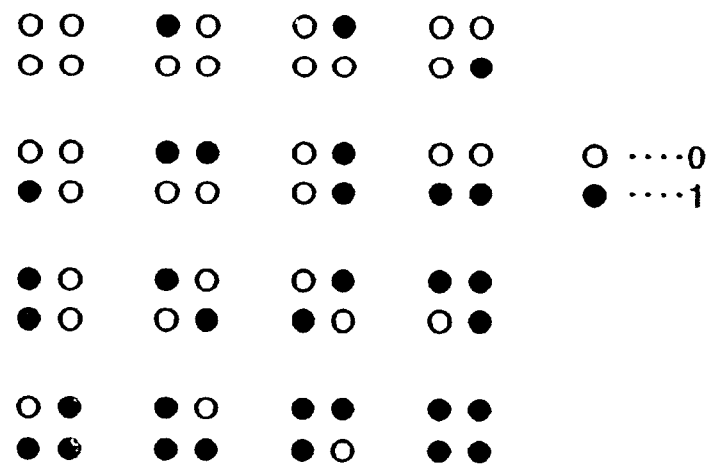

It is now assumed that, for instance, as indicated in FIG. 9(A), a block (class classifying block) made of 2×2 pixels is constructed of a pixel of interest, and three pixels located adjacent thereto, and each of these pixels is expressed by 1 bit (having any one of level "0" and level "1"). In this case, as indicated in FIG. 9(B), a block of 4 pixels (2×2) may be classified into 16 ($=(2_1)_4$), depending upon level distributions of the respective pixels. Such a pattern classification corresponds to the class classification process, which is performed in the class classifying unit 45.

It should be noted that the class classification process operation may be carried out, taking account of also activities (complexity of image), (strength of change) of an image (image within block).

Normally, in this example, for instance, 8 bits or more are allocated to each of pixels. Also, in this embodiment, as previously explained, the class classifying block is arranged by 5 pixels. As a result, when the class classification process operation is performed with respect to such a class classifying block constituted by the original (8-bit) pixels, this block is classified into such a huge number of classes, i.e., $(2^8)^5$.

Therefore, according to this embodiment, as previously explained, the bit number of the pixel is reduced (reduced from 8 bits to 2 bits) in the level limiting unit 31, so that the number of classes is deleted (1024 ($=(2^2)^5$)).

Subsequently, the adaptive process operation will now be described.

For instance, considering now that a predicted values E[y] of a pixel value "y" of the image is calculated by a linear primary coupling model. This linear primary coupling model is defined by pixel values $X_1$, $X_2$, - - - of several pixels located around this pixel value (will be referred to as "learning data" hereinafter, if required), and also linear coupling of preselected predictive coefficients $W_1$, $W_2$, - - - In this case, the predicted values E[y] may be expressed by the following formula:

$$E[y] = W_1 X_1 + W_2 X_2 + \cdots W_{25} X_{25} + W0 \tag{1}.$$

where symbol "W0" is an offset coefficient which is added so as to express E[y] by 8 bits, because the original 8-bit data "Xi" has been converted into the 2-bit data.

Thus, to generalize this formula, when a matrix W made of a set of the predictive coefficient w, a matrix X made of a set of the learning data, and a matrix Y' made of a set of the predicted values E[y] are defined by [formula 1], the following observation equation can be satisfied:

$$X = \begin{pmatrix} X_{11} & X_{12} & \ldots & X_1 n \\ X_{21} & X_{22} & \ldots & X_2 n \\ \ldots & \ldots & \ldots & \ldots \\ X_{ml} & X_{m2} & \ldots & X_{mn} \end{pmatrix} \tag{2}$$

$$W = \begin{pmatrix} W_1 \\ W_2 \\ \ldots \\ W_n \end{pmatrix}, Y' = \begin{pmatrix} E[y_1] \\ E[y_2] \\ \ldots \\ E[y_n] \end{pmatrix}$$

-continued $$XW = Y'.$$

Then, considering now that the predicted values E[y] approximated to the pixel value y of the original image data is obtained by applying the minimum squaring method to this observation equation. In this case, when a matrix Y made of a set of pixel values of the original image data (will be referred to as "teacher data" hereinafter, if necessary), and another matrix E made of a set of remainder of the predicted values [y] with respect to the pixel value y of the image are defined by [formula 2], the below-mentioned remainder equation may be satisfied from the formula (2):

$$E = \begin{pmatrix} e_1 \\ e_2 \\ \ldots \\ e_m \end{pmatrix}, Y = \begin{pmatrix} y_1 \\ y_2 \\ \ldots \\ y_n \end{pmatrix} \quad (3)$$

$$XW = Y + E.$$

In this case, a predictive coefficient Wi used to calculate the predicted values E[y] approximated to the pixel value y of the original image data may be calculated by minimizing the square error

[formula 3].

$$\sum_{i=1}^{m} e_i^2 \quad (3)$$

As a consequence, the above-described square error is differentiated by the predict coefficient Wi becomes 0, namely, the predictive coefficient Wi capable of satisfying the following formula becomes an optimum value used to calculate the predicted values E[y] approximated to the pixel value "y" of the original image data.

[formula 4]

$$e_1 \frac{\partial e_1}{\partial w_i} + e_2 \frac{\partial e_2}{\partial w_i} + \ldots + \frac{\partial e_m}{\partial w_i} = 0 \quad (i = 1, 2, \ldots, n). \quad (4)$$

Thus, firstly, since the formula (3) is differentiated by the predictive coefficient Wi, the below-mentioned formula can be satisfied:

[formula 5]

$$\frac{\partial e_1}{\partial w_i} = x_{i1}, \frac{\partial e_i}{\partial w_2} = x_{i2}, \ldots, \frac{\partial e_i}{\partial w_n} = x_{in}, \quad (i = 1, 2, \ldots, m). \quad (5)$$

Based on the formulae (4) and (5), formula (6) may be obtained:

[formula 6]

$$\sum_{i=1}^{m} e_i x_{i1} = 0, \sum_{i=1}^{m} e_i x_{i2} = 0, \ldots \sum_{i=1}^{m} e_i x_{in} = 0. \quad (6)$$

Furthermore, considering the relationship among the learning data "x", the predictive coefficient "w", the teacher data "y", and the remainder "e" contained in the remainder equation defined in the formula (3), it is possible to obtain the following normal equation from the formula (6):

[formula 7]

$$\begin{cases} \left(\sum_{i=1}^{m} x_{i1} x_{i1}\right) w_1 + \left(\sum_{i=1}^{m} x_{i1} x_{i2}\right) w_2 + \ldots + \left(\sum_{i=1}^{m} x_{i1} x_{in}\right) W_n = \left(\sum_{i=1}^{m} x_{i1} y_i\right) \\ \left(\sum_{i=1}^{m} x_{i2} x_{i1}\right) w_1 + \left(\sum_{i=1}^{m} x_{i2} x_{i2}\right) w_2 + \ldots + \left(\sum_{i=1}^{m} x_{i2} x_{in}\right) w_n = \left(\sum_{i=1}^{m} x_{i2} y_i\right) \\ \left(\sum_{i=1}^{m} x_{in} x_{i1}\right) w_1 + \left(\sum_{i=1}^{m} x_{in} x_{i2}\right) w_2 + \ldots + \left(\sum_{i=1}^{m} x_{in} x_{in}\right) w_n = \left(\sum_{i=1}^{m} x_{in} y_i\right). \end{cases} \quad (7)$$

The normal equations defined in the formula (7) may be established, the number of which is the same as that of the predictive coefficients w to be calculated. As a result, an optimum predictive coefficient w can be obtained by solving the formula (7). It should be noted that to solve the formula (7), for instance, the sweep-out method (Gauss—Jordan's erasing method) may be applied.

As previously described, the adaptive processing operations is carried out in such a manner that the optimum predictive coefficient w, and further, the predicted values E[y] approximated to the pixel value y of the original image data is calculated based on the formula (1) by using this predictive coefficient w. This adaptive processing operation is performed in the adaptive processing unit 46.

It should be noted that this adaptive processing operation is different from the interpolation processing operation. That is, in this adaptive processing operation, a component is reproduced which is contained in an original image data, but is not contained in a thinned image data. In other words, the adaptive processing operation is identical to the interpolation processing operation with employment of a so-called "interpolation filter", while considering only to the formula (1). However, since the predictive coefficient w corresponding to the tap coefficient of this interpolation filter is calculated by using the teacher data "y", namely the learning system, the component contained in the original image data can be reproduced. In view of this technical point, the adaptive processing operation may be referred to as a process operation with an image forming effect.

Figure 10:
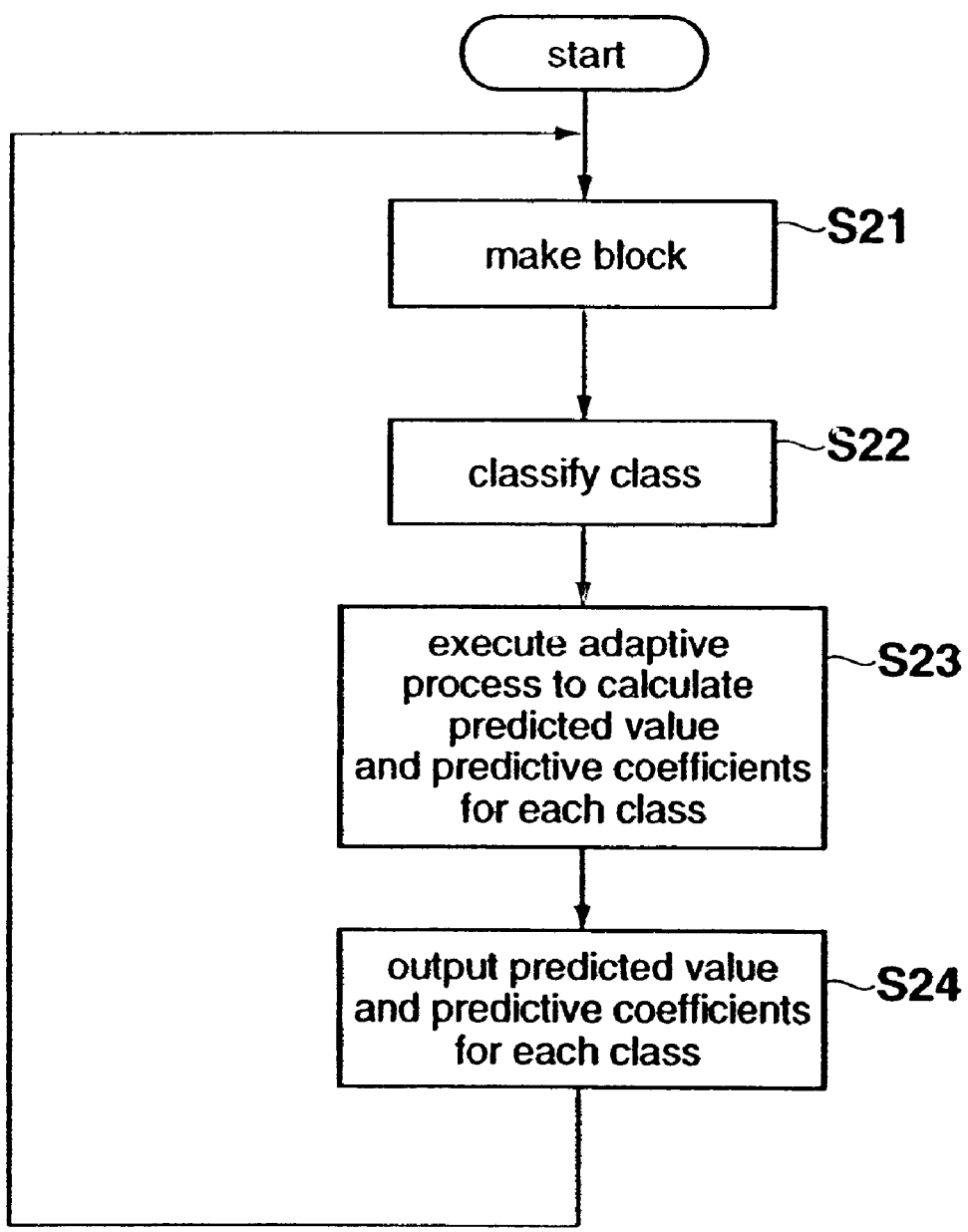
FIG. 10 is a flow chart illustrating the operation of the local decoder 22 of FIG. 8.

Referring now to a flow chart shown in FIG. 10, the operation of the local decoder 22 of FIG. 8 further explained.

First, in the local decoder 22, at a step S21, the corrected data derived from the compressing unit 21 is processed to make blocks. In other words, in the block making unit for class classification 41, the correction data is subdivided into a class classifying block made of 5 pixels centered about the noted corrected data, which will be then supplied to the class classification adaptive processing circuit 43. In the block making unit for the predicted values calculation 42, the corrected data is subdivided into a predicted values calculating block made of 5×5 pixels centered about the noted corrected data, which will be then supplied to the class classification adaptive processing circuit 43.

As previously explained, in addition to the class classifying block and the predicted values calculating block, the original image data is supplied to the class classification adaptive processing circuit 43. The class classifying block is supplied to the class classifying unit 45, and the prediction calculating block and the original image data are supplied to the adaptive processing unit 46.

At a step S22, the class classifying unit 45 performs the class classification processing operation with respect to the class classifying block. Namely, the class classifying unit 45 detects a state of distribution of each of the pixel levels in the block, and then judges to which class, this class classifying block belongs. This class judging result is supplied as class information to the adaptive processing unit 46.

It should be understood that in this embodiment, since the class classification processing operation is performed with respect to the class classifying block constructed of 5 pixels expressed by 2 bits, each of the class classifying blocks is classified into any one of 1024 classes ($=(2^2)^5$).

Then, the process operation is advanced to a step S23, at which the adaptive processing operation is carried out for each class based on the class information supplied from the class classifying unit 45 to the adaptive processing unit 46. As a result, both the predicted values and the predicted coefficients for each class of 1 frame of the original image data are calculated.

That is, according to this embodiment, for instance, 25×9 predictive coefficients for each class are calculated using the corrected data and the original image data for 1 frame, in such a case that an attention is made of one certain correction data, predicted values as to a total of 5 pixels, namely a pixel corresponding to this correction data of interest, and also 4 pixels adjacent to this pixel, are calculated by executing the adaptive processing operation with employment of the 25×9 predictive coefficients and the predicted values calculating block made of 5×5 pixels where the correction data of interest in centered in response to class information.

In concrete terms, for example, it is now assumed that class information C is outputted from the class classifying unit 45, and this class information C is related to a class classifying block constituted by 5 correction data $X_{23}$, $X_{32}$, $X_{33}$, $X_{34}$, $X_{43}$, where correction data $X_{33}$ shown in FIG. 7 is centered. Also, it is now assumed that as the predicted values calculating block corresponding to the class classifying block, a predicted values calculating block is outputted from the predicted values calculating block making unit 42. This prediction calculating block is arranged by $X_{11}$, $X_{12}$, $X_{13}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$, $X_{55}$, where correction data $X_{33}$ is centered. First, while the correction data for constituting this predicted values calculating block is set to the learning data, and the pixel values $Y_{33}$(1) to $Y_{33}$(9) of the 3×3 pixels (a portion surrounded by a rectangle in FIG. 7) where the corrected data $X_{33}$ is centered in the original image data are set to the teacher data, the normal equation indicated in the formula (7) may be established.

Moreover, for example, for 1 frame, the normal equation is similarly established as to other predicted values calculating blocks corresponding to other class classifying blocks which are classified into the class information C. When the normal equations are established by which a predictive coefficient $W_1(k)$ to a predictive coefficient $W_{25}(k)$ used to calculate a predicted values $E[Y_{33}(k)]$ of a pixel value $Y_{33}(k)$ (k=1, 2, - - - , 9) can be calculated, these normal equations are solved, so that an optimum predictive coefficient $w_1(k)$ to an optimum predictive coefficient $w_5(k)$ are calculated which are suitable for calculating the predicted values $[Y_{33}(k)]$ of the pixel value $Y_{33}(k)$ as to the class information C. The above-described predictive coefficients "w" require 26, since 25 pieces of the learning data for obtaining one predicted values are used and further, one offset coefficient is required in this embodiment. Also, the process operations for establishing the normal equations are executed at step S23 until the above-described number of normal equations can be obtained. The above processing is carried out for each class, 25×9 predictive coefficients are calculated. Then, in accordance with the below-mentioned formula corresponding to the formula (1), the predicted values $E[Y_{33}(k)]$ is obtained using 25×9 predictive coefficients corresponding to class information and the 25 pixels in the predicted value calculating block:

$$E[Y_{33}(k)] = w_1(k)X_{11} + w_2(k)X_{12} + w_3(k)X_{13} + w_4(k)X_{14} + \quad (8)$$
$$w_5(k)X_{15} + w_6(k)X_{21} + w_7(k)X_{22} + w_8(k)X_{23} +$$
$$w_9(k)X_{24} + w_{10}(k)X_{25} + w_{11}(k)X_{31} + w_{12}(k)X_{32} +$$
$$w_{13}(k)X_{33} + w_{14}(k)X_{34} + w_{15}(k)X_{35} + w_{16}(k)X_{41} +$$
$$w_{17}(k)X_{42} + w_{18}(k)X_{43} + w_{19}(k)X_{44} + w_{20}(k)X_{45} +$$
$$w_{21}(k)X_{51} + w_{22}(k)X_{52} + w_{23}(k)X_{53} + w_{24}(k)X_{54} +$$
$$w_{25}(k)X_{55} + w_0(k).$$

In step S23, after 25×9 predictive coefficients for each class are calculated, 3×3 predicted values are calculated in units of 3×3 pixels centered about the noted corrected data. Thereafter, in step S24, the 25×9 predictive coefficients for each class are provided to determining 24, and predicted values are provided to error calculator 23 for each unit of 3×3 pixels. Step S21 is then returned to and the same process is repeated thereafter, for example, for each one frame.

Figure 11:
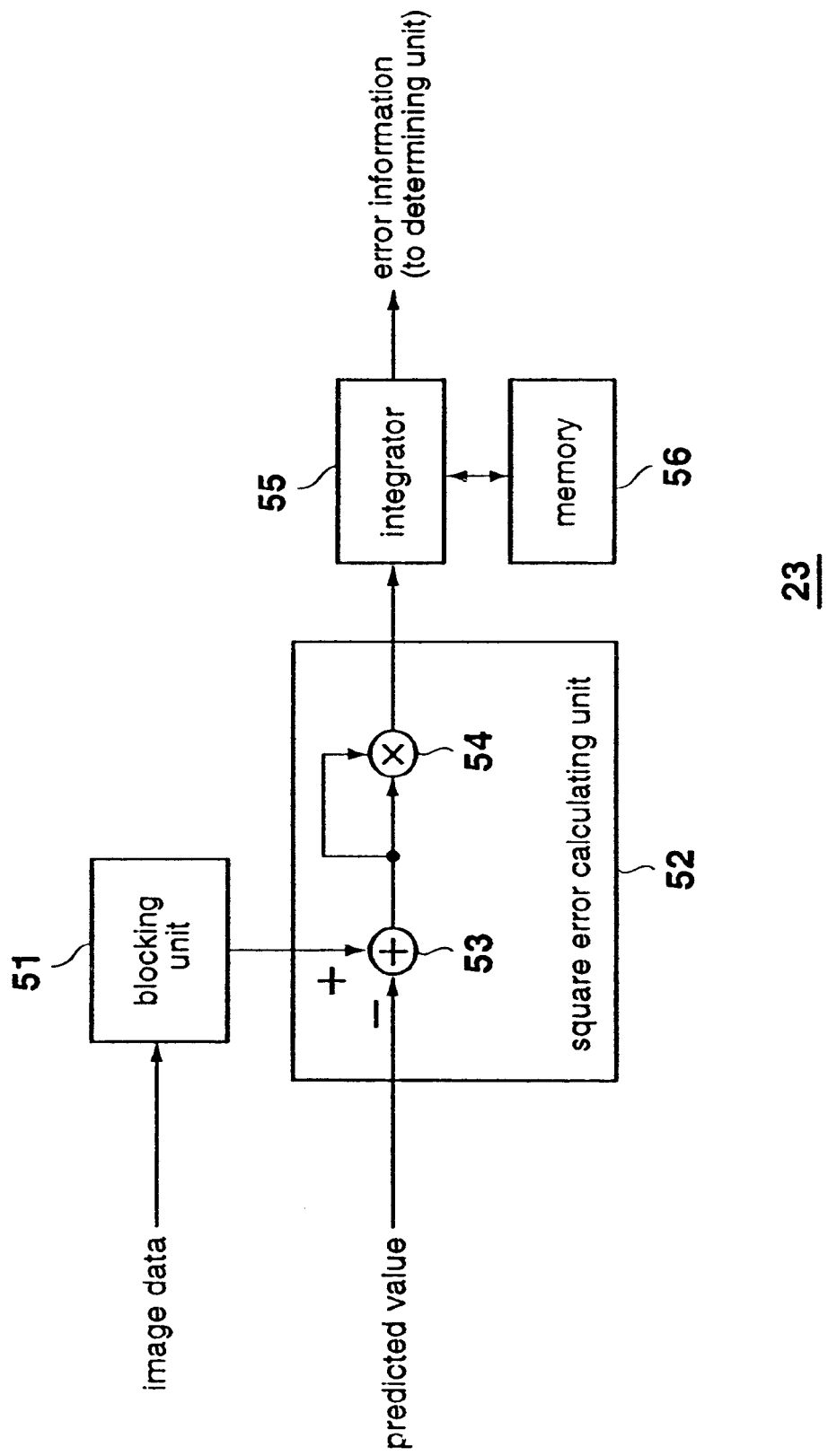
FIG. 11 is a block diagram of the error calculator 23 of FIGS. 3 and 28.

Next, FIG. 11 illustrates an example of an arrangement of the error calculator 23 of FIG. 3.

To the blocking, the original image data, is supplied. In this case, the blocking unit 51 processes the input image data to make 9 pixel blocks in correspondence with the predicted values outputted from the local decoder 22. The resultant image blocks (e.g., blocks of 3×3 pixels as surrounded by a rectangle in FIG. 7) constructed of 3×3 pixels are supplied from the block making unit 51 to a square error calculating unit 52. As previously explained, in addition to the blocks supplied from the block making unit 51, the predicted values derived from the local decoder 22 is supplied in unit of 9 pixels (block unit of 3×3 pixels) to the square error calculating unit 52. This square error calculating unit 52 calculates a square error as a prediction error of this predicted values with respect to the original image data, and then supplies this calculated square error to an integrator 55.

That is to say, the square error calculating unit 52 includes calculators 53 and 54. The calculator 53 subtracts the corresponding predicted values from each of the block-processed image data outputted from the block making unit 51, and then supplies this subtraction value to the calculator 54. The calculator 54 squares the output (a difference between original image data and predicted values thereof) of the calculator 53, and supplies the squared value to the integrator 55.

Upon receipt of the square error from the square error calculating unit 52, the integrator 55 reads a stored value of a memory 56, adds this stored value to the square error, and again supplies the added value to the memory 56 so as to be stored therein. Then, the above-described operation is repeated by the integrator 55, so that a multiplied value of the square error (error distribution). Furthermore, when the integration for a preselected amount (for instance, amount for 1 frame) of square errors is completed by the integrator 55, this integrator 55 reads out from this integrated value from the memory 56, and then supplies this integrated value as the error information to the determining unit 24. While the stored values of the memory 56 are cleared every time the process operation as to 1 frame is completed, the output values of the integrator 55 stored into this memory 56.

Figure 12:
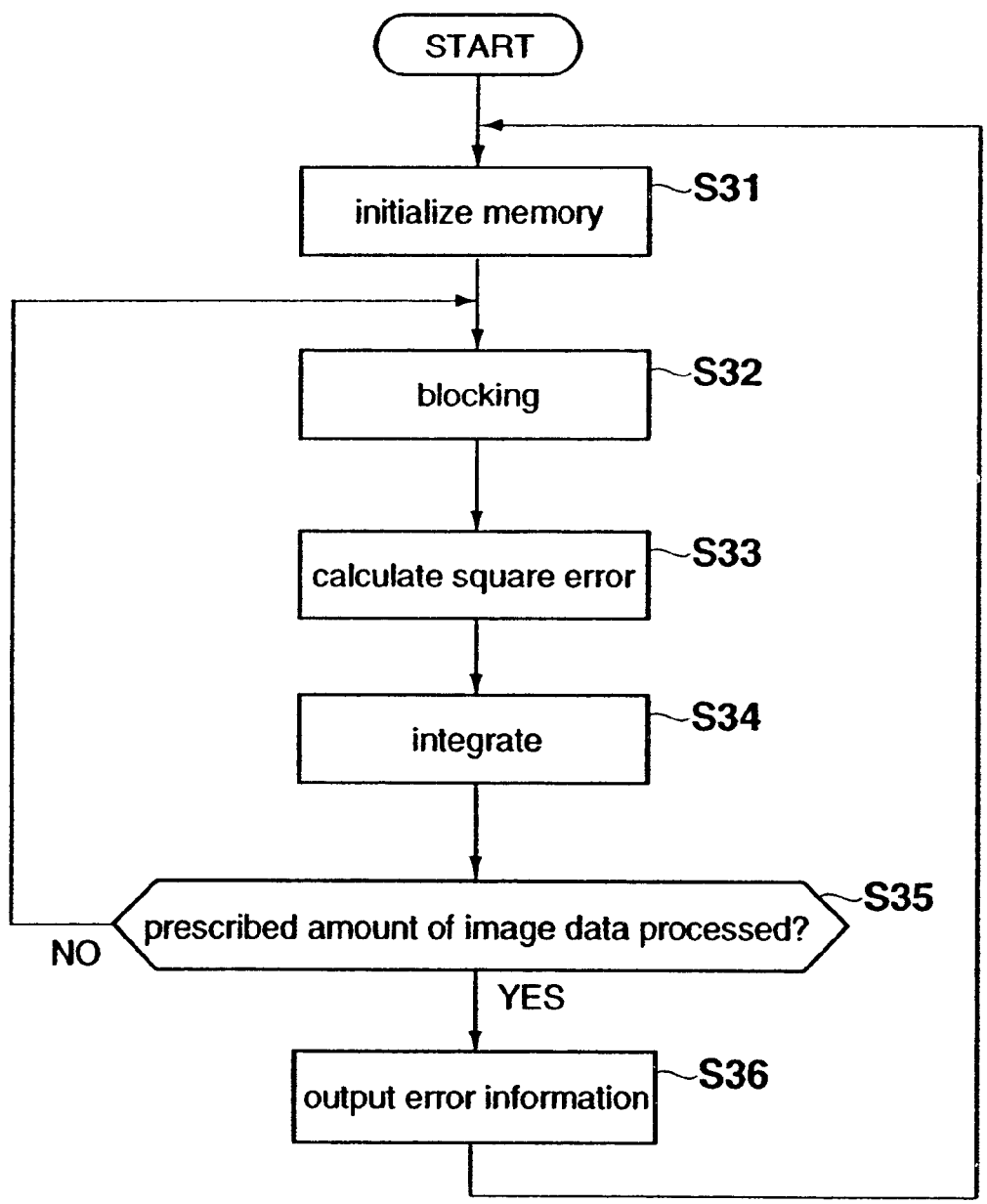
FIG. 12 is a flow chart illustrating the operations of the error calculator 23 of FIG. 11.

Referring now to a flow chart shown in FIG. 12, the operation of the error calculator 23 is further explained. First, at a step S31, in the error calculator 23, the stored value of the memory 56 is cleared to become, for example, "0". Then, the process operation is advanced to a step S32, at which the image data is block-processed in the above-described manner by the blocking unit 51, and the resulting block is supplied to the square error calculating unit 52. In the square error calculating unit 52, at a step S33, a calculation is made of the square error between the original image data, which constitutes the block supplied from the blocking unit 51, and the predicted values supplied from the local decoder 22.

In other words, at a step S33, in the calculator 53, the corresponding predication value is subtracted from each of the image data, which has been block-processed and supplied by the blocking unit 51, and then the subtraction value is furnished to the calculator 54. Further, at a step S33, the output from the calculator 53 is squared by the calculator 54, and the squared value is supplied to the integrator 55.

Upon receipt of the square error supplied from the square error calculating unit 52, the integrator 55 reads out the stored value of the memory 56, and integrates the value of the square error by adding this read stored value to the square error at a step S34. The integrated value of the square error integrated in the integrator 55 is supplied to the memory 56, and is overwritten on the preceding stored value so as to be stored.

Then, at a step S35, in the integrator 55, a judgment is made as to whether or not the integrations of the square errors as to a preselected amount, for instance, one frame data are completed. At the step S35, when it is so judged that the integrations of the square errors for 1 frame data are not accomplished, the process operation is returned to the step S32, at which the process operation defined from the step S32 is again repeated. At the step S35, when it is so judged that the multiplications of the square errors for 1 frame data are accomplished, the process operation is advanced to a step S36. At this step S36, the integrator 55 reads out the multiplied value of the square errors for 1 frame data, stored in the memory 56, and then outputs this multiplied value as the error information to the determining unit 24. Then, the process operation is returned to the step S31, at which the process operations defined from the step S31 are repeated.

As a consequence, in the error calculator 23, assuming now that the original image data is Yij(k), and the predicted values thereof processed from the corrected data in the local decoder 22 is E[Yij(k)], the error information Q may be calculated by executing a calculation in accordance with the following formula:

$$Q = \Sigma (Y_{ij}(k) - [Y_{ij}(k)])^2,$$

where symbol "Σ" implies a summation of 1 frame data.

Figure 13:
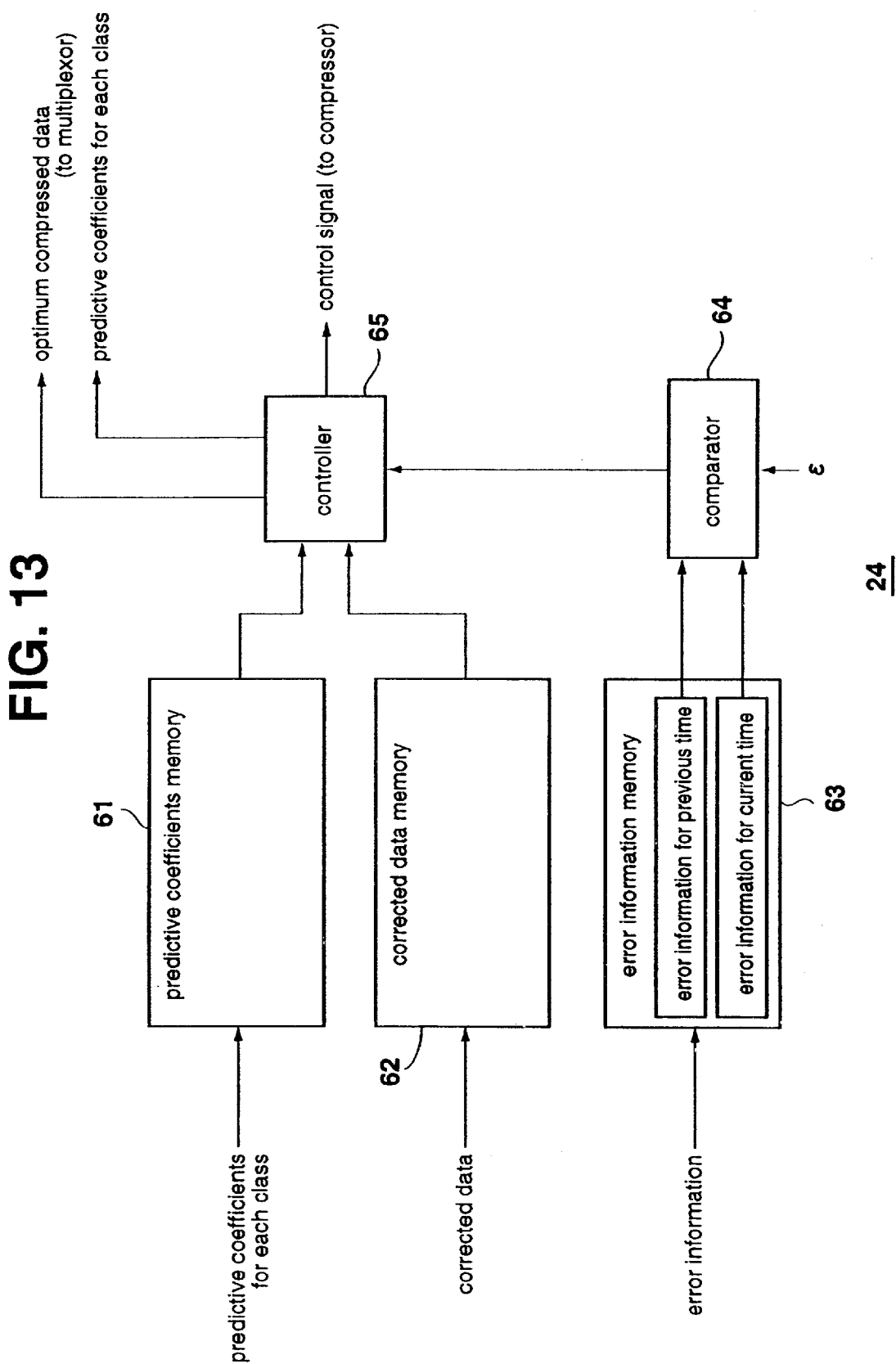
FIG. 13 is a block diagram of the determining unit 24 of FIG. 3.

Next, FIG. 13 represents an example of an arrangement of the determining unit 24 of FIG. 3.

A predictive coefficient memory 61 stores therein the predictive coefficients supplied from the local decoder 22. A corrected data memory 62 stores therein the corrected data supplied from the compressing unit 21.

It should be noted that when the compression data is newly corrected, and therefore the newly corrected data is supplied, the corrected data memory 62 stores therein the newly corrected data instead of the previously stored corrected data (namely, previous corrected data). Also, at such time that such a corrected data has been updated by the newly corrected data, a set of new predictive coefficients for each class corresponding to this newly corrected data is outputted from the local decoder 22. Also, in the predictive coefficient memory 61, in such a case that a new predictive coefficient for each class is supplied thereto in the above manner, this new predictive coefficient is stored instead of the previously stored predictive coefficient for each class (namely, preceding predictive coefficient for each class).

The error information memory 63 stores therein the error information supplied from the error calculator 23. It should also be noted that the error information memory 63 stores therein the error information which has been supplied from the error calculator 23 in the previous case, in addition to the presently supplied error information (even when the new error information is supplied, the previously stored error information is saved until the further new error information is supplied). Also, the content of the error information memory 63 is cleared every time the process operation for a new frame is commenced.

A comparator 64 compares a predetermined threshold value "ε" with the presently supplied error information stored in the error information memory 63, and further, may compare the presently supplied error information with the previously supplied error information, if required. A comparison result obtained from the comparator 64 is supplied to a controller 65.

The controller 65 judges whether or not the corrected data stored in the corrected data memory 62 is correctly (optimally) equal to the coded result of the original image data based on the comparison result obtained from the comparator 64. When it is recognized (judged) that the corrected data is not optimally equal to the coded result, the controller 65 supplies a control signal for requesting an output of new corrected data to the compressing unit 21 (correcting unit 21) (FIG. 5). To the contrary, when the controller 65 recognizes that the corrected data stored in the corrected data memory 62 is optimally equal to the coded result of the image, the predictive coefficient for each class stored in the predictive coefficient memory 61 is read out to be outputted to the multiplexor 25, and also the corrected data stored in the corrected data memory 62 is read to be outputted as the optimum corrected data to the multiplexor 25. Furthermore, in this case, the controller 65 outputs a control signal to the compressing unit 21, and this control signal indicates such a message that the coding operation for 1 frame image is accomplished. As a result, as previously explained, the controller 65 causes the compressing unit 21 to commence the process operation for the next frame.

Next, operations of the determining unit 24 is further described with reference to FIG. 14. At a first step S41, in the determining unit 24, the comparator 64 judges as to whether or not the error information is received from the error calculator 23. When the comparator 64 judges that the error information is not received, the process operation is returned to the step S41. On the other hand, when the comparator 64 judges that the error information is received, namely when the error information is stored in the error information memory 63, the process operation is advanced to a step S42. At this step S42, the comparator 64 compares a predetermined threshold value "ε" with the presently stored error information (present error information) so as to judge that any one of these values is larger.

At this step S42, when it is so judged that the present error information is larger than or equal to a predetermined threshold value "ε", the comparator 64 reads out the preceding error information stored in the error information memory 63. Then, at a step S43, the comparator 64 compares the preceding error information with the present error information so as to judge whether or not the preceding error information is larger than the present error information.

In such a case that the process operation for 1 frame image is commenced, and the error information is first supplied, since the preceding error information is not stored into the error information memory 63, in this case, the process operations defined after the step S43 will not be performed in the determining unit 24. The controller 65 outputs a control signal for controlling the correcting circuit 32 (FIG. 5) in order to output a predetermined initial address.

When it is so judged at the step S43 that the present error information is less than or equal to the preceding error information, namely, when the compression data is corrected to thereby reduce the error information, the process operation is advanced to a step S44. At this step S44, the controller 65 outputs to the correcting circuit 32, such a control signal for instructing that the correction value Δ is changed in a similar manner to that of the preceding case. Then, the process operation is returned to the step S41. To the contrary, when it is so judged at the step S43 that the present error information is larger than the preceding error information, namely when the error information is increased by correcting the compression data, the process operation is advanced to a step S45. At this step S45, the controller 65 outputs to the correcting circuit 32, such a control signal for instructing that the correction value Δ is changed in a manner opposite to that of the preceding case. Then, the process operation is returned to the step S41.

It should also be noted that when the continuously reduced error information is increased at certain timing, the controller 65 outputs such a control signal for instructing that the correction value Δ is decreased by, for example, ½, and is changed in a manner opposite to that of the previous case.

Then, since the process operations defined from the step S41 to the step S45 are repeated, the error information is decreased. As a result, in the case that it is so judged at the step S42 that the present error information is smaller than a predetermined threshold value "ε", the process operation is advanced to a step S46. At this step S46, the control circuit 64 reads out the predictive coefficient for each class stored in the predictive coefficient memory 61, and also reads out the corrected data of 1 frame stored in the corrected data memory 62. Then, these optimum compressed data and predictive coefficients for each class are supplied to the multiplexor 25, and the process operation is ended.

Figure 14:
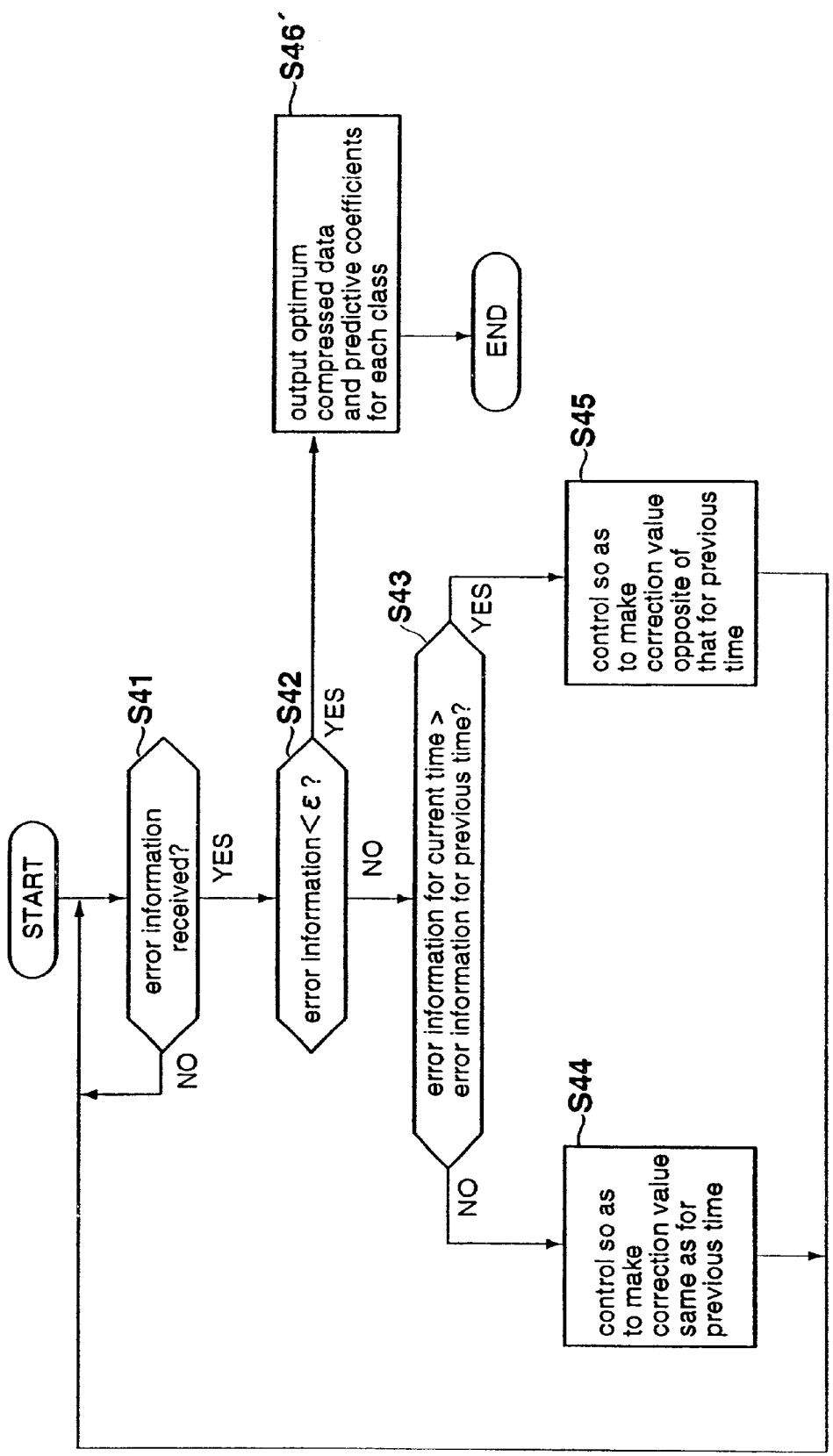
FIG. 14 is a flow chart illustrating the operation of the determining unit of FIG. 13.

Thereafter, the process operations are again repeated in accordance with a flow chart shown in FIG. 14, while waiting for the supply of the error information about the next frame.

It should also be noted that in the correcting circuit 32, as to the correction of the compression data, all of the compression data for 1 frame may be corrected, and only a portion of this compression data for 1 frame may be corrected. When only a portion of the compression data is carried out, for instance, the pixels capable of giving a strong influence to the error information is detected by the controller 65, and only the compression data about such pixels may be corrected. The pixels capable of giving the strong influence to the error information may be detected by way of the following manner, for instance. That is, first of all, the process operation is carried out by directly utilizing the level-controlled compression data as to the remaining pixels after thinning, so that this error information is acquired. Then, such a control signal is supplied from the controller 65 to the correcting circuit 32, by which executes a process operation for correcting the compression data as to the remaining pixels after thinning by the same correction value Δ every one pixel. The resulting error information is compared with such an error information that is obtained when the compression data is directly utilized. Then, a pixel about the error information where a comparison difference becomes larger than, or equal to a predetermined value may be detected as the pixel capable of giving the strong influence to the error information.

As previously described, the correcting operation of the compression data is repeated until the error information is reduced, or decreased smaller than a preselected threshold value "ε". The corrected data obtained when the error information becomes smaller than the preselected threshold value "ε" is outputted as the coded result of the image. Accordingly, in the receiving apparatus 4 (FIG. 1), it is possible to produce the decoded image (decoded image with high image quality) identical to (or, substantially identical to) the original image data from the corrected data (optimum corrected data) where the pixel values of the pixels for constituting the thinned image are made as the most proper values used to recover the original image data.

Since the image is compressed by way of the thinning process operation, and also by the level limiting process operation and the class classification adaptive process operation, it is possible to obtain the coded data with the very high compression rate. It should be noted that the above-explained coding process operation executed in the transmitting apparatus 1 may be referred to as a "combined coding process operation", since the compression process operation by the thinning operation is organically combined with the class classification adaptive process operation so as to realize the high efficiency compression.

Figure 15:
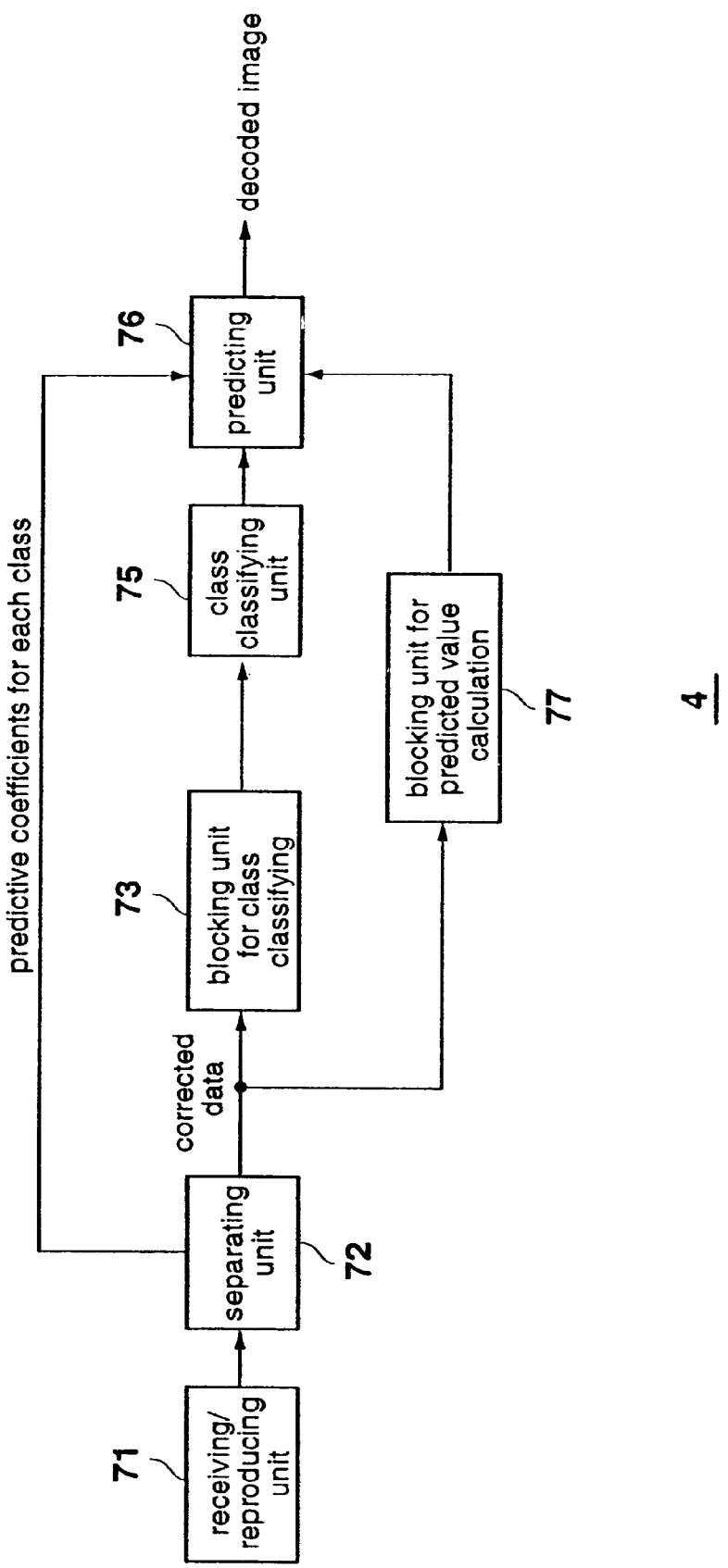
FIG. 15 is a block diagram of the receiving apparatus of FIG. 1 for use in connection with the transmitting apparatus of FIG. 3.

Referring now to FIG. 15, a decoder for use with the first embodiment of the invention is now described. FIG. 15 illustrates an example of an arrangement of the receiving apparatus 4 shown in FIG. 1.

In a receiving/reproducing unit 71, coded data recorded on the recording medium 2 is reproduced, or coded data transmitted via the transmission path 3 is received, and is supplied to a separating unit 72. In the separating unit 72, the coded data is separated into corrected data and a predicted coefficients for each class. The corrected data is supplied to a blocking unit for class classifying 73 and a blocking unit for predicted value calculation 77, whereas the predictive coefficients for each class are supplied to a predicting unit 76 and then are stored in a memory (not shown) for example.

It should be understood that the blocking unit for class classifying 73, the class classifying unit 75, or the blocking unit for predicted value calculation 77 are arranged similar to the class classification block circuit 41, the class classifying unit 45, or the predicted values calculation block making unit 42, shown in FIG. 8. As a result, in these blocks, a similar process operation to that of FIG. 8 is carried out. As a result, a predicted values calculating block is outputted from the blocking unit for predicted value calculation 77, or class information is outputted from the class classifying unit 75. These predicted values calculation block and class information are supplied to the predicting unit 76.

In the predicting unit 76, 25×9 predictive coefficients are read out from the memory (not shown) in response to class information, and a calculation is made of a 3×3 predicted values in accordance with the formula (1) by using the read predictive coefficient corresponding to the class information, and also the 5×5 correction data for constituting the predicted values calculation block supplied from the blocking unit for predicted value calculation 77. Then, an image for 1 frame constituted by such a predicted values is outputted as a decoded image. As previously explained, this decoded image is substantially equal to the original image.

It should also be noted that even when the receiving apparatus 4 as shown in FIG. 15 is not employed at the reception end, the normal interpolation is carried out without using the predictive coefficient by such an apparatus for decoding a thinned image by way of a simple interpolation, so that it is possible to obtain a decoded image. In this case, an image quality (resolution) of this resultant decoded image is deteriorated.

Second Embodiment

In the first embodiment of the invention, the predictive coefficient is obtained in the local decoder 22 of FIG. 3, and then the predicted values is calculated by using this predictive coefficient. Alternatively, the respective predicted values may be calculated without obtaining the predictive coefficient in the local decoder 22.

In further detail, a second embodiment of the invention is described with reference to the transmitting apparatus of FIG. 28, the compressing unit of FIG. 5, the local decoder of FIG. 16, the error calculator of FIG. 11, the determining unit of FIG. 13 and the learning device for predictive coefficients of FIG. 17. The receiving apparatus for use with this second embodiment is illustrated in FIG. 15. Except as otherwise noted, the compressing unit of FIG. 5, the error calculator of FIG. 11, the determining unit of FIG. 13 and the receiving apparatus of FIG. 15 operate as previously described with respect to the first embodiment of the invention.

Figure 28:
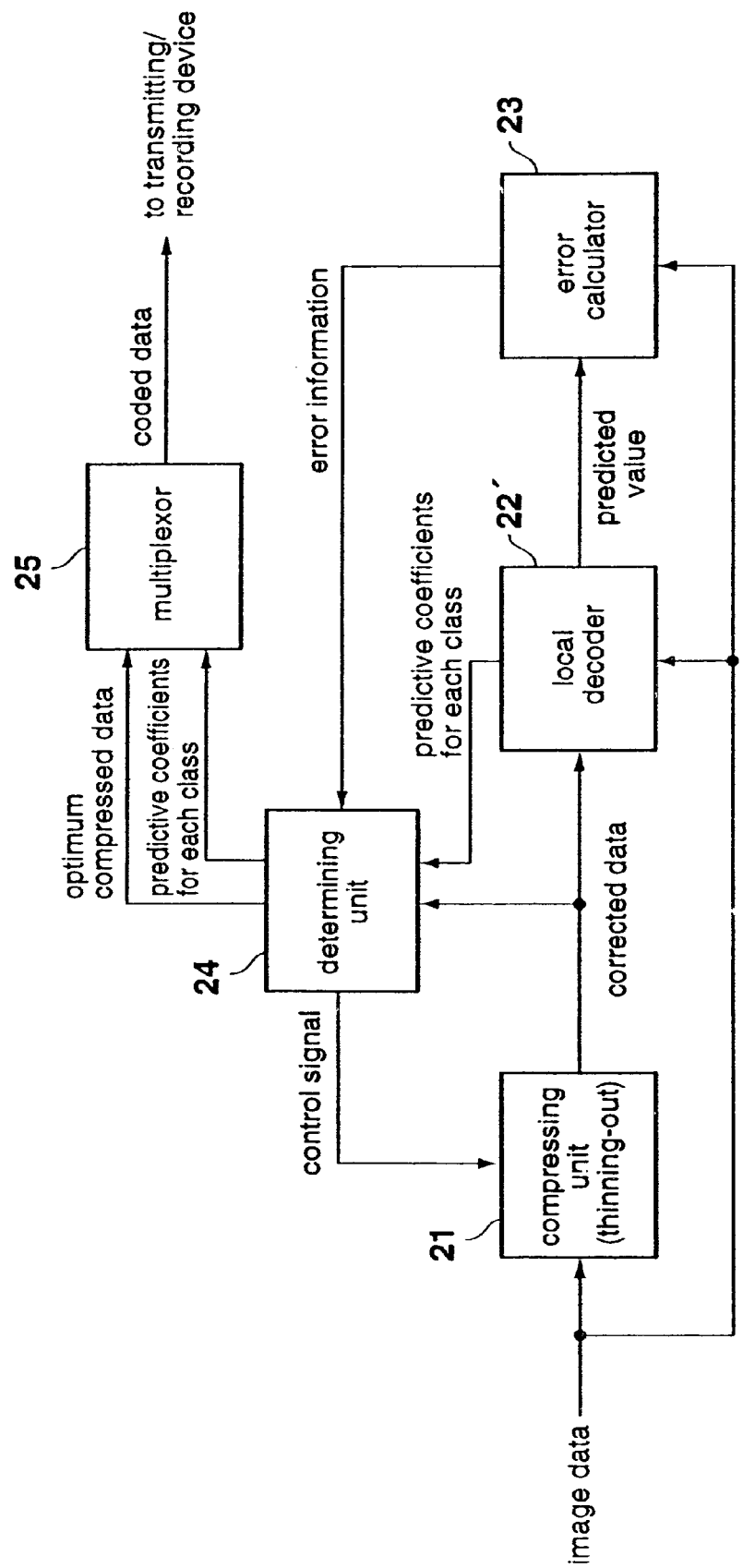
FIG. 28 is a block diagram of a transmitting apparatus according to a second embodiment of the invention.

With reference now to FIG. 28, the transmitting apparatus of the second embodiment differs from that of FIG. 3 in that the local decoder 22' of FIG. 28 operates differently from that of local decoder 22 of FIG. 3, as further explained below.

Figure 16:
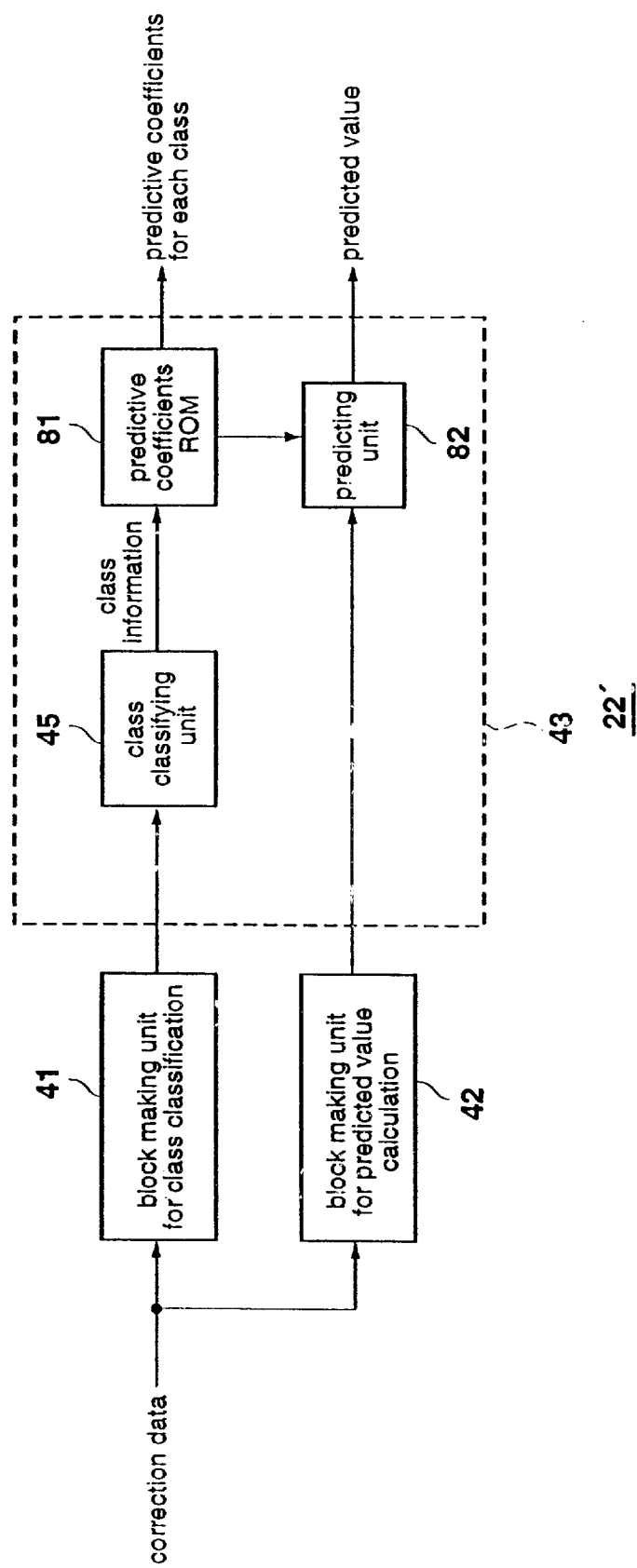
FIG. 16 is a block diagram of the local decoder 22' of FIG. 28.

Referring now to FIG. 16, FIG. 16 illustrates another embodiment of the local decoder 22 of FIG. 3. It should be understood that the same reference numerals shown in FIG. 8 will be employed as those for indicating the corresponding circuit portions. That is, instead of the adaptive processing circuit 46, a predictive coefficient ROM 81 and a predicting unit 82 are employed in the local decoder 22' of FIG. 16. Otherwise, other circuit arrangements thereof are similar to those of FIG. 8.

The predictive coefficient ROM 81 stores therein predictive coefficients with respect to classes, which have been obtained by way of learning (will be discussed later). Upon receipt of class information outputted from the class classifying unit 45, the predictive coefficient stored at an address corresponding to this class information is read out from this predictive coefficient ROM 81 and then is supplied to the predicting unit 82.

In the predicting unit 82, a calculation is made of a linear equation indicated in the formula (1) (concretely speaking, for example, formula (8)) by employing the predicted values calculating block derived from the block making unit for the predicted values calculation 42, and also the predictive coefficient ROM 81. As a result, a predicted values of the original image data is calculated.

As a result, in accordance with the class classification adaptive processing circuit 43 shown in FIG. 16, this predicted values can be calculated without employing the original images data. 25×9 predictive coefficients for each class stored in the predictive coefficients ROM 81 are outputted to determining unit 24 in the above embodiment.

As indicated in FIG. 16, when the local decoder 22' is arranged, the receiving apparatus 4 shown in FIG. 15 may be arranged in such a manner that the post stage of the receiving/reproducing apparatus 71 is constituted similar to the class classification processing circuit 43 of FIG. 16.

Figure 29:
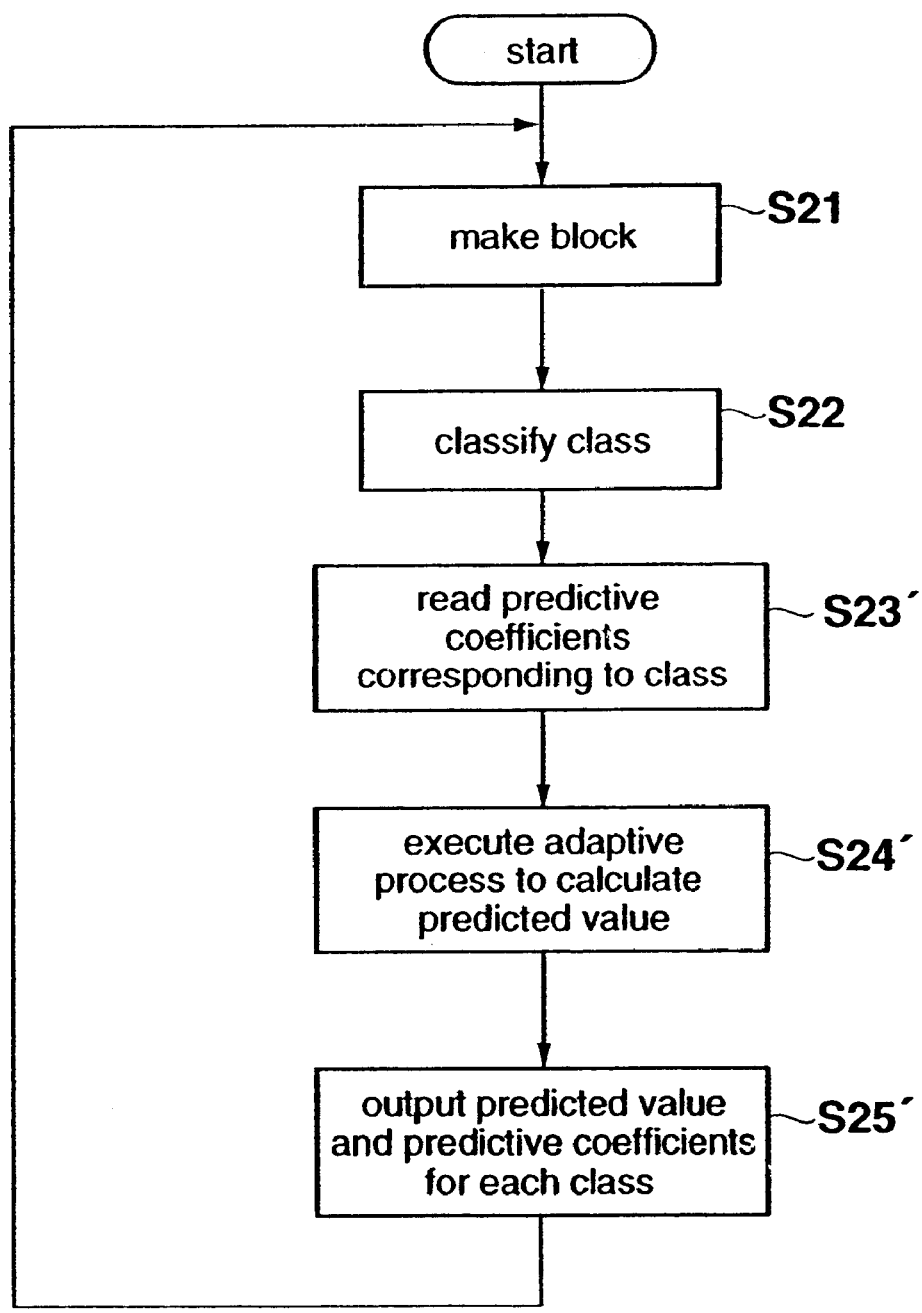
FIG. 29 is a flow chart illustrating the operation of the transmitting apparatus of FIG. 28.

With reference now to FIG. 29, the operation of the local decoder 22' of FIG. 16 is explained in further detail. First, in the local decoder 22', at a step S21, the corrected data derived from the compressing unit 21 is processed to make blocks. In other words, in the block making unit for class classification 41, the correction data is subdivided into a class classifying block made of 5 pixels centered about the noted corrected data, which will be then supplied to the class classification adaptive processing circuit 43. In the block making unit for the predicted value calculation 42, the corrected data is subdivided into a predicted values calculating block made of 5×5 pixels centered about the noted corrected data, which will be then supplied to the class classification adaptive processing circuit 43.

As previously explained, the class classifying block is supplied to the class classifying unit 45, and the prediction calculating block is supplied to the predicting unit 82.

At a step S22, the class classifying unit 45 performs the class classification processing operation with respect to the class classifying block. Namely, the class classifying unit 45 detects a state of distribution of each of the pixel levels in the block, and then judges to which class, this class classifying block belongs. This class judging result is supplied as class information to the predictive coefficient ROM 81.

It should be understood that in this embodiment, since the class classification processing operation is performed with respect to the class classifying block constructed of 5 pixels expressed by 2 bits, each of the class classifying blocks is classified into any one of 1024 classes $(=(2^2)^5)$.

Then, the process operation is advanced to a step S23', at which predictive coefficients corresponding to each class are read. In step 24' an adaptive process is executed by predicting unit 82 to calculate predictive values. In step S25', the predictive coefficients for each class are output by predictive coefficient ROM 81, while the predictive values are output by predicting unit 82. Step 21 is then returned to and the same process is repeated thereafter, for example, for each one frame.

Figure 17:
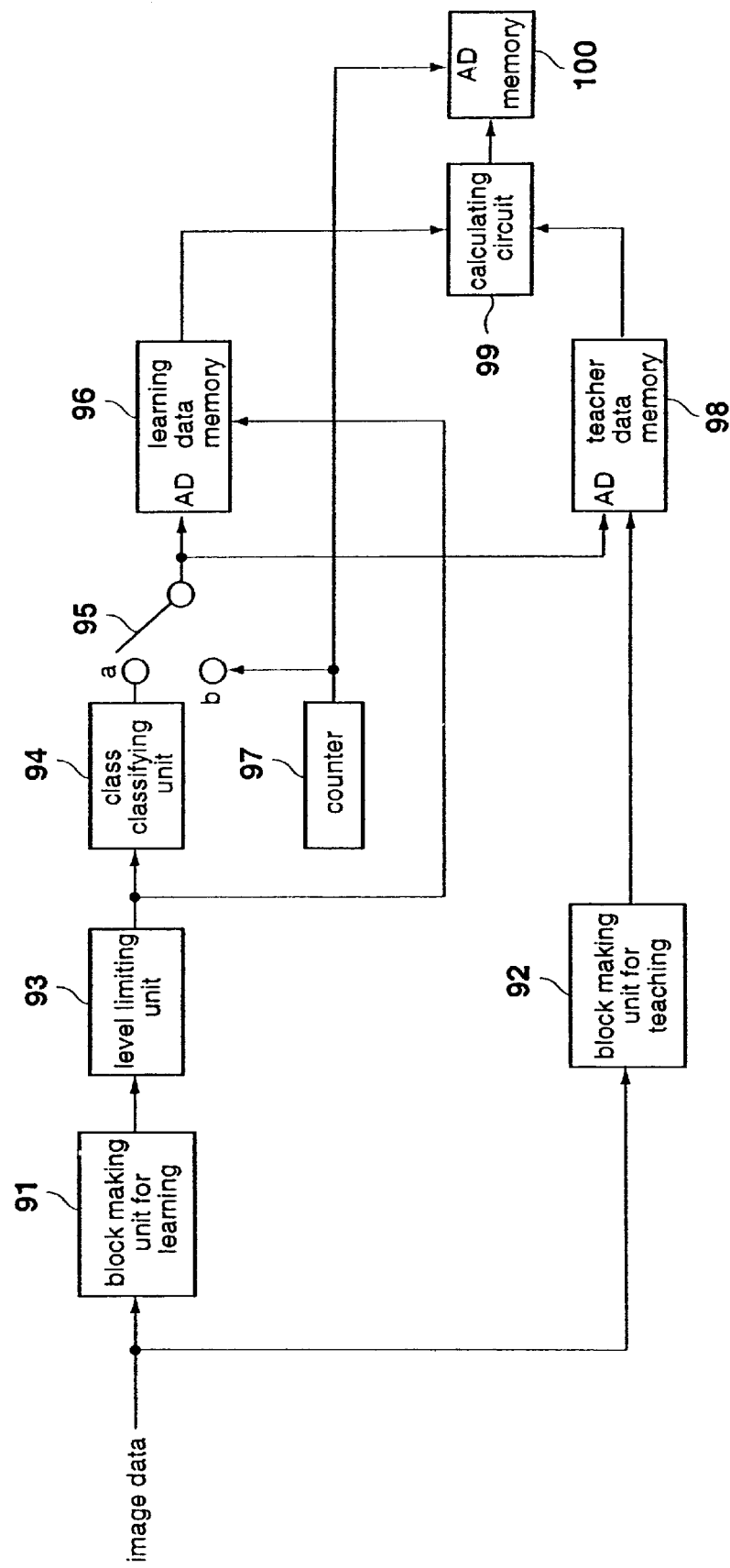
FIG. 17 is a block diagram of an embodiment of an image processing apparatus for calculating the predictive coefficients for storage in the predictive coefficient ROM 81 of FIG. 16.

Next, FIG. 17 illustrates a structural example of an image processing apparatus for executing a learning operation so as to obtain the predictive coefficients stored in the predictive coefficient ROM 81 shown in FIG. 16.

To a block making unit for learning 91 and a block making unit for teaching 92, image data for a learning purpose (learning image) (accordingly, image data before being thinned) is supplied which is used to obtain predictive coefficients applicable to any images.

The learning block making unit for learning 91 extracts, for instance, 25 pixels (5×5 pixels) of a positional relationship indicated by symbol "●" centered about the noted pixel in FIG. 7, from the inputted image data, and thereafter supplies a block constituted by these 25 pixels as a learning block to a level limiting unit 93. The level limiting circuit 93 limits the level of the inputted pixel data, and outputs the level-limited pixel data to a class classifying unit 94 and a learning data memory 96.

Also, in the block making unit for teaching 92, for example, a block constituted by 9 pixels (3×3 pixels) centered about the noted pixel is produced from the input image data, and then a block constituted by these 9 pixels is supplied as a teacher block to a teacher data memory 98.

It should also be noted that when the learning block constructed of, for example, the 25 pixels located in the positional relationship indicated by symbol "●" shown in FIG. 7 in the learning block making unit for learning 91, the teacher block of 3×3 pixels surrounded by a rectangle shown in FIG. 7 is produced from the block making unit for teaching 92.

The class classifying unit 93 extracts central 9 pixels (3×3 pixels) from the 25 pixels for constituting the learning block, and then executes a class classification with respect to the block made of these 9 pixels. The level limiting circuit 93 limits the level of the inputted pixel data, and outputs the level-limited pixel data to a class classifying unit 94 and a learning data memory 96. The resulting class information is supplied via a terminal "a" of a switch 95 to the learning data memory 96 and the teacher data memory 98.

In the learning data memory 96, or the teacher data memory 98, the learning block outputted from the level limiting circuit 93, or the teacher block outputted from the block making unit for teaching 92 is stored at an address (AD) corresponding to the class information supplied thereto.

As a result, assuming now that, for example, the block constituted by 5×5 pixels shown by symbol "●" in FIG. 7 is stored as the learning block at a certain address of the learning data block 96, the block constructed of 3×3 pixels indicated in this drawing and surrounded by the rectangle is stored as the teacher block at the same address as the above-described address.

Subsequently, a similar process operation is repeated as to all of the prepared learning images, so that the learning block and the teacher block are stored at the same addresses in the learning data memory 96 and the teacher data memory 98. The teacher block is arranged by 9 pixels, in which the predicted values is calculated in the local decoder 22 of FIG. 16 by employing the predicted values calculating block constituted by 25 corrected data having the same positional relationship as that of the 25 pixels for constituting this learning block.

Since a plurality of information is stored at the same addresses in the learning data memory 96 and the teacher data memory 98, a plurality of learning blocks and a plurality of teacher blocks can be stored at the same addresses.

When the learning blocks and the teacher blocks as to all of the learning images are stored into the learning data memory 96 and the teacher data 98, the switch 95 which has selected the terminal "a" is changes this terminal to another terminal "b", so that an output of a counter 97 is supplied as an address to the learning data memory 96 and the teacher data memory 98. The counter 97 counts a predetermined clock to output a count value thereof, whereas in the learning data memory 96, or the teacher data memory 98, either the learning block or the teacher block stored at an address corresponding to this count value is read out to be supplied to a calculating unit 99.

As a result, to the calculating unit 99, a set of learning blocks, and also a set of teacher blocks of the class corresponding to the count value of the counter 97 are supplied.

Upon receipt of a set of learning blocks and also a set of teacher blocks as to a certain class, the calculating unit 99 calculates a predictive coefficient capable of minimizing an error by way of the minimum square method by using these block sets.

In other words, for instance, assuming now that pixel values of pixels for constituting a learning block are $X_1$ $X_2$, $X_3$, - - - , and also predictive coefficients to be required are $w_1$, $w_2$, $w_3$, - - - , the predictive coefficients $w_1$, $w_2$, $w_3$, - - - , must satisfy the following formula in order to obtain a pixel value "y" of a certain pixel for constituting a teacher block by way of a linear equation of these values:

$$y = w_1 x_1 + w_2 x_2 + w_3 x_3 + \cdots + w_0$$

As a consequence, the predictive coefficients $w_1$, $w_2$, $w_3$, - - - , $w_0$ may be calculated in the calculating unit 99 in such a way that the normal equation indicated in the above-described formula (7) is established and solved, while these predictive coefficients minimize a square error of the predicted values $w_1 x_1 + w_2 x_2 + w_3 x_3 + \cdots + w_0$ with respect to a true value "y" from both the learning block in the same class and the teacher block corresponding thereto. Therefore, 25×9 predictive coefficients for each class are calculated by carrying out the above process for each class.

The predictive coefficients with respect to the respective classes, which are calculated in the calculating unit 99, are supplied to a memory 100. Into the memory 100, the count value is supplied from the counter 97 in addition to the predictive coefficients derived from the calculating unit 99. As a result, in the memory 100, the predictive coefficients derived from the calculating unit 99 are stored at the addresses corresponding to the count values outputted from the counter 97.

As described above, the optimum 25×9 predictive coefficients used to predict the 3×3 pixels of the block in this class are stored at the addresses corresponding to the respective classes in the memory 100.

The predictive coefficients for each class stored in the memory 100 in the above-described manner are stored in the predictive coefficient ROM 81 of FIG. 16. In the second embodiment, since predictive coefficients for each class are not calculated in the local decoder 22' of FIG. 16, it is possible to raise processing speed.

As indicated in FIG. 16, with the configuration of the local decoder 22', the receiving apparatus 4 shown in FIG. 15 may be arranged in such a manner that the post stage of the receiving/reproducing apparatus 71 is constituted similar to the class classification processing circuit 43 of FIG. 16.

Third Embodiment

In the first embodiment of the invention, the predictive coefficient is obtained in the local decoder 22 of FIG. 3, and then the predicted values is calculated by using this predictive coefficient. Alternatively, the respective predictive coefficients need not be calculated, but instead may be omitted from transmission and/or recording and then calculated within a receiving apparatus.

Figure 36:
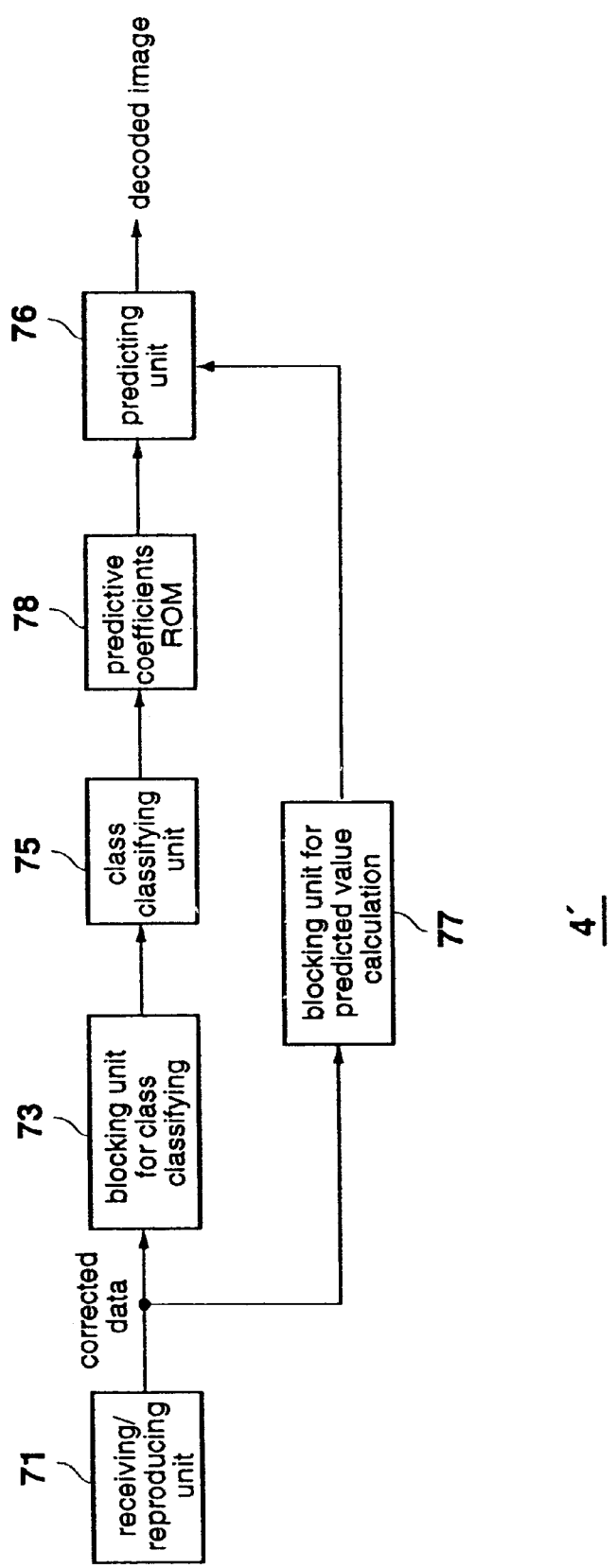
FIG. 36 is a block diagram of a receiving apparatus of FIG. 1 for use in connection with the transmitting apparatus of FIG. 30.

In further detail, a third embodiment of the invention is described with reference to the transmitting apparatus of FIG. 30, the compressing unit of FIG. 5, the local decoder of FIG. 32, the error calculator of FIG. 11 and the determining unit of FIG. 34. The receiving apparatus for use with this third embodiment is illustrated in FIG. 36. Except as otherwise noted, the compressing unit of FIG. 5 and the error calculator of FIG. 11 operate as previously described with respect to the first embodiment of the invention.

Figure 30:
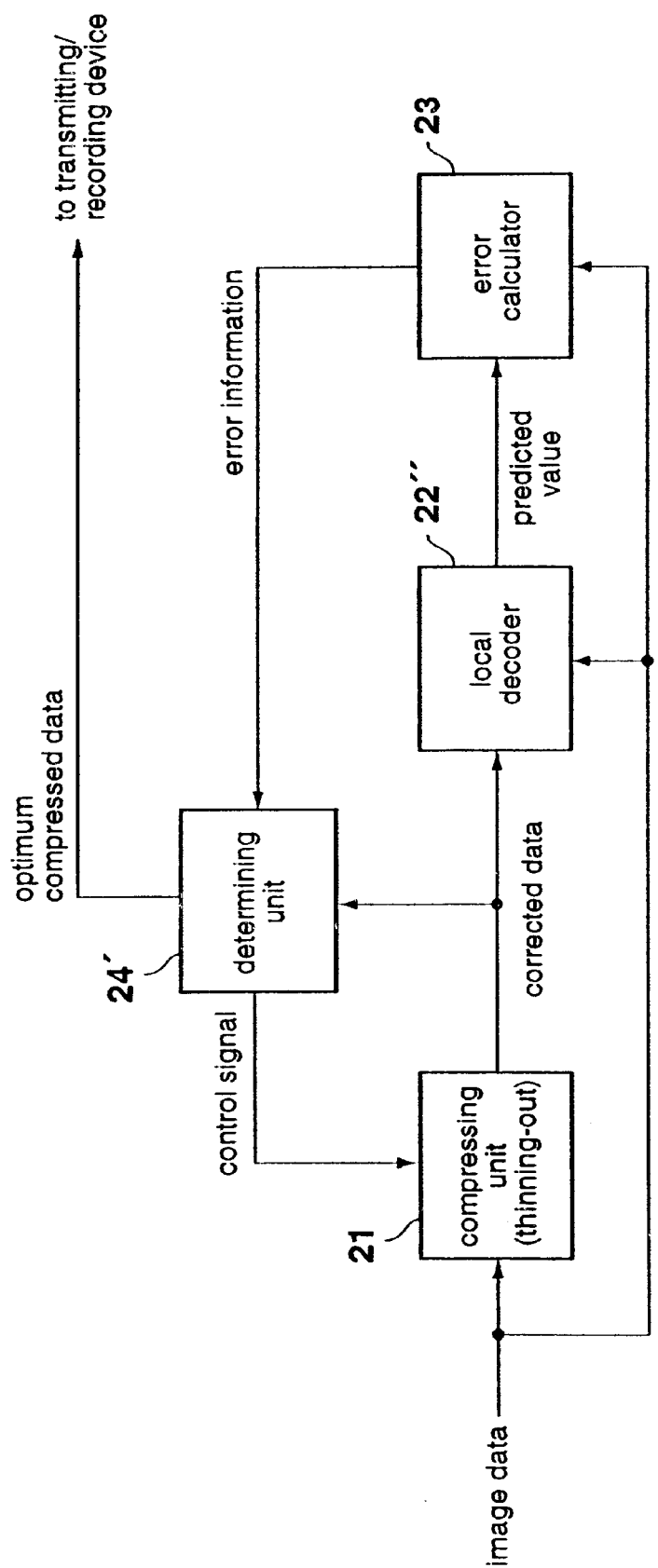
FIG. 30 is a block diagram of a transmitting apparatus according to a third embodiment of the invention.

With reference now to FIG. 30, the transmitting apparatus of the third embodiment differs from that of FIG. 3 in that the local decoder 22" of FIG. 28 operates differently from that of local decoder 22 of FIG. 3, as further explained below. Furthermore, the determining unit 24' of FIG. 30 does not output predictive coefficients for each class, and therefore, there is no need for a multiplexor 25 as in FIGS. 3 and 28.

Figure 31:
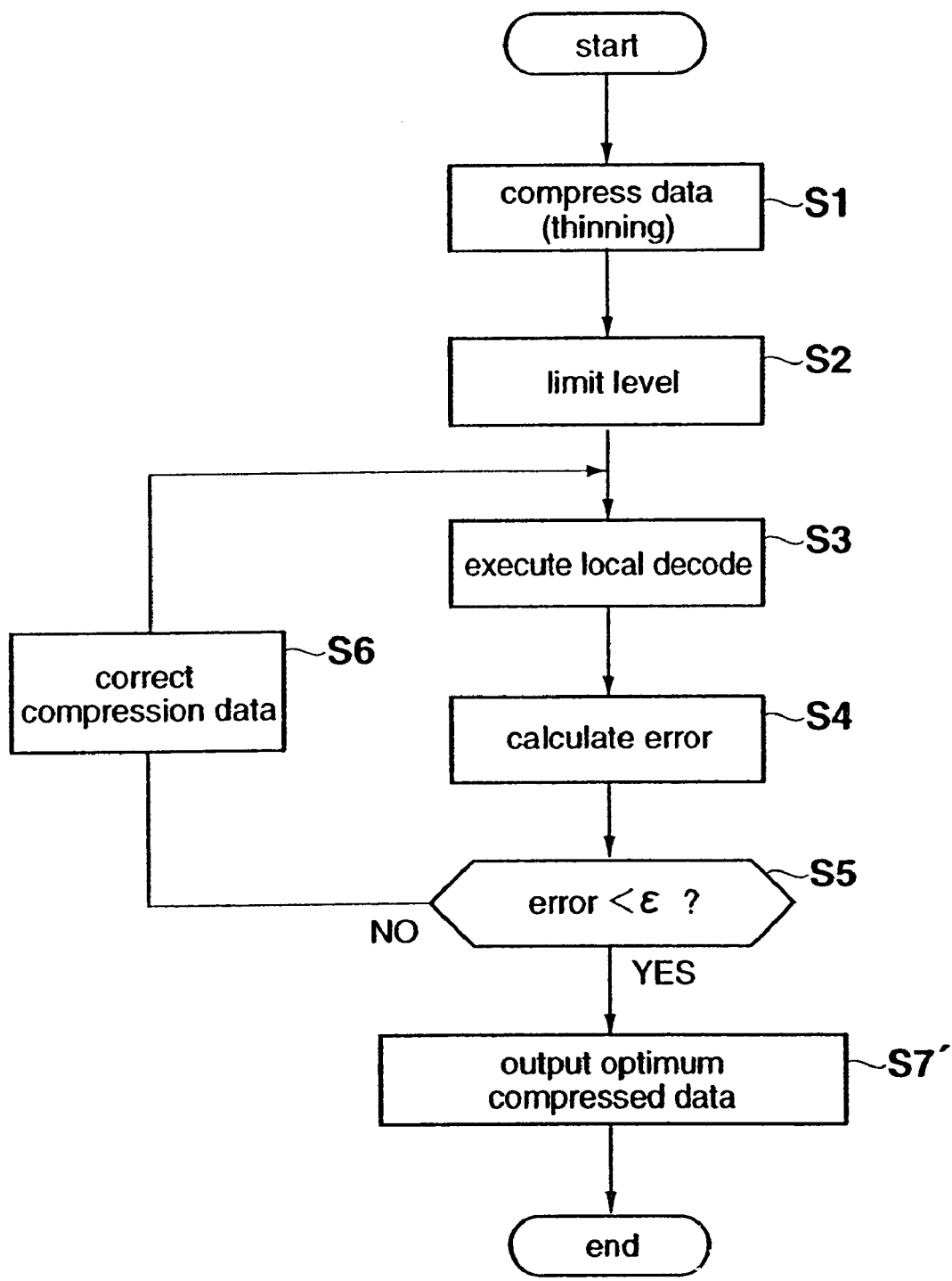
FIG. 31 is a flow chart illustrating the operation of the transmitting apparatus of FIG. 30.

With reference now to FIG. 31, the operation of the transmitting apparatus of FIG. 30 is explained. When the image data is supplied to the compressing unit 21, the compressing unit 21 first compresses this image data, at a step S1, while thinning the image data (namely, extracting plural pixels from a large number of pixels). At a step S2, levels of the extracted pixel data are limited by extracting 2 bits of this pixel data on the MSB side thereof. Then, this pixel data is outputted to the local decoder 22" and the determining unit 24 without any correction in the beginning. In the local decoder 22", at a step S3, the corrected data derived from the compressing unit 21 is locally decoded. This corrected data is equal to such a compression data that, as previously explained, the image data is simply thinned and also level-controlled in the beginning.

At the step S3 the predicted values are calculated. The predicted values calculated in the local decoder 22" are supplied to the error calculator 23.

In this case, an image constructed of the predicted values outputted from the local decoder 22" is identical to the decoded image obtained on the side of the receiving apparatus 4 (FIG. 1).

When the predicted values of the original image data are received from the local decoder 22" by the error calculator 23, at a step S4, the error calculator 23 calculates the prediction error of the predicted values derived from the local decoder 22" with respect to the original image data, and supplies this prediction error as the error information to the determining unit 24'. When the error information is received from the error calculator 23, the determining unit 24' judges at a step S5 as to whether or not the corrected data outputted from the compressing unit 21 is correctly equal to the coded result of the original image.

In other words, at a step S5, for instance, a judgment is made as to whether or not the error information is less than a predetermined threshold value "$\epsilon$". At the step S5, when it is so judged that the error information is not less than the predetermined threshold value "$\epsilon$", a recognition is made that the corrected data outputted from the compressing unit 21 is not equal to the coded data of the original image. Then, the process operation is advanced to a step S6 at which the determining unit 24' controls the compressing unit 21 so as to correct the compression data. The compressing unit 21 varies a correction amount (namely, correction value "$\Delta$" will be discussed later) under control of the determining unit 24' in order to correct the data. The resultant corrected data is outputted to the local decoder 22" and the determining unit 24'. Then, the process operation is returned to the previous step S3, and a similar process operation will now be repeatedly carried out.

On the other hand, at the step S5, when it is so judged that the error information is less than the predetermined threshold value "$\epsilon$", a recognition that the corrected data outputted from the compressing unit 21 is correctly equal to the coded result of the original image data. The determining unit 24 outputs as optimum compressed data when the error information less than the predetermined threshold value "$\epsilon$". Then, the process is ended.

As previously explained, since the corrected data produced by correcting the compression data, such a condition that the error information becomes less than a preselected threshold value "$\epsilon$" is used as the coded result of the original image data, it is possible to obtain such an image substantially identic al to the original image data based on this corrected data on the side of the receiving apparatus.

Figure 32:
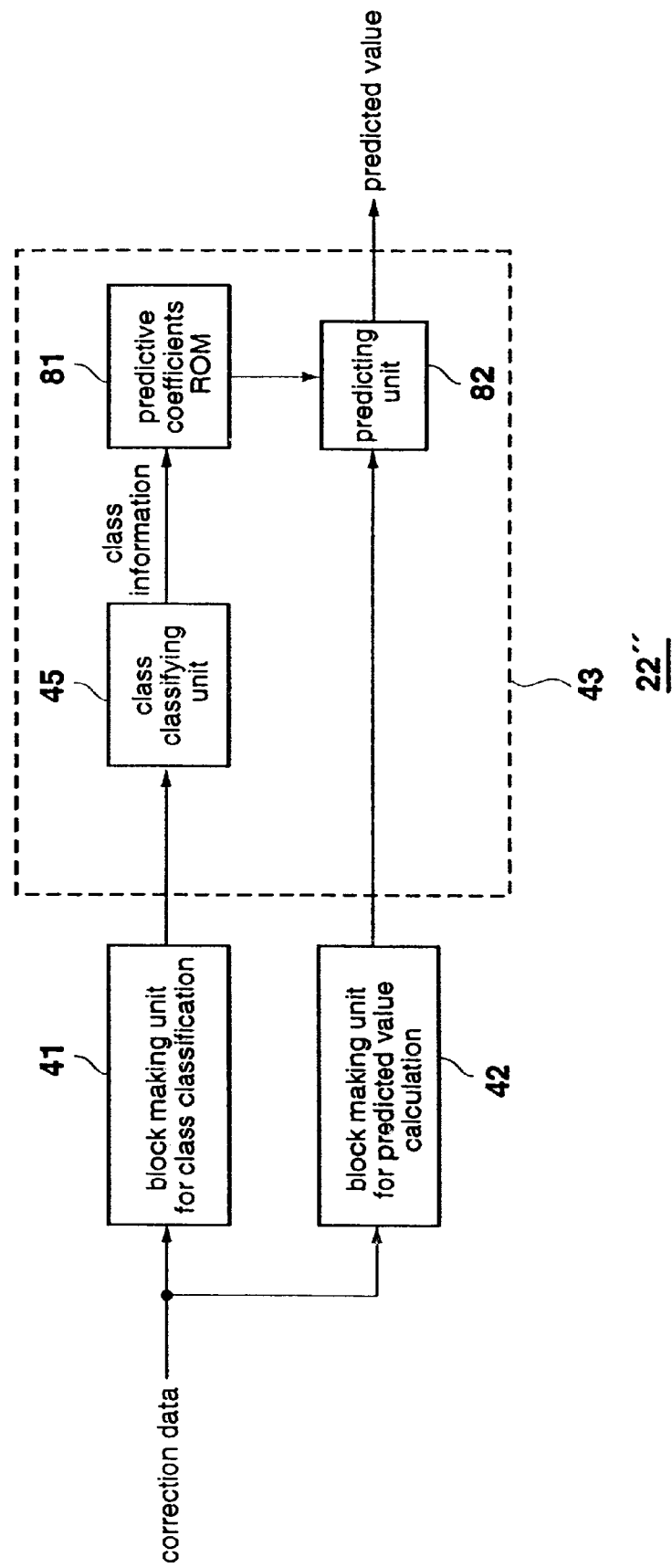
FIG. 32 is a block diagram of a local decoder 22" of the transmitting apparatus of FIG. 29.

Referring now to FIG. 32, a block diagram of the local decoder 22" is shown. In contrast to the local decoder 22' of FIG. 16 (of the second embodiment) the local decoder 22" does not output from predictive coefficients ROM 81' predictive coefficients for each class.

Figure 33:
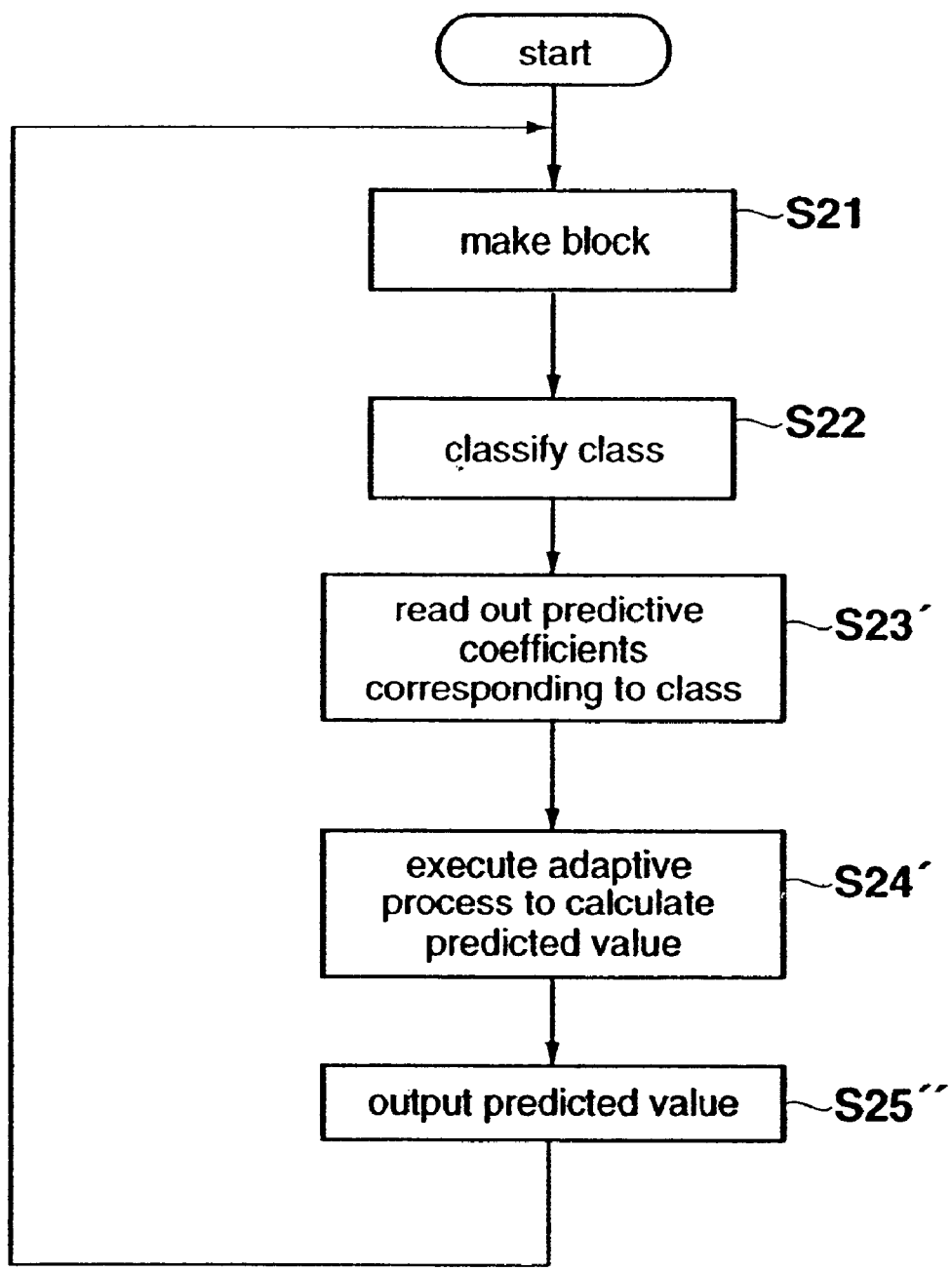
FIG. 33 is a flow chart illustrating the operation of the local decoder 22" of FIG. 32.

With reference now to FIG. 33, the operation of the local decoder 22" of FIG. 32 is explained. First, in the local decoder 22", at a step S21, the corrected data derived from the compressing unit 21 is processed to make blocks. In other words, in the block making unit for class classification 41, the correction data is subdivided into a class classifying block made of 5 pixels centered about the noted corrected data, which will be then supplied to the class classification adaptive processing circuit 43. In the block making unit for the predicted value calculation 42, the corrected data is subdivided into a predicted values calculating block made of 5×5 pixels centered about the noted corrected data, which will be then supplied to the class classification adaptive processing circuit 43.

As previously explained, the class classifying block is supplied to the class classifying unit 45, and the prediction calculating block is supplied to the adaptive processing unit 46.

At a step S22, the class classifying unit 45 performs the class classification processing operation with respect to the class classifying block. Namely, the class classifying unit 45 detects a state of distribution of each of the pixel levels in the block, and then judges to which class, this class classifying block belongs. This class judging result is supplied as class information to the predictive coefficient ROM 81.

It should be understood that in this embodiment, since the class classification processing operation is performed with respect to the class classifying block constructed of 5 pixels expressed by 2 bits, each of the class classifying blocks is classified into any one of 1024 classes (= $(2^2)^5$).

Then, the process operation is advanced to a step S23', at which predictive coefficients corresponding to each class are read. In step 24' an adaptive process is executed by predicting unit 82 to calculate predictive values. In step S25", the predictive values are output by predicting unit 82. Step 21 is then returned to and the same process is repeated thereafter, for example, for each one frame.

Figure 34:
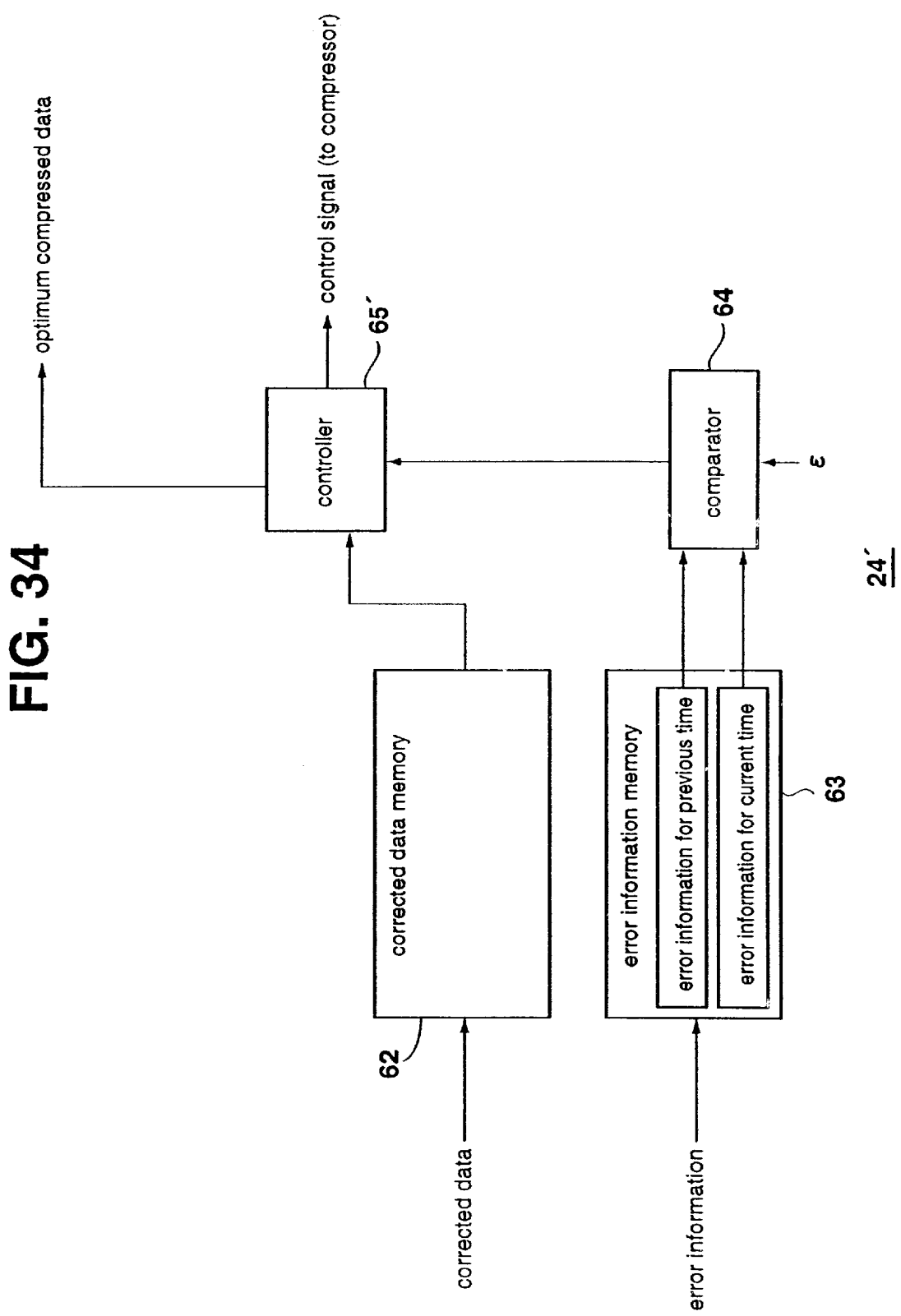
FIG. 34 is a block diagram of a determining unit 24' of the transmitting apparatus of FIG. 30.

Referring now to FIG. 34, the determining unit 24' of the third embodiment is explained. In contrast to the determining unit of both the first and second embodiments as illustrated in FIG. 13, the controller 65' of FIG. 34 does not output predicted coefficients for each class. Furthermore, the determining unit 24' does not include a predictive coefficient memory as shown at 61 of FIG. 13.

Figure 35:
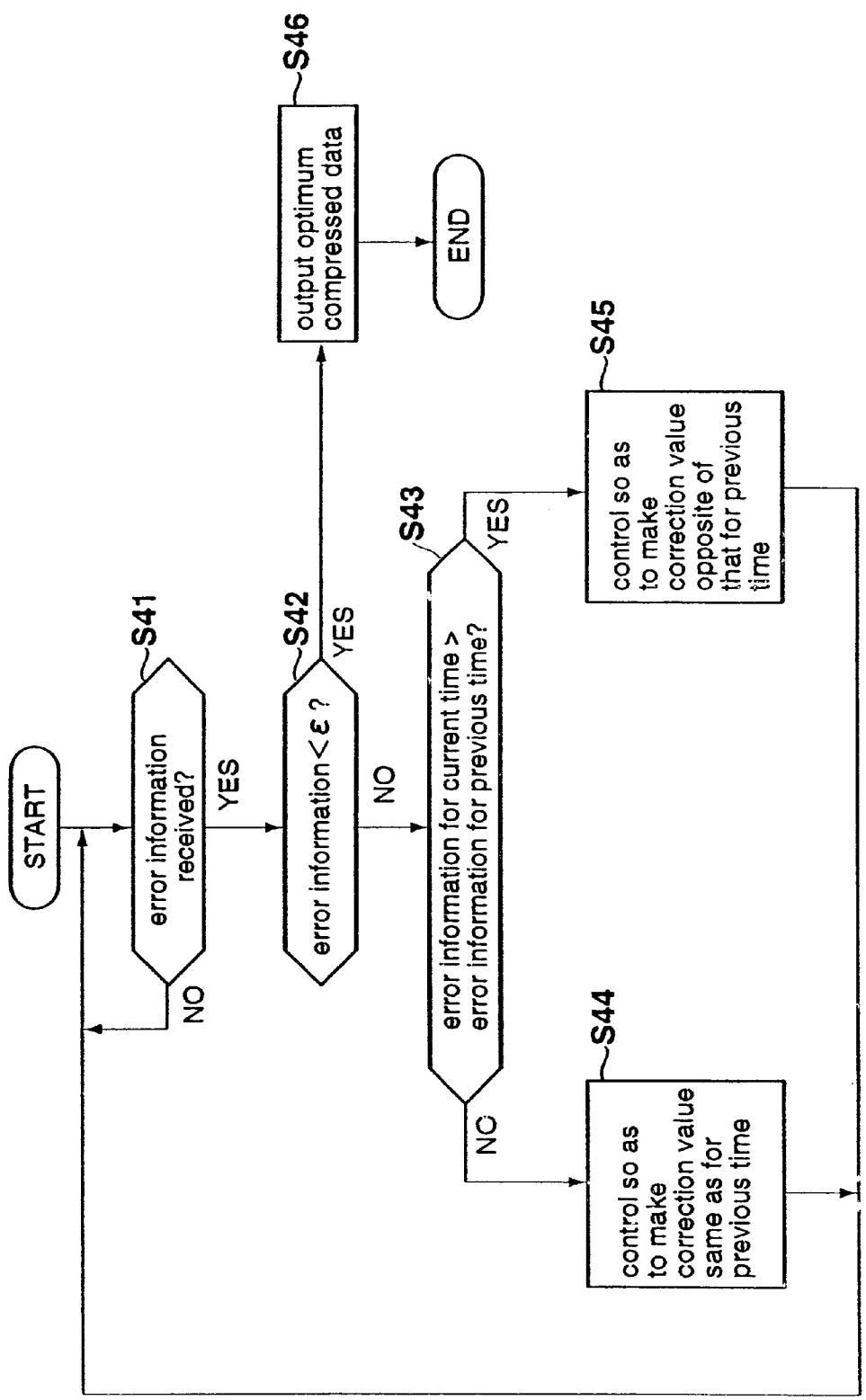
FIG. 35 is a flow chart illustrating the operation of transmitting apparatus of FIG. 34.

With reference to FIG. 35, the operation of the determining unit 24' of FIG. 34 is further explained. As with the determining unit of FIG. 13, at a first step S41, in the determining unit 24', the comparator 64 judges as to whether or not the error information is received from the error calculator 23. When the comparator 64 judges that the error information is not received, the process operation is returned to the step S41. On the other hand, when the comparator 64 judges that the error information is received, namely when the error information is stored in the error information memory 63, the process operation is advanced to a step S42. At this step S42, the comparator 64 compares a predetermined threshold value "$\epsilon$" with the presently stored error information (present error information) so as to judge that any one of these values is larger.

At this step S42, when it is so judged that the present error information is larger than or equal to a predetermined threshold value "$\epsilon$", the comparator 64 reads out the preceding error information stored in the error information memory 63. Then, at a step S43, the comparator 64 compares the preceding error information with the present error information so as to judge whether or not the preceding error information is larger than the present error information.

In such a case that the process operation for 1 frame image is commenced, and the error information is first supplied, since the preceding error information is not stored into the error information memory 63, in this case, the process operations defined after the step S43 will not be performed in the determining unit 24. The controller 65 outputs a control signal for controlling the correcting circuit 32 (FIG. 5) in order to output a predetermined initial address.

When it is so judged at the step S43 that the present error information is less than or equal to the preceding error information, namely, when the compression data is corrected to thereby reduce the error information, the process operation is advanced to a step 44. At this step S44, the controller 65 outputs to the correcting circuit 32, such a control signal for instructing that the correction value Δ is changed in a similar manner to that of the preceding case. Then, the process operation is returned to the step S41. To the contrary, when it is so judged at the step S4 that the present error information is larger than the preceding error information, namely when the error information is increased by correcting the compression data, the process operation is advanced to a step S45. At this step S45, the controller 65 outputs to the correcting circuit 32, such a control signal for instructing that the correction value Δ is changed in a manner opposite to that of the preceding case. Then, the process operation is returned to the step S41.

It should also be noted that when the continuously reduced error information is increased at certain timing, the controller 65 outputs such a control signal for instructing that the correction value Δ is decreased by, for example, ½, and is changed in a manner opposite to that of the previous case.

Then, since the process operations defined from the step S41 to the step S45 are repeated, the error information is decreased. As a result, in the case that it is so judged at the step S42 that the present error information is smaller than a predetermined threshold value "ϵ", the process operation is advanced to a step S46. At this step S46, the control circuit 64 reads out the corrected data of 1 frame stored in the corrected data memory 62. Then, the optimum compressed data are supplied to the transmitting/recording device, and the process is ended.

Thereafter, the process operations are again repeated in accordance with the flow chart shown in FIG. 34, while waiting for the supply of the error information about the next frame.

With reference now to FIG. 36, a receiving apparatus 4' for use with the third embodiment is explained. In contrast to the receiving apparatus of the first and second embodiments (FIG. 15), since predictive coefficients for each class are not provided to the receiving/reproducing unit 71, there is no need for a separating unit 72 as in FIG. 15. Furthermore, since predictive coefficients for each class are not provided to the receiving/reproducing unit 71, a predictive coefficients ROM 78 is utilized to provide predictive coefficients for each class to the predicting unit 76. Otherwise, the operation of the receiving apparatus 4' of FIG. 36 is the same as that of receiving apparatus 4 of FIG. 15.

It should be understood that the predictive coefficients are not stored at the addresses corresponding to the respective classes in the predictive coefficient ROM 81' and 78, but average values of the pixel values for constituting the teacher blocks may be stored. In this case, when the class information is supplied, the pixel value corresponding to this class is outputted. Accordingly, in the local decoder 22 of FIG. 16, neither the block making unit for the predicted values calculation 42, nor the predicting unit 82 is provided.

It should be understood that although the squared summation of the errors is employed as the error information in this embodiment, other factors such as an absolute value summation of errors and a summation of cubed errors may be used as the error information. A decision is made which error information is employed based on, for example, the convergence characteristic thereof.

Also, in this embodiment, the correcting operation of the compression data is repeated until the error information becomes less than a preselected threshold value "ϵ". Alternatively, it is also possible to make up an upper limit value as to the times of the correcting operation for the compression data. That is, in such a case that an image is transmitted in real time, the process operation for 1 frame must be ended within a predetermined time period. There is no definite condition such that the error information is converged within such a time period. Therefore, since an upper limit value is provided with the times of the correction, when the error information is not converged less than the threshold value "ϵ" within a predetermined time period, the process operation for this frame is accomplished (at this time, the corrected data is recognized as the coded result), and then the process operation for the next frame may be commenced.

Furthermore, in this embodiment, the block is constituted by the image for 1 frame. Alternatively, the block may be constituted by pixels at the same positions over a plurality of time-sequential frames.

Also, in this embodiment, in the compressing unit 21, the image is simply thinned, namely, the central pixel in the block made of 3×3 pixels is extracted, and then this is used as the compression data. Alternatively, the compressing unit 21 may calculate an average value of 9 pixels for constructing the block, and reduces (thins) the pixel number thereof by setting this average value as the pixel value of the central pixel in the block, so that this reduced data may be used as the compression data.

Fourth Embodiment

Figure 27:
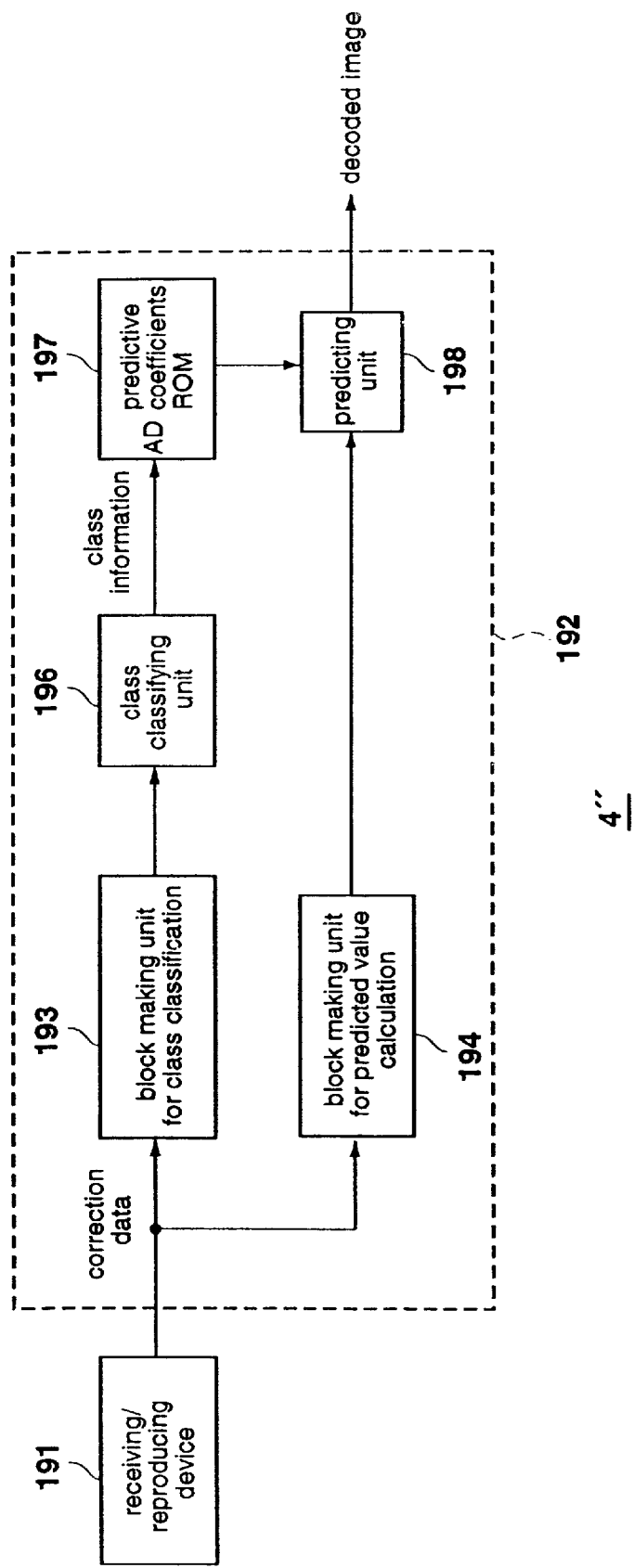
FIG. 27 is a block diagram of a receiving apparatus of FIG. 1 for use in connection with the transmitting apparatus FIG. 18.

A fourth embodiment of the invention is now described with reference to the transmitting apparatus of FIG. 18, the learning device for mapping coefficients of FIG. 21, the local decoder of FIG. 23, and the learning device for predictive coefficients of FIG. 17. The receiving apparatus for use with this fourth embodiment is illustrated in FIG. 27. Except as otherwise noted, the learning device for predictive coefficients of FIG. 17 operates as previously described with respect to the second embodiment of the invention.

Figure 18:
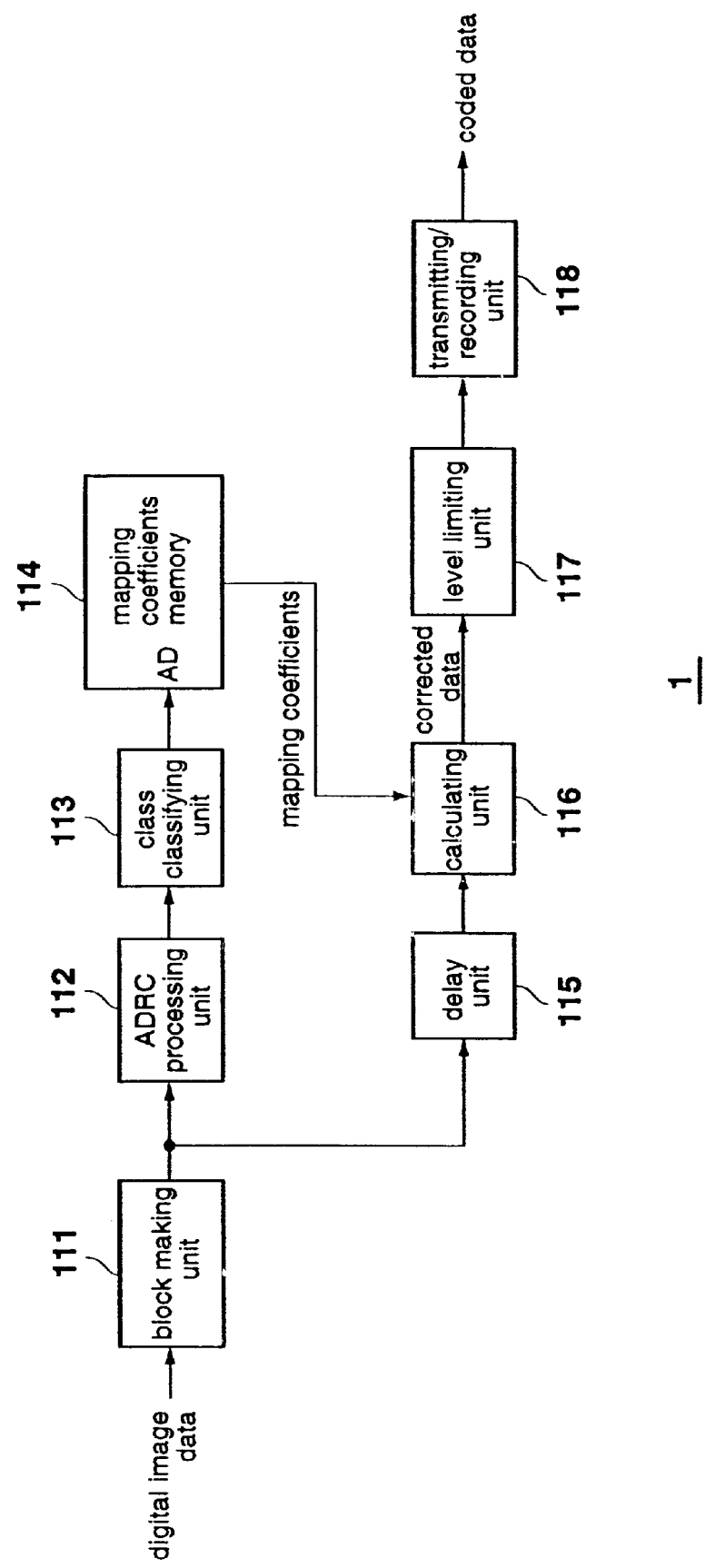
FIG. 18 is a block diagram of a transmitting apparatus 1 of FIG. 2 (excluding transmitting/recording device 16) according to a fourth and fifth embodiment of the invention.

With reference now to FIG. 18, the transmitting apparatus of the fourth embodiment is explained.

Image data to be coded is provided to a block making unit 111.

The block making unit 111 processes the image data to make a class classifying block centered about the noted pixel corresponding to the unit for classifying this image data into a predetermined class, depending upon a nature thereof, and then supplies this class classifying block to an ADRC (adaptive dynamic range coding) processing unit 112 and a delay unit 115.

The ADRC processing unit 112 executes the ADRC processing operation for the block (class classifying block) derived from the block making unit 111, and then supplies a block constructed of the resultant ADRC code to a class classifying unit 113.

In this case, according to the ADRC processing operation, the bit number of the pixels for constituting the class classifying block can be reduced.

Figure 19A:
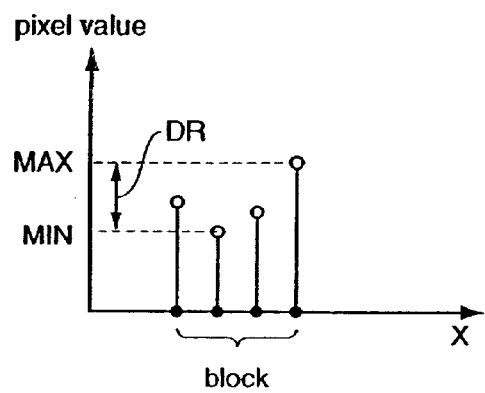
FIGS. 19(A), 19(B) and 19(C) are diagrams which illustrate the ADRC process.

That is to say, for example, for the sake of a simple explanation, as indicated in FIG. 19(A), considering such a block that is constructed of 4 pixels aligned on a straight line, both a maximum value "MAX" and a minimum value "MIN" of this pixel value are detected in the ADRC process operation. Then, assuming now that DR=MAX−MIN is used as a local dynamic range of the block, the pixel values of the pixels for constituting the block are requantized to k bits, based on this dynamic range DR.

Figure 19B:
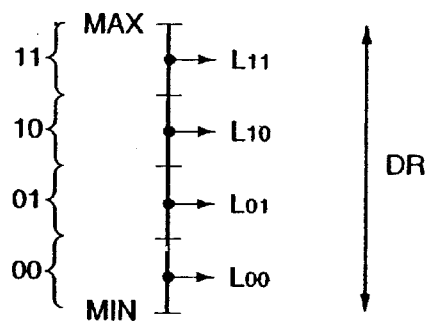

In other words, the minimum value MIN is subtracted from each of the pixel values within the block, and then the subtraction value is divided by $DR/2^k$. As a result, the resultant value is converted into a code (ADRC code) corresponding to the divided value. Concretely stated, for example, in a case where k=2, as indicated in FIG. 19(B), a judgment is made as to whether or not the divided value belongs any one of such ranges obtained by equally dividing the dynamic range DR by 4 (=$2^2$). In the case that the divided value belongs to the lowermost level range, the second lowermost level range, the third lowermost level range, or the uppermost level range, each of the divided values is coded into 2 bits such as 00B, 01B, 10B, or 11B (symbol "B" represents binary number). Then, on the decoding side, the ADRC code 00B, 01B, 10B, or 11B is converted into a center value L00 of the lowermost level range, a center value L01 of the second lowermost level range, a center value L10 of the third lowermost level range, or a center value L11 of the uppermost level range. Then, the minimum value MIN is added to each of these values, so that the decoding operation is carried out.

Figure 19C:
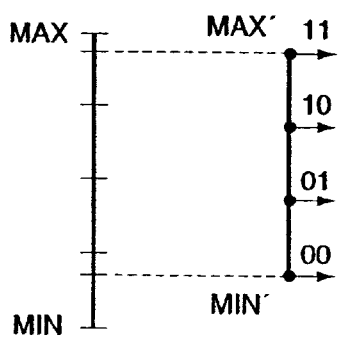

In this case, such an ADRC process operation is referred to as "non-edge matching". As indicated in FIG. 19(C), contrary to this non-edge matching, there is a so-called improved "non-edge matching" corresponding to an ADRC processing operation. That is, in this ADRC processing operation, either the ADRC code 00B or the ADRC code 11B is converted into an average value MIN' of the pixel values belonging to the lowermost level range obtained by equally dividing the dynamic range DR by 4, or another average value MAX' of the pixel values belonging to the uppermost level range. Also, both the ADRC codes 01B and 10B are converted into a level obtained by equally dividing a dynamic range DR' defined by MAX'–MIN' by 3, so that the ADRC codes are decoded.

It should be noted that a detailed description regarding this ADRC processing operation is disclosed in, for example, Japanese Laid-open Patent Application No. 3-53778 opened in 1991, which has been previously filed by the Applicant.

As previously explained, the number of classes may be reduced by executing the ADRC processing operation such that the requantization is performed based on the bit number smaller than the bit number which is allocated to the pixels for constituting the block.

Returning back to FIG. 18, the class classifying unit 113 executes a class classifying process operation for classifying the block outputted from the ADRC processing unit 112 into a predetermined class, depending upon a nature thereof, and then supplies such information for indicating that this block belongs to any class as class information to a mapping coefficient memory 114.

In such a case that, for instance, 8 bits or more are allocated to each of pixels, the class classifying block is arranged by 9 pixels centered about the noted pixel (=3×3). When the class classification process operation is performed with respect to such a class classifying block, this block is classified into such a huge number of classes, i.e., $(2^8)^9$.

Therefore, according to this embodiment, the ADRC process operation is carried out for the class classifying block in the ADRC processing unit 112. As a result, the class number is reduced by decreasing the bit number of the pixels for constituting the class classifying block, and further the class number is also reduced. That is, for example, when the ADRC processing operation of 1 bit is carried out in the ADRC processing unit 112, the class number is reduced from $(2^8)^9$ into $(2^1)^9$, namely to 512.

It should also be noted that in accordance with this embodiment, the class classification processing operation is carried out in the class classifying unit 113 based upon the ADRC code outputted from the ADRC processing unit 112. This class classification processing operation may be performed with respect to such data which have been processed by, for instance, DPCM (predictive decoding), BTC (block truncation coding), VQ (vector quantization), DCT (discrete cosine conversion), and Hadamard conversion.

Again, returning back to FIG. 18, as will be discussed later, the mapping coefficient memory 114 stores therein the mapping coefficients obtained from learning operations (mapping coefficient learning) every class information. While using the class information supplied from the class classifying unit 113, the mapping coefficient stored at this address is read out from this memory 111 to be supplied to a calculating unit 116.

The delay unit 115 delays the block supplied from the block making unit 111 until the mapping coefficient corresponding to the class information of this block is read out from the mapping coefficient memory 114, and then supplies the delayed block to the calculating unit 116.

The calculating unit 116 performs a predetermined calculation by employing the pixel values of the pixels for constructing the block supplied from the delay unit 115, and further, the mapping coefficient corresponding to the class of this block, which is supplied from the mapping coefficient memory 114, so that such coded data is calculated, which is obtained by thinning (or reducing) the pixel number of this image to code this image. In other words, the calculating unit 116 calculates a preselected function value "f" ($y_1$, $Y_2$, - - - , $k_1$, $k_2$, - - - ), while using the following values as arguments.

That is, the pixel values of the respective pixels for constructing the block outputted from the block making unit 111 are $y_1$, $y_2$, - - - , and the mapping coefficients corresponding to the class of this block, which are outputted from the mapping coefficient memory 114 are k1, k2, - - - . This calculated function value "f" ($y_1$, $y_2$, - - - , $k_1$, $k_2$, - - - ) is outputted as, for instance, a pixel value of a center pixel among the pixels for constructing the block (class classifying block) outputted from the block making unit 111.

Accordingly, assuming now that the number of pixels for constructing the class classifying block outputted from the block making unit 111 is equal to N pixels, the calculating unit 116 thins the image data by 1/N, and outputs the 1/N-thinned data as the coded data.

It should be understood that the coded data outputted from the calculating unit 116 is not such data which is produced by selecting to output the center pixel of the block arranged by the N pixels, namely produced by executing a simple thinning process operation, but, as previously described, is equal to the function value "f" ($y_1$, $y_2$, - - - , $k_1$, $k_2$, - - - ) defined by the N pixels for constituting this block. Considering it from the different point of view, this function value "f" ($y_1$, $y_2$, - - - , $k_1$, $k_2$, - - - ) may be such an optimum value. That is, the pixel value of the central pixel in the block, which is obtained from the simple thinning process operation, is corrected as the optimum value capable of obtaining the original image data based on the pixel values located around this central pixel. Accordingly, the data obtained by calculating the mapping coefficient and the pixels for constituting the block will also be referred as "correction data", if required.

Also, the calculation process executed in the calculating unit 116 may be conceived as such a process operation for mapping the pixel values of the respective pixels for constituting the class classifying block outputted by the block making unit 111 into the function "f" ($y_1$, $y_2$, - - -, $k_1$, $k_2$, - - - ). Accordingly, the coefficients $k_1$, $k_2$, - - -, used in such a process operation will be referred to as "mapping coefficients". The calculating circuit 116 supplies the coded data to the level limiting unit 117.

The level limiting unit 17 extracts 2-bit data of the MSB side of the coded data of 8 bits and supplies the coded data, limited to 2-bit data, to the transmitting/recording unit 118.

The transmitting/recording unit 118 records the correction data supplied as the coded data from the level limiting unit 117 on the recording medium 2, or transmits this correction data via the transmission path 3.

Figure 20:
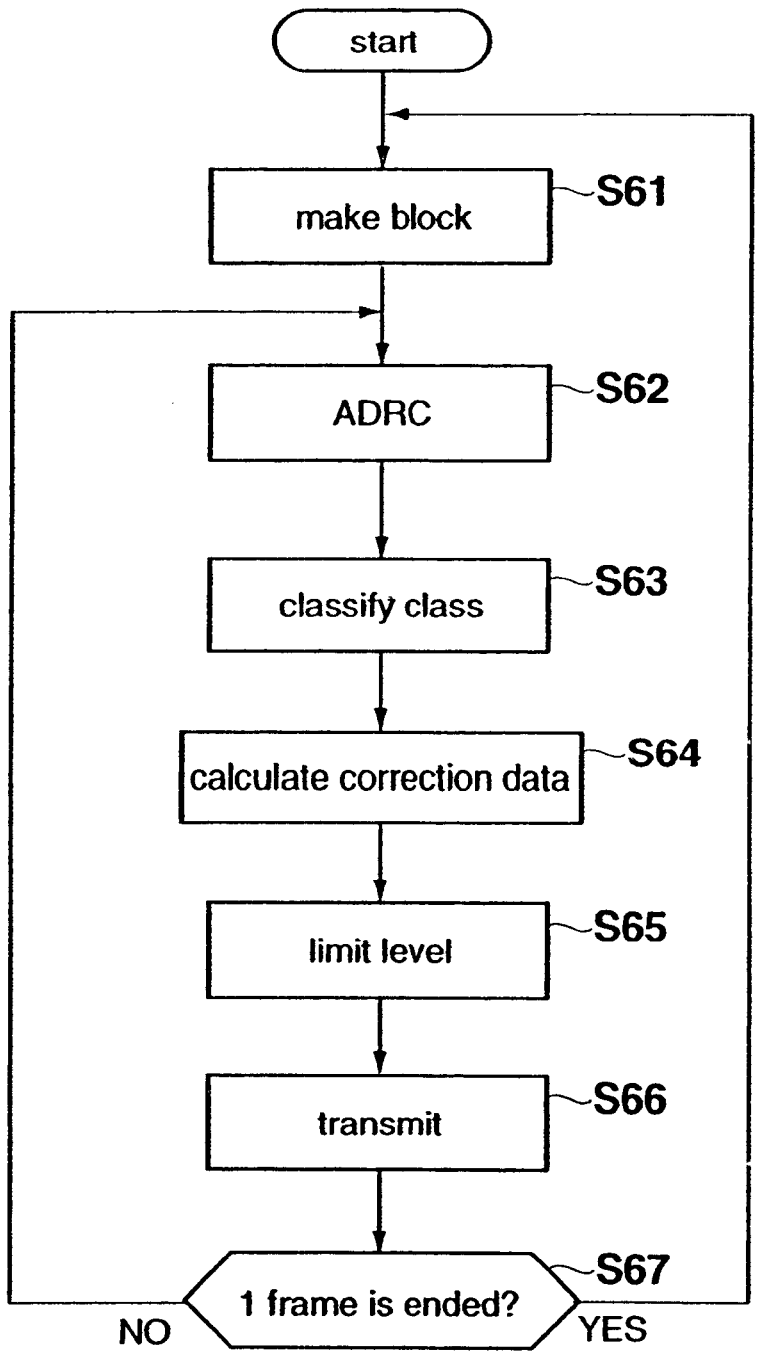
FIG. 20 is a flow chart illustrating the operation of the transmitting apparatus of FIG. 18.

Referring now to a flow chart of FIG. 20, the operation of the transmitting apparatus of FIG. 18 is further explained.

The image data is supplied in units of, for instance, 1 frame (field) to the block making unit 111. In the block making unit 111, at a step S61, the image for 1 frame is processed to make the class classifying block. That is, for example, as indicated in FIG. 7 by surrounded by a rectangle, the block making unit 111 subdivides the image data into the class classifying block constituted by 9 pixels centered about the noted pixel (3×3 pixels along transverse direction and longitudinal direction), and successively supplies this class classifying block to the ADRC processing unit 112 and to the delay unit 115.

In this case, the class classifying block is arranged by the square-shaped block made of 3×3 pixels. Alternatively, the shape of this class classifying block is not limited to the square shape, but may be made from, for instance, a rectangular, a cross-shape, and other arbitrary shapes. Also, a total number of pixels for constituting the class classifying block is not limited to 9 pixels (namely, 3×3 pixels). Furthermore, the class classifying block is not arranged by the adjoining pixels, but may be alternatively arranged by such pixels located apart from each other. It should be noted that the shape and the pixel quantity of the class classifying block must be made coincident with those during the learning operation (mapping coefficient learning operation, will be discussed later).

At a step S62, upon receipt of the class classifying block from the block making unit 111, the ADRC processing unit 112 executes, for example, the ADRC process operation of 1 bit with respect to this block, so that a block constituted by pixels expressed by 1 bit is accordingly made. The class classifying block which has been ADRC processed is furnished to the class classifying unit 113.

In the class classifying unit 113, at a step S63, the class classifying block derived from the ADRC processing unit 112 is classified into a class, and thus the resultant class information is supplied as an address to the mapping coefficient memory 114. As a consequence, the mapping coefficient corresponding to the class information furnished from the class classifying unit 113 is read out from the mapping coefficient memory 114, and then is supplied to the calculating unit 116.

On the other hand, in the delay unit 115, the class classifying block derived from the block making unit 111 is delayed, and the delayed class classifying block is supplied, while waiting for the mapping coefficient corresponding to the class information of this block is read out from the mapping coefficient memory 114. At a step S64, in the calculator 116, the above-described function "f(●)" (symbol "●" appearing in this function "f" indicates a set of pixel values $y_1$, $y_2$, - - -, and mapping coefficients $k_1$, $k_2$, - - - ) is calculated by employing the pixel values of the respective pixels for constituting the class classifying block derived from the delay unit 115, and also the mapping coefficients read out from the mapping coefficient memory 114. As a result, it is possible to calculate such correction data produced by correcting the pixel value of the central pixel for constituting the class classifying block. This correction data is outputted as the coded image data to the level limiting unit 117.

In the level limiting unit 117, at a step S65, the coded data of 8 bits is supplied as the 2-bit data of the MSB side thereof to the transmitting/recording unit 118. In the transmitting/recording unit 118, at a step S66, the coded data supplied from the level limiting unit 117 is recorded on the recording medium 2, or transmitted via the transmission path 3.

Then, the process advanced to a step S67, at which a judgment made as to whether or not the process operation for the image data for 1 frame is accomplished. At this step S67, when it is so judged that the process operation for the image data for 1 frame is not yet completed, the process operation is returned to the previous step S62, at which the process operation defined after the step S62 is repeated for the next class classifying block. To the contrary, when it is so judged at the step S67 that the process operation for the image data for 1 frame is completed, the process operation is returned to the step S61, at which the process operation defined after the step S61 is repeated for the next frame.

Figure 21:
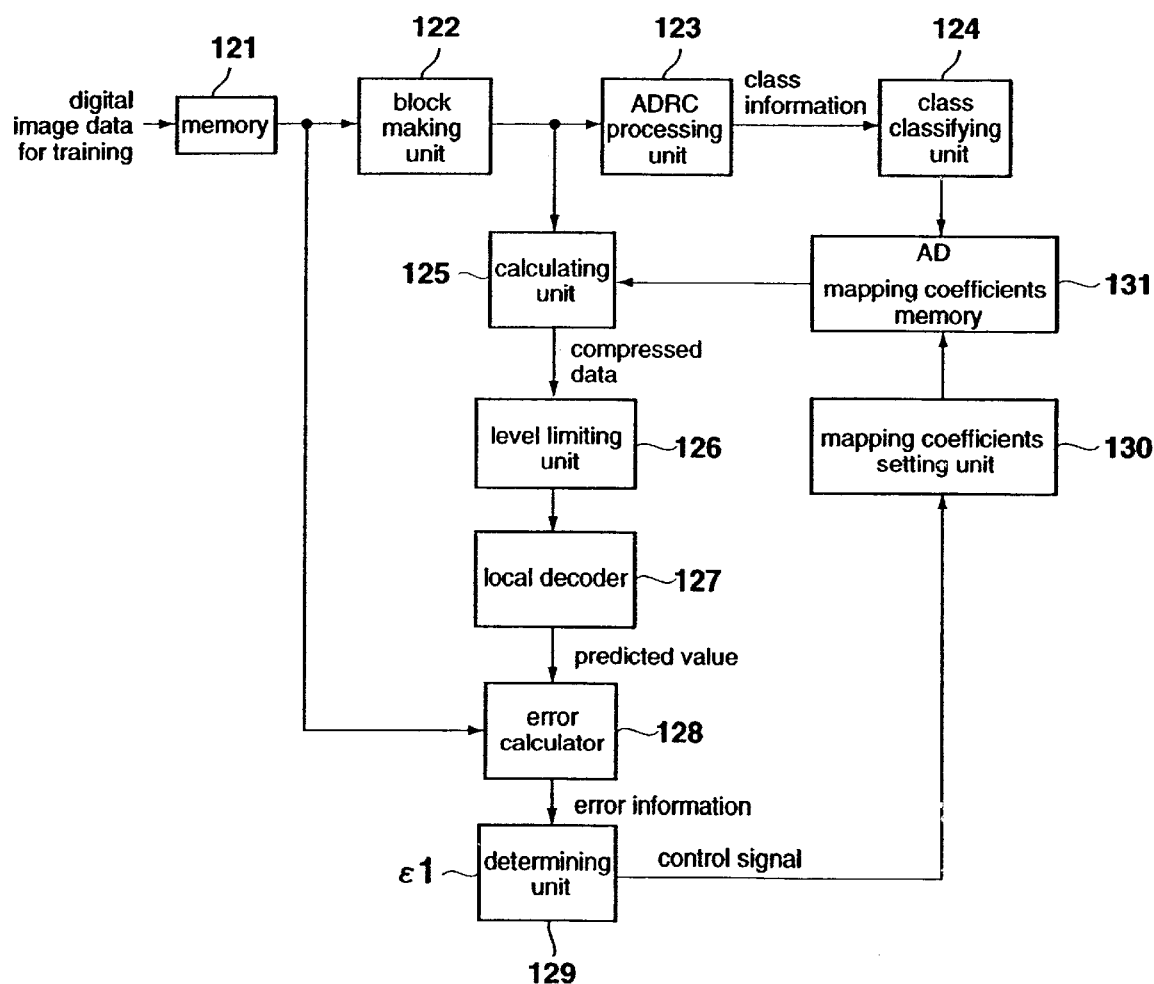
FIG. 21 is a block diagram of an image processing apparatus, according to a fourth embodiment, for performing the learning operation used to obtain mapping coefficients.

Next, FIG. 21 illustrates a block diagram of an image processing apparatus for executing a learning (mapping coefficient learning) process operation used to calculate the mapping coefficients stored in the mapping coefficient memory 114 shown in FIG. 18.

In the memory 121, the digital image data for training for more than 1 frame, which is suitable for the learning process (will be referred to as a "learning image" hereinafter, if necessary) is stored. A block making unit 122 reads the image data stored in the memory 121, constitutes a class classifying block identical to that outputted from the block making unit 111 shown in FIG. 18, and then supplies the block to an ADRC processing unit 123 and to a calculating unit 125.

Either the ADRC processing unit 123 or the class classifying unit 124 executes a similar process operation to that of the ADRC processing unit 112 or the class classifying unit 113 shown in FIG. 18. As a result, the class information of the block outputted from the block making unit 122 is outputted from the class classifying unit 124. Then, this class information is supplied as an address to the mapping coefficient memory 131.

The calculating unit 125 performs the same calculation as that of the calculating unit 116 of FIG. 18 by employing the pixels for constituting the block supplied from the block making unit 122, and also the mapping coefficient supplied from the mapping coefficient memory 131. Thus, the calculating unit 125 provides compressed data to a level limiting unit 126. This level limiting unit 126 limits the levels of the pixels of the compressed data and then supplies or 126 supplies the resultant correction data (function "f" (●)) to the local decoder 127.

Based upon the correction data supplied from the level limiting circuit 126, the local decoder 127 predicts (calculates) a predicted values of an original learning image data (namely, predicted values of pixel values of pixels for constructing block outputted from block making unit 122), and then supplies the predicted value to an error calculator 128. The error calculator 128 reads a pixel value (true value) of a learning image corresponding to the predicted values supplied from the local decoder 127, calculates (detects) a prediction error of the predicted values with respect to the pixel value of this learning image, and then supplies this calculated prediction error as error information to a determining unit 129.

The determining unit 129 compares the error information supplied from the error calculator 128 with a predetermined threshold value "ε1", and then controls a mapping coefficient setting unit 130 in accordance with this comparison result. Under control of the determining unit 129, the mapping coefficient setting unit 130 sets (changes) a set of mapping coefficients, the number of which is identical to the number of classes obtained by the class classifying unit 124, and then supplies the changed set of the mapping coefficients to a mapping coefficient memory 131.

The mapping coefficient memory 131 temporarily stores therein the mapping coefficient supplied from the mapping coefficient setting unit 130. It should be understood that the mapping coefficient memory 131 contains storage regions capable of storing mapping coefficients (set of mapping coefficients), the number of regions equal to the number classes to be classified in the class classifying unit 124. In each of the storage regions, when a new mapping coefficient is supplied from the mapping coefficient setting unit 130, this new mapping coefficient may be stored instead of the previously stored mapping coefficient.

Also, the mapping coefficient memory 131 reads the mapping coefficient stored at the address corresponding to the class information supplied from the class classifying unit 124, and then supplies the read mapping coefficient to the calculating unit 126.

Referring now to the flow chart of 22, operation of the learning device for mapping coefficients is further explained.

First, at a step S71, the mapping coefficient setting unit 130 sets a set of initial values of the mapping coefficients by only the number equal to the classes to be classified in the class classifying unit 124, and then supplies the set of these initial values to the mapping coefficient memory 131. In this mapping coefficient memory 131, the mapping coefficient (initial value) derived from the mapping coefficient setting unit 130 is stored a the address of the corresponding class.

Then, at a step S72, the block making unit 122 processes all of the learning images stored in the memory 121 to make blocks constituted of 3×3 pixels centered about the noted pixel in a similar manner to that executed in the block making unit 111 shown in FIG. 18. Furthermore, the block making unit 122 reads out this block from the memory 121, and sequentially supplies the read block to the ADRC processing unit 123 and the calculating unit 125.

At a step S73, similar to the process operation by the ADRC processing unit 112 of FIG. 18, the ADRC processing unit 123 performs the ADRC processing operation of 1 bit for the block outputted from the block making unit 122, and then supplies the ADRC-processed block to the class classifying unit 124.

At a step S124, in the class classifying unit 124, a decision is made of a class of the block supplied from the ADRC processing unit 123, and this class information is supplied as an address to the mapping coefficient memory 131. As a consequence, at a step S75, a mapping coefficient is read out from an address of the mapping coefficient memory 131, which corresponds to the class information supplied from the class classifying unit 124, and then the read mapping coefficient is supplied to the calculating unit 126.

When the block is received from the block making unit 122, and also the mapping coefficient corresponding to the class of this block is received from the mapping coefficient memory 131, the calculating unit 125 calculates the above-explained function value "f(●)" by employing this mapping coefficient, and the pixel values of the pixels for constituting the block supplied from the block making unit 122 at a step S76. This calculation result is furnished to the level limiting unit 126 as the compressed data obtained by correcting the pixel value of the central pixel of the block supplied from the block making unit 122. Then, as a consequence, at a step S77, 2 bit data from the MSB side is selected from 8 bit data, and the pixel data, the 2-bit data of which is bit-limited, is supplied to the local decoder 127.

In other words, for instance, in FIG. 7, assuming now that the block of 3×3 pixels surrounded by the rectangle is outputted from the block making unit 122, the calculating unit 125 calculates correction data produced by correcting the pixel values of the pixels denoted by symbol "●" in this drawing, and this correction data is level-limited by the level limiting unit 126, and thereafter outputs this calculated correction data to the local decoder 127.

As a consequence, in the calculating unit 126, the number of pixels for constituting the learning image data is thinned by 1/9, and thus the thinned pixel number is supplied to the local decoder 127.

Figure 22:
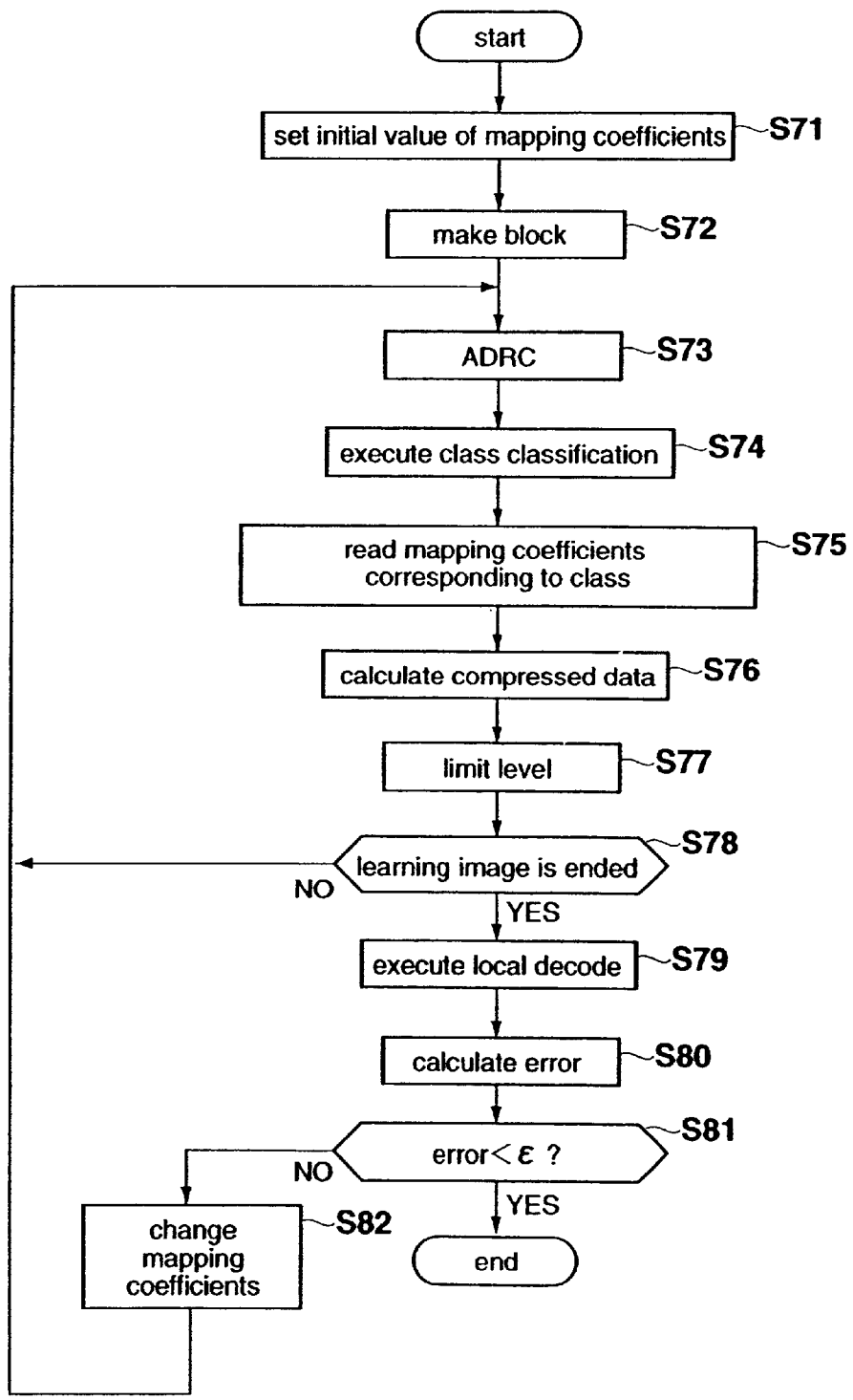
FIG. 22 is a flow chart illustrating the operation of the image processing apparatus of FIG. 21.

Returning back to FIG. 22, the process operation is advanced to a step S78, at which a check is made as to whether or not the correction data about all of the learning images stored in the memory 121 have been calculated. When it is so judged at the step S78 that the correction data about all of the learning data are not yet calculated, the process operation is returned to the previous step S73. Then, the process operations defined after the S73 to the step S78 are repeated until the correction data about all of the learning images are calculated.

When it is so judged at the step S78 that the correction data about all of the learning images are calculated, namely when such a thinned image could be obtained which is produced by thinning all of the learning images stored in the memory 121 by 1/9, the process operation is advanced to a step S79 at which this 1/9-thinned image is local-decoded in the local decoder 127, so that a predicted values of the original learning image data is calculated. It should be understood that this 1/9-thinned image is not equal to such a thinned image produced by simply thinning the learning image data by 1/9, but equal to another thinned image obtained by calculating the mapping coefficient to acquire the pixel value. Then, these predicted values are supplied to the error calculator 128.

In this case, the image constituted by the predicted values obtained in this local decoder 127 (noting that, as will be explained later, the image obtained when error information outputted from error calculator 128 becomes smaller than the threshold value ε1) is identical to the decoded image obtained on the side of the receiving apparatus 4 (FIG. 1).

In the error calculator 128, the learning image is read out from the memory 121 at a step S80, and then a prediction error of the predicted values supplied from the local decoder 127 with respect to this read learning image data is calculated. In other words, when the pixel value of the learning image data is expressed as "$Y_{ij}$", and the predicted values thereof outputted from the local decoder 127 is expressed as "$E[Y_{ij}]$", error dispersion (namely, squared summation of error) "Q" indicated by the following formula is calculated in the error calculator 128. This error dispersion is supplied as error information to the determining unit 129.

$Q = \Sigma(Y_{ij} - E[Y_{ij}])^2$, where symbol "Σ" indicates a summation of all pixels of the learning images.

Upon receipt of the error information from the error calculator 128, the determining unit 129 compares this error information with the preselected threshold value "ε1", and judges as to whether or not this error information is larger than the threshold value "ε1" at a step S81. When it is judged at the step S81 that the error information is larger than, or equal to the threshold value "ε1", namely in the case that no recognition is made that the image constituted by the predicted values obtained in the local decoder 127 is equal to the original learning image data, the determining unit 129 outputs a control signal to the mapping coefficient setting unit 130. At a step S82, in response to the control signal derived from the determining unit 129, the mapping coefficient setting unit 130 changes the mapping coefficient, and causes this changed mapping coefficient to be newly stored into the mapping coefficient memory 131.

Then, the process operation is returned to the previous step S73, at which the process operations defined after the step S73 are again repeated by employing the changed mapping coefficient stored in the mapping coefficient memory 131.

Now, it should be understood that the mapping coefficient may be varied at random in the mapping coefficient setting unit 130. Alternatively, in such a case that the present error information becomes smaller than the preceding error information, the mapping coefficient may be changed in accordance with a trend similar to the preceding trend. Also, in the case that the present error information becomes larger than the preceding error information, the mapping coefficient may be changed in accordance with a trend opposite to the previous trend.

Furthermore, the mapping coefficient may be changed as to all of the classes, or a portion of the classes. When only the mapping coefficient as to a portion of the classes is changed, for example, such a class capable of giving a strong influence to error information is detected, and then only such a mapping coefficient may be varied. A class capable of giving a strong influence to error information may be detected as follows. That is, first of all, the process operation is carried out by employing an initial value of a mapping coefficient to thereby obtain error information thereof. Thereafter, the mapping coefficient is changed by the same amount every 1 class, and the resulting error information is compared with the error information obtained when the initial value is employed. The class in which the comparison difference becomes larger than, or equal to a predetermined value may be detected as the class capable of giving a strong influence to the error information.

Also, in such a case that a plurality of mapping coefficients such as the above-described $k_1$, $k_2$, - - - are set as 1 set, only the mapping coefficient capable of giving the strong influence to the error information among then may be changed.

Furthermore, in the above case, the mapping efficient are set every class. Alternatively, the mapping efficient may be independently set with respect to, for instance, each of the blocks, or in unit of the adjoining blocks.

It should be noted that, for example, when the mapping coefficient is independently set every block, there are some possibilities that plural sets of mapping coefficients are acquired with respect to a certain single class (conversely, there are some possibilities that a class will occur where a set of mapping coefficient could not be obtained). Finally, since the mapping coefficient should be determined every class, as explained before, when plural sets of mapping coefficients are obtained as to a certain class, a certain process operation, merge operation or select operation is carried out for the plural sets of mapping coefficients, so that one set of mapping coefficient must be determined. On the other hand, when it is so judged at the step S81 that the error information becomes smaller than the threshold value "ε1", namely when a recognition is made that the image constituted by the predicted values obtained in the local decoder 127 is identical to the original learning image data, the process operation is completed.

At this time, the mapping coefficients every class, which have been stored in the mapping coefficient memory 131, are set into the mapping coefficient memory 114 of FIG. 18 as the optimum mapping coefficients capable of obtaining the correction data by which the decoded image (predicted values) recognizable as the same image as the original image data can be reproduced.

As a consequence, since the correction data is produced by using such a mapping coefficient, it is possible to obtain the image substantially identical to the original image data on the side of the receiving apparatus 4 (FIG. 1).

As previously described, in the embodiment of FIG. 21, the image is subdivided into the block constituted by 9 pixels centered about the noted pixel (3×3 pixels) by the block making unit 122, whereas the ADRC processing operation of 1 bits is carried out for the image block in the ADRC processing unit 123. As a consequence, the number of classes obtained by the class classification by the class classifying unit 124 is equal to 512 $(=(2^1)^9)$. Accordingly, 512 sets of mapping coefficients are obtained.

Figure 23:
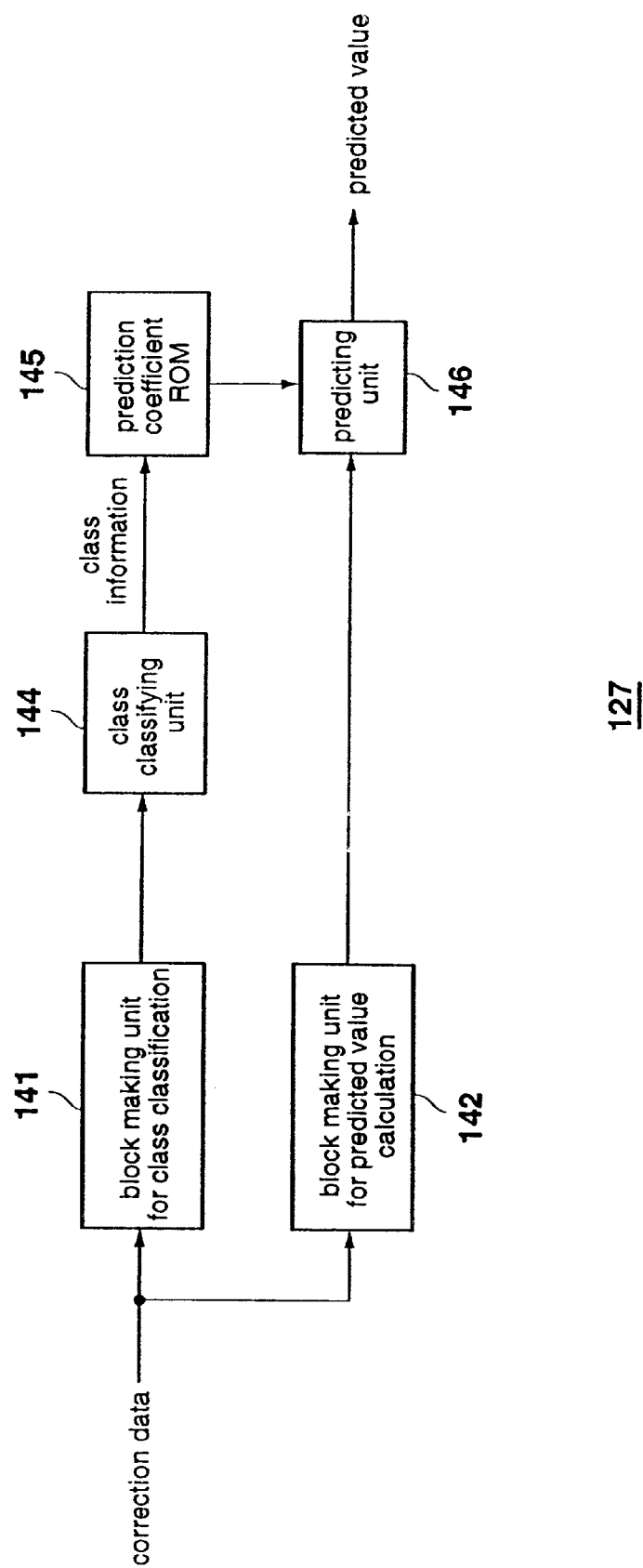
FIG. 23 is a block diagram of the local decoder 127 of FIG. 21.

Next, FIG. 23 illustrates an example of an arrangement of the local decoder 127 shown in FIG. 21.

The correction data derived from the level limiting unit 126 of FIG. 21 is supplied to a block making unit for class classification 141 and to a block making unit for predicted value calculation 142. The block making unit for class classification 141 makes class classifying blocks centered about the noted corrected data in unit used to classify the corrected data into a preselected class, depending upon a nature thereof.

In other words, for instance, assuming now that in FIG. 7, the correction data (compression data), (otherwise, pixel) (indicated by symbol "●" in FIG. 7) located at an i-th position from the upper position and at a j-th position from the left position is expressed as "$X_{ij}$", the block making unit 141 for the class classification will constitute a class classifying block arranged by 5 pixels in total, namely, a pixel "$X_{ij}$" of interest and the following 4 pixels adjacent to this pixel of interest at upper, left, right, and lower positions: $X_{(i-1)j}$, $X_{i(j-1)}$, $X_{i(j+1)}$, $X_{(i-1)j}$. This class classifying block is supplied to a class classifying unit 144.

It should be understood that the class classifying block obtained in the block making unit for class classification 141 of FIG. 23 is constituted in order to determine the class of the block used to calculate the predicted values. At this point, this class classifying block is different from the class classifying block produced in the block making unit 111 of FIG. 18 so as to determine the class of the block for calculating the correction data.

The block making unit for predicted values calculation 142 processes the correction data to make a predicted values calculating block centered about the noted corrected data in unit used to calculate the predicted values of the original image data (namely, in this case, leaning image data). In other words, in this embodiment, pixel values of 9 pixels (=3×3) in the original image data centered around the correction data Xij are expressed by: $Y_{ij}(1)$, $Y_{ij}(2)$, $Y_{ij}(3)$, $Y_{ij}(4)$, $Y_{ij}(5)$, $Y_{ij}(6)$, $Y_{ij}(7)$, $Y_{ij}(8)$, $Y_{ij}(9)$. These pixel values may be obtained from 25 pixels (=5×5) centered around the pixel "$X_{ij}$". These 25 pixels are defined by: $X_{(i-2)(j-2)}$, $X_{(i-2)(j-1)}$, $X_{(i-2)j}$, $X_{(i-2)(j+1)}$, $X_{(i-2)(j+2)}$, $X_{(i-1)(j-2)}$, $X_{(i-1)(j-1)}$, $X_{(i-1)j}$, $X_{(i-1)(j+1)}$, $X_{(i-1)(j+2)}$, $X_{i(j-2)}$, $X_{i(j-1)}$, $X_{ij}$, $X_{i(j+1)}$, $X_{i(j+2)}$, $X_{(i+1)(j-2)}$, $X_{(i+1)(j-1)}$, $X_{(i+1)j}$, $X_{(i+1)(j+1)}$, $X_{(i+1)(j+2)}$, $X_{(i+2)(j-2)}$, $X_{(i+2)(j-1)}$, $X_{(i+2)j}$, $X_{(i+2)(j+1)}$, $X_{(i+2)(j+2)}$.

Concretely stated, for instance, in FIG. 7, to calculate the predicted values of the pixels Y33(1) to Y33(9) in the original image data surrounded by a rectangular, the predicted values calculating block is constructed by 25 the following pixels (correction data): $X_{11}$, $X_{12}$, $X_{13}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$, $X_{55}$.

The predicted values calculating block obtained in the block making unit for predicted value calculation 142 are supplied to a predicting unit 146.

Similar to the case of the class classifying block, the pixel number and the shape as to the predicted values calculating block are not limited to the above-described examples. It should be noted that the total number of pixels for constituting the predicted values calculating block in the local decoder 127 is preferably made larger than the total number of pixels for constituting the class classifying block.

Also, when the above-explained block making process is carried out (similar to process operations other than block making), there are no corresponding pixels near the image frame of the image. In this case, for example, the process operation may be performed, assuming now that the same pixels carried out (similar to process operations other than block making), there are no corresponding pixels near the image frame of the image. In this case, for example, the process operation may be performed, assuming now that the same pixels as those for constituting the image frame are located outside this image frame.

The class classifying unit 144 classifies the block supplied from the block making unit for class classification 141, and then supplies the classified result as class information to a predictive coefficient ROM 145. The predictive coefficient ROM 145 stores therein predictive coefficients for each class, and when the class information is received from the class classifying unit 144, a predictive coefficient stored at an address corresponding to this class information is read to be supplied to a predicting unit 146. It should be noted that the predictive coefficient stored in the predictive coefficient ROM 145 are obtained by way of learning process operation (predictive coefficient learning, will be discussed later).

The predicting unit 146 calculates (predicts) a predicted values of an original image data (learning image data) by employing the predicted values calculation block derived from the block making unit for predicted value calculation 142, and also the predictive coefficient read from the predictive coefficient ROM 145.

Figure 24:
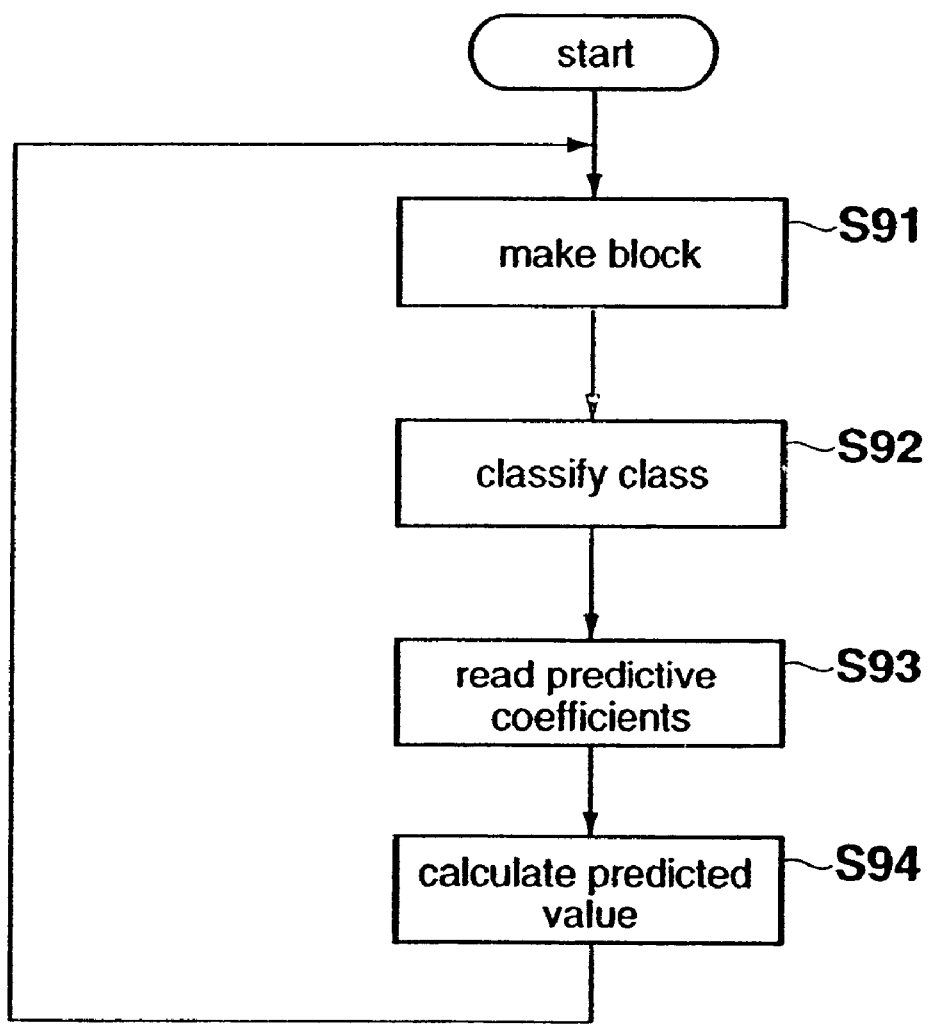
FIG. 24 is a flow chart illustrating the operation of the local decoder 127 of FIG. 23.

Referring now to the flow chart of FIG. 24, the operation of the local decoder 127 of FIG. 23 is further explained.

First, in the local decoder 127, at a step S91, the correction data derived from the level control unit 126 is sequentially received to be processed to make blocks. In other words, in the block making unit for class classification 141, the correction data is subdivided into a class classifying block made of 5 pixels centered about the noted corrected data, which will be then supplied to the class classifying unit 144. In the block making unit for predicted values calculation 142, the correction data is subdivided into a predicted values calculating block made of 5×5 pixels centered about the noted corrected data, which will be then supplied to the predicting unit 146.

It should also be noted that in the block making unit for class classification 141 and the block making unit for predicted value calculation 142, the corresponding class classifying block and the corresponding predicted values calculating block are produced. That is to say, in block making unit for class classification 141, for instance, when a class classifying block made of 5 pixels centered around the correction data $X_{33}$ of FIG. 7 is produced, whereas a predicted values calculating block constituted by 5×5 pixels centered around the same correction data $X_{33}$ is produced in the predicted values calculating block.

At a step S92, the class classifying unit 144 executes the class classification processing operation with respect to the class classifying block, namely, detects states of distribution of each of the levels of the corrected data in the block, to thereby judge as to such a class to which this class classifying block belongs. This class judgment result is supplied as the class information to the predictive coefficient ROM 145.

It should be understood that in this embodiment of FIG. 24, since the class classification processing operation is performed with respect to the class classifying block constructed of 5 pixels where 1 pixel is expressed by 2 bits, each of the class classifying blocks is classified into any one of 512 classes ($=(2^2)^5$).

Then, the process operation is advanced to a step S93, at which predictive coefficients are read out from the address of the predictive coefficient ROM 145, which corresponds to the class information supplied from the class classifying unit 144. At a step S94, the predicting unit 146 calculates a predicted values E[y] of a predicted values "y" of the original image data by employing this predictive coefficient, and the 25 pixel values for constituting the predicted values calculating block supplied from the predicted values calculating block in accordance with the following linear equation:

$$E[y] = w_1 x_1 + w_2 x_2 + \cdots w_{25} x_{25} + w_0,$$

where symbols $w_1$, $w_2$, - - -, $w_0$ represent predictive coefficients, and symbols $x_1$, $x_2$, - - - denote pixel values (correction data) of pixels for constructing the predicted values calculating block, especially symbols $w_0$, which is an offset coefficient which is added so as to express E[y] by 8 bits, because the original 8-bit data "$x_i$ has been converted into the 2-bit data.

Now, in the embodiment of FIG. 23, as previously explained, the predicted values of the 9 pixels may be calculated from the 25 pixels for constituting the predicted values calculating block.

Concretely stated, for example, it is now assumed that class information C is outputted from the class classifying unit 144, and this class information C is related to a class classifying block constituted by 3×3 corrected data $X_{22}$, $X_{23}$, $X_{24}$, $X_{32}$, $X_{33}$, $X_{34}$, $X_{42}$, $X_{43}$, $X_{44}$, where correction data $X_{33}$ shown in FIG. 7 is centered. Also, it is now assumed that as the predicted values calculating block, a predicted values calculating block making unit 142. This prediction calculating block is arranged by $X_{11}$, $X_{12}$, $X_{13}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$, $X_{55}$, where correction data $X_{33}$, is centered.

Moreover, it is assumed that $w_1(k)$ to $w_{25}(k)$, and $w_0(k)$ are stored as a set of predictive coefficients at an address corresponding to the class information C in the predictive coefficient ROM 145.

In this case, predicted values $E[Y_{33}(1)]$ through $E[Y_{33}(9)]$ of the pixel values $Y_{33}(1)$ to $Y_{33}(9)$ of the 3×3 pixels (namely, a portion surrounded by a rectangle in FIG. 7) in the original image data centered around the correction data $X_{33}$ are calculated in accordance with the following formula:

$$E[Y33(k)] = w_1(k)X_{11} + w_2(k)X_{12} + w_3(k)X_{13} + w_4(k)X_{14} +$$
$$w_5(k)X_{15} + w_6(k)X_{21} + w_7(k)X_{22} + w_8(k)X_{23} +$$
$$w_9(k)X_{24} + w_{10}(k)X_{25} + w_{11}(k)X_{31} + w_{12}(k)X_{32} +$$
$$w_{13}(k)X_{33} + w_{14}(k)X_{34} + w_{15}(k)X_{35} + w_{16}(k)X_{41} +$$
$$w_{17}(k)X_{42} + w_{18}(k)X_{43} + w_{19}(k)X_{44} + w_{20}(k)X_{45} +$$
$$w_{21}(k)X_{51} + w_{22}(k)X_{52} + w_{23}(k)X_{53} + w_{24}(k)X_{54} +$$
$$w_{25}(k)X_{55} + w_0(k)$$

When 9 pieces of the predicted values are obtained at the step S94 in the above-described manner, the process operation is returned to the previous step S91, at which the process operations defined from the step S91 to the step S94 are repeated, so that the predicted values are calculated in unit of 9 pixels.

An image processing apparatus for executing the learning operation (predictive coefficient learning) used to acquire the predictive coefficients stored in the predictive coefficient ROM 145 of FIG. 23 is constructed in a similar manner to that of FIG. 17. Thus explanations thereof are omitted.

Next, FIG. 27 represents a illustrates an embodiment of a receiving apparatus 4" corresponding to the transmitting apparatus 1 of FIG. 18.

In a receiving/reproducing device 191, the coded data recorded on the recording medium 2 is reproduced, or the coded data transmitted via the transmission path 3 is received to be supplied to a decoder 192.

The decoder 192 includes a block making unit for class classification 193 through a predicting unit 198, which correspond to the class classification block making unit 141 through the predicting unit 146 employed in the local decoder 127 shown in FIG. 23. As a result, in the decoder 192, predicted values are calculated from correction data, and then an image constituted by these predicted values is outputted as a decoded image in a similar manner to the operations of the local decoder 127 of FIG. 23. Predictive coefficients for each class stored in predictive coefficients ROM 197 are the same as predictive coefficients used in mapping coefficients for the learning process.

Since the correction data causes the error information to be less than a predetermined threshold value, it is possible to obtain an image substantially equal to the original image data in the receiving apparatus 4. In these embodiments, although each process is carried out for one frame, each process may be carried out for one field, for two frames or more than two frames.

It should be understood that when the normal interpolation is carried out by an apparatus for decoding a thinned image by way of the interpolation on the reception side, the decoded image may be obtained even if the receiving apparatus 4 shown in FIG. 27 is not used. However, in this alternative case, the image quality (resolution) of the resultant decoded image is deteriorated.

Although the image for 1 frame has been subdivided to make the image block in this embodiment, this block may be formed by collecting, for instance, pixels located at the same positions in a plurality of frames which are time-sequentially continued.

Also, in this embodiment, as the error information, the square summation of the errors is employed. Alternatively, for example, a summation of absolute values of the errors, and a summation of cubed errors may be employed as the error information. A decision is made which value is employed as the error information, by considering the convergence characteristic thereof.

Fifth Embodiment

A fifth embodiment of the invention is now described with reference to the transmitting apparatus of FIG. 18, the learning device for mapping coefficients of FIG. 25 and the local decoder of FIG. 23. The receiving apparatus for use with this fifth embodiment is illustrated in FIG. 27. Except as otherwise noted, the transmitting apparatus of FIG. 18, the local decoder of FIG. 23 and the receiving apparatus of FIG. 27 operate as previously described with respect to the fourth embodiment of the invention.

Figure 25:
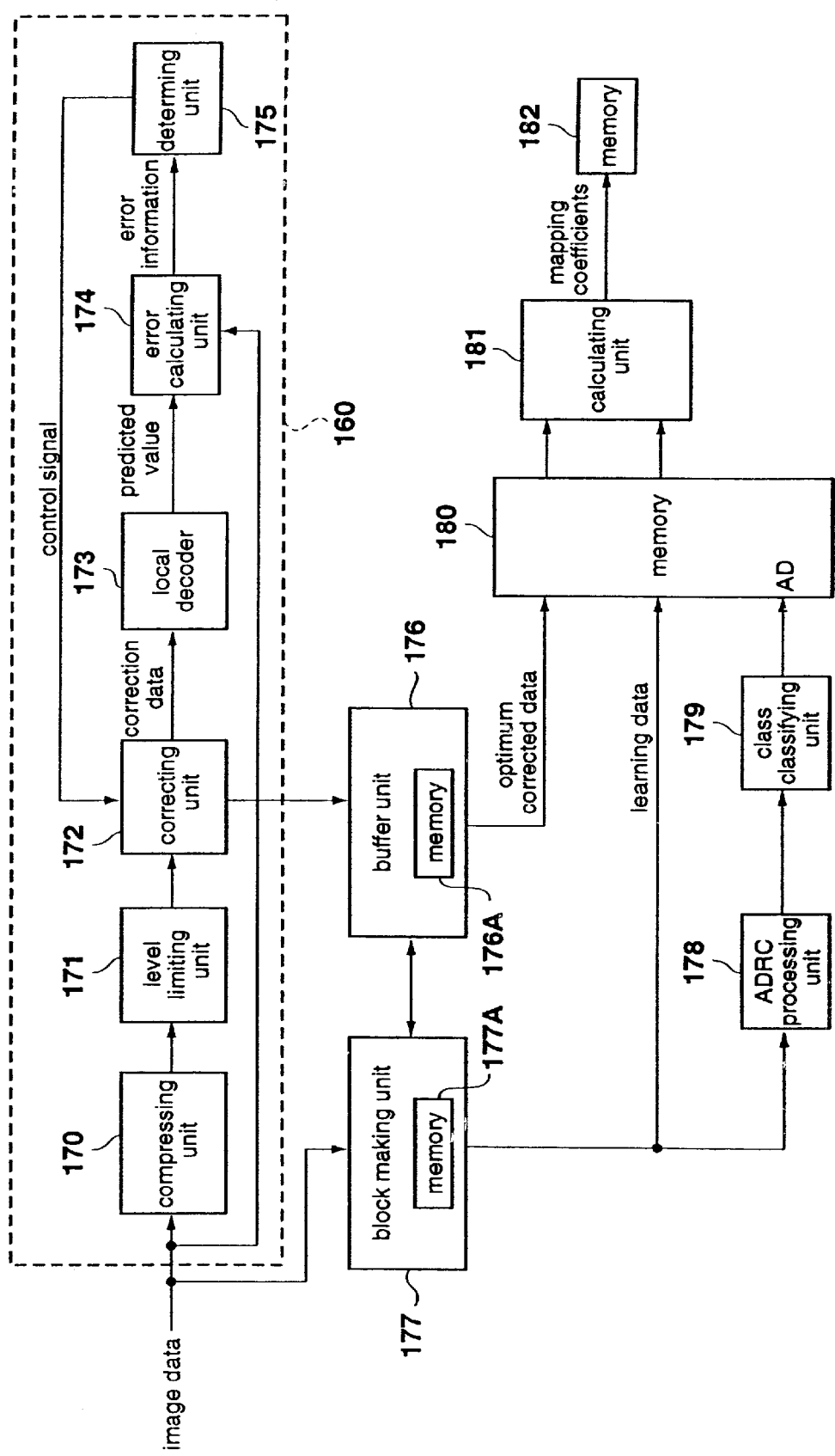
FIG. 25 is a block diagram of an image processing apparatus, according to a fifth embodiment, for performing the learning operation used to obtain mapping coefficients.

With reference now to FIG. 25, the learning device for mapping coefficients for use in the fifth embodiment is now explained. FIG. 25 shows the structure of an image processing apparatus for performing a learning (mapping coefficient learning) process used to calculate mapping coefficients for storage in the mapping coefficient memory 114 of FIG. 18.

It should be noted that according to the image processing apparatus of FIG. 21, even when the function "f" is expressed by, for instance, the linear equation, and further the non-linear equation, and the secondary, or more equations, the optimum predictive coefficient may be obtained. To the contrary, in the image processing apparatus of FIG. 25, only when the function "f" is expressed by the linear equation, the optimum predictive coefficient may be calculated.

In other words, the image processing apparatus of FIG. 25 may be used in the following case. That is, in FIG. 18, when the pixel values of the respective pixels for constituting the block made of 3×3 pixels outputted from the block making unit 111 are set to $y_1$, $y_2$, - - - , $y_9$, and the mapping coefficients outputted from the mapping coefficient memory 114 are set to $k_1$, $k_2$, $k_3$, - - - , $k_9$, the calculating unit 116 calculates the function "f" ($y_1$, $y_2$, - - - , $k_1$, $k_2$, - - - ) in accordance with the below-mentioned formula to obtain correction data.

$$f(\bullet)=k_1y_1+k_2y_2+\ldots+k_9y_9$$

To an optimum correction data calculating unit 160, a learning image data suitable for a learning operation is supplied in unit of, for instance, 1 frame. The optimum correction data calculating unit 160 includes a compressing unit 170, a level limiting unit 171, a correcting unit 172, a local decoder 173, an error calculating unit 174, and a determining unit 175. The optimum correction data calculating unit 160 calculates a pixel value (will be referred to as "optimum correction data" hereinafter, if necessary) for constituting an optimum image used to predict the original image data, being an image whose pixel number is reduced, from the learning image entered into this optimum correction data calculating unit 160, and then supplies this calculated pixel value to a buffer unit 176.

In other words, the learning image data supplied to the optimum correction data calculating unit 160 is supplied to a compressing unit 170 and an error calculating unit 174. The compressing unit 170 simply thins (subsamples) the learning image data at the same rate as the rate under which the pixels are thinned by the calculating unit 116 of FIG. 18, so that the learning image data is compressed and the compressed image data is supplied to a level limiting unit 171. That is, in this embodiment, the learning image data is simply thinned by 1/9 (when 9 pixels of 3×3 pixels are set as 1 block, only a central pixel of this block is extracted). In the level limiting unit 171, after the level of the pixel data is limited, the level-limited pixel data is outputted to the correcting unit 172.

The correcting unit 172 corrects data under control of the determining unit 175, and this data is supplied from the level limiting unit 171, and simply thinned and compressed, the level of which is limited to 2 bits by selecting 2 bits of the MSB side from 8-bit data (will be referred to as "compression data" hereinafter, if necessary). Then, the resultant data corrected in the correcting unit 172 is supplied to the local decoder 173, and this corrected data will be referred to as "correction data" hereinafter, if necessary, since as to this data, the pixel value of the central pixel in the block made of 3×3 pixels is corrected in a similar manner to the output from the calculating unit 116 of FIG. 18.

Similar to the case of the local decoder 127 of FIG. 21, the local decoder 173 predicts the original image data (learning image data) based on the correction data derived from the correcting unit 172, and then supplies this predicted values to the error calculator 174.

Similar to the case of the error calculator 138 of FIG. 21, the error calculating unit 174 calculates a prediction error of a predicted values derived from the local decoder 173 with respect to the original image data, which is entered into this error calculating unit 174. This prediction error is supplied as error information to the determining unit 175.

Based on the error information derived from the error calculating unit 174, the determining unit 175 judges as to whether or not the correction data outputted from the correcting unit 172 is properly equal to the compressed original image data. Then, when the determining unit 175 judges that the correction data outputted from the correcting unit 172 is not properly equal to the compression result of the original image data, the determining unit 175 controls the correcting unit 172, and further corrects the compression data, so that the newly obtained correction data is outputted. Also, when the determining unit 175 judges as to whether or not the correction data outputted from the correcting unit 172 is properly equal to the compression result of the original image data, the correction data supplied from the correcting unit 172 is supplied as optimum correction data to a buffer unit 176.

The buffer unit 176 contains a memory 176A for storing therein the optimum correction data supplied from the optimum correction data calculating unit 160. Furthermore, the buffer unit 176 reads out such an optimum correction data corresponding to the central pixel of the block read from a memory 177A of a block making unit 177, among the optimum correction data stored in the memory 176A. It should be noted that when the correction data for 1 frame is stored in the memory 176A, the buffer unit 176 outputs to the block making unit 177 a control signal for indicating this data storage.

To the block making unit 177, similar to the optimum correction data calculating unit 160, the learning image data is supplied in units of 1 frame. The block making unit 177 contains a memory 177A for storing therein the learning image data supplied thereto. Upon receipt of the control signal sent from the buffer unit 176, the block making unit 177 subdivides the learning image data stored in the memory 177A into a block constructed of 3×3 pixels in a similar manner that of the block making unit 111 of FIG. 18. Then, this block is sequentially read to be supplied to an ADRC processing unit 178 and a memory 180.

When the block is read from the memory 177A contained in the block making unit 177, the block making unit 177 supplies a control signal indicative of a position of this block to the buffer unit 176. In the buffer unit 176, the block of 3×3 pixels read from the memory 177A is recognized in response to this control signal, and then, as previously explained, the optimum correction data corresponding to the central pixel of this block is read from the memory 176A. That is, as a result, both a certain block constituted by 3×3 pixels and the optimum correction data corresponding to this block are supplied at the same time to the memory 180.

The ADRC processing unit 178 and the class classifying unit 179 are arranged similar to the ADRC processing unit 112 and the class classifying unit 113 of FIG. 18, respectively. The class information about the block derived from the block making unit 177, outputted from the class classifying unit 179 is supplied as the address to the memory 180.

The memory 180 stores therein the optimum correction data supplied from the buffer unit 176, and the block supplied from the block making unit 177 with establishing a correspondence relationship at an address corresponding to the class information supplied from the class classifying unit 179. Note that in the memory 180, a plurality of information can be stored at one address. As a result, plural sets of both the optimum correction data and the block corresponding to certain class information can be stored.

A calculating unit 181 reads out both the 9 pixels $y_1$, $y_2, \ldots, y_9$ for constituting the block of 3×3 pixels of the learning image data, and the optimum correction data y' corresponding to this block, stored in the memory 180. Then, the minimum square method is applied to them, so that the mapping coefficients $k_1$, to $k_9$ are calculated every class to be supplied to a memory 182. The memory 182 stores therein the mapping coefficients $k_1$ to $k_9$ every class supplied from the calculating unit 181 at the address corresponding to this class.

Figure 26:
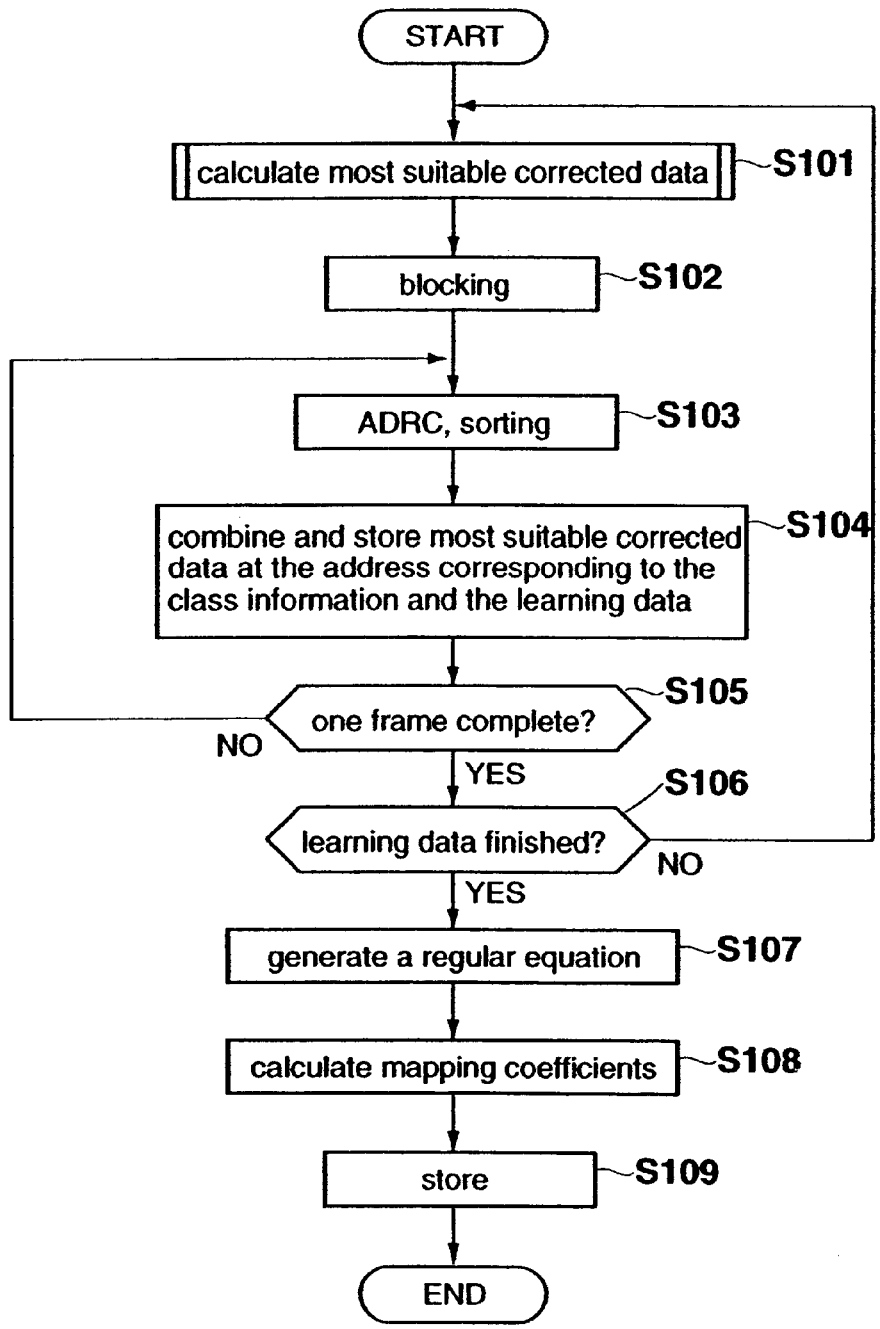
FIG. 26 is a flow chart illustrating the operation of the image processing apparatus of FIG. 25.

Referring now to the flow chart shown in FIG. 26, operation of the image processing apparatus of FIG. 25 is further explained.

When the learning image data is inputted, this learning image data is stored in the memory 177A of the block making unit 177, and supplied to the optimum correction data calculating unit 160. At a step S101, upon receipt of the learning image data the optimum correction data calculating unit 160 calculates the optimum correction data as to this learning image data.

The process operation defined at this step S101 is similar to the process operation of the flow chart shown in FIG. 4. That is, first, at a step S1, the compressing unit 170 produces the compression data by thinning the learning image by 1/9. At a step S2, this data is limited by the level limiting unit 171, and thereafter the level-limited data is firstly outputted via the correcting unit 172 to the local decoder 173 without any correction. In the local decoder 173, at a step S3, a calculation is made of a predicted values of the original image data based upon the correction data (as explained above, such compression data produced by simply thinning image data in the beginning) supplied from the correcting unit 172 (namely, local decoding operation is carried out). These predicted values are supplied to the error calculator 174.

When the predicted values of the original image data are received from the local decoder 173, the error calculator 174 calculates a prediction error of the predicted values derived from the local decoder 173 with respect to the original image data at a step S4, and then supplies the calculated prediction error as error information to the determining unit 175. Upon receipt of the error information from the error calculator 174, the determining unit 175 judges as to whether or not the correction data outputted from the correcting unit 172 is properly equal to the compression result of the original image data based on this error information at a step S5.

In other words, at the step S5, a check is made as to whether or not the error information is less than a predetermined threshold value "ϵ". When it is so judged at the step S5 that the error information is not less than this predetermined threshold value "ϵ", a recognition is made such that the correction data outputted by the correcting unit 172 is not properly equal to the compression result of the original image data. Then, the process operation is advanced to a step S6, at which the determining unit 175 controls the correcting unit 172 to thereby correct the compression data outputted from the level control unit 171. The correcting unit 172 varies the correction amount (correction value "Δ") so as to correct the compression data under control of the determining unit 175. The resultant correction data is outputted to the local decoder 173. Then, the process operation is returned to the step S3, at which a similar process operation is repeated.

It should be noted that the compression data may be corrected in a similar manner to, for example, changing of the mapping coefficient as previously explained in FIG. 21.

On the other hand, when it is so judged at the step S5 that the error information is less than the predetermined threshold value "ϵ", the determining unit 175 recognizes that the correction data outputted by the correcting unit 172 is properly equal to the correction result of the original image data, and causes the correcting unit 172 to output the correction data produced when the error information less than the predetermined threshold value "ϵ"is acquired, as the optimum correction data, to the buffer unit 176. Then, this optimum correction data is stored into the memory 176A contained in this buffer unit 176, and the process operation is returned.

As previously described, the correction data obtained by correcting the compression data acquired when the error information is less than the predetermined threshold value "ϵ"may be stored as the optimum correction data into the memory 176A. It should be noted that since this optimum correction data causes the error information to be less than the predetermined threshold value "ϵ", when the predicted values is calculated by employing this optimum correction data, it is possible to produce the image substantially identical to the original image data.

Referring again to FIG. 26, when the buffer unit 176 stores the optimum correction data for 1 frame into the memory 176A thereof, the buffer unit 176 outputs the control signal to the block making unit 177. Upon receipt of the control signal derived from the buffer unit 176, at a step S102, the block making unit 177 subdivides the learning image stored in the memory 177A into the block constructed of 3×3 pixels. Then, the block making unit 177 reads out the block of the learning image data stored in the memory 177A, and supplies this read block to the ADRC processing unit 178 and the memory 180.

At the same time, when the block is read out from the memory 177A, the block making unit 177 supplies the control signal indicative of the position of this block to the buffer unit 176. In response to this control signal, the buffer unit 176 recognizes the block of 3×3 pixels read from the memory 177A, reads out the optimum correction data corresponding to the central pixel of this block, and then supplies this read optimum correction data to the memory 180.

Then, the process is advanced to a step S103, at which the block derived from the block making unit 177 is ADRC-processed, and further, this block is class-classified in the class classifying unit 179. This classification result is supplied as the address to the memory 180.

At a step S104, the memory 180 stores therein the optimum correction data supplied from the buffer unit 176, and the block (learning data) supplied from the block making unit 177 with having the corresponding relationship at the address corresponding to the class information supplied from the class classifying unit 179.

Then, the process operation is advanced to a step S105, at which a check is done as to whether or not both the block for 1 frame and the optimum correction data are stored in the memory 180. When it is so judged at the step S105 that both the block for 1 frame and the optimum correction data are not yet stored in the memory 180, the next block is read out from the block making unit 177, and also the optimum correction data corresponding to this read block is read from the buffer unit 176. Then, the process operation is returned to the step S103, at which the process operations defined after the step S103 are repeated.

To the contrary, when it is so judged at the step S105 that the block for 1 frame and the optimum correction data are stored in the memory 180, the process operation is advanced to a step S106 at which a check is done as to whether or not the process operations for all of the learning images are completed. At the step S106, it is judged that the process operations for all of the learning image data are not yet ended, the process operation is returned to the step S101, at which the process operations defined after the step S101 are repeated for the next learning image.

On the other hand, when it is judged at the step S106 that the process operations for all of the learning image data are completed, the process operation is advanced to a step S107, at which the calculating unit 181 reads both the optimum correction data and the block stored in the memory 180 every class, and then establishes the normal equation shown in the formula (7) based on these data and block. Furthermore, at a step S108,the calculating unit 181 solves this normal equation so as to calculate the mapping coefficients capable of minimizing the error every class. This mapping coefficient is supplied to the memory 182 so as to be stored therein at a step S109, and then this process operation is ended.

In the case that the function "f" is expressed by the linear equation, the mapping coefficients stored in the memory 182 in the above-described manner are stored into the mapping coefficient memory 114 of FIG. 18, and the optimum correction data can be obtained by using this mapping coefficient.

It should be noted that there are the following difficulties. That is, a sufficient number of normal equations capable of obtaining the mapping coefficient could not be obtained. In this case, in the calculating unit 116 of FIG. 18, such a mapping coefficient is set as a default value, namely $k_1$ to $k_2=1/9$, from which for example, an average value of the 9 pixels for constituting the block of 3×3 pixels outputted from the block making unit 111 is outputted.

While the present invention has been described about the image processing apparatus, such image processing apparatus may have especially advantages in the following cases that, for example, the standardized television signal (NTSC TV signal) is coded, and a so-called "high-definition" television signal containing a large amount of data is decode.

In summary, the configuration of the first embodiment of the invention comprises the transmitting apparatus of FIG. 3, the compressing unit of FIG. 5, the local decoder of FIG. 8, the error calculator of FIG. 11 and the determining unit of FIG. 13. The receiving apparatus of FIG. 15 is utilized with the first embodiment. The configuration of the second embodiment of the invention comprises the transmitting apparatus of FIG. 28, the compressing unit of FIG. 5, the local decoder of FIG. 16, the error calculator of FIG. 11, the determining unit of FIG. 13 and the learning device for predictive coefficients of FIG. 17. The receiving apparatus of FIG. 15 is utilized with the second embodiment. The configuration of the third embodiment of the invention comprises the transmitting apparatus of FIG. 30, the compressing unit of FIG. 5, the local decoder of FIG. 32, the error calculator of FIG. 11 and the determining unit of FIG. 34. The receiving apparatus of FIG. 36 is utilized with the third embodiment. The configuration of the fourth embodiment comprises the transmitting apparatus of FIG. 18, the learning device for mapping coefficients of FIG. 21, the local decoder of FIG. 23 and the learning device for predictive coefficients of FIG. 17. The receiving apparatus of FIG. 27 is utilized with the fourth embodiment. The configuration of the fifth embodiment comprises the transmitting apparatus of FIG. 18, the learning device for mapping coefficients of FIG. 25 and the local decoder of FIG. 23. The receiving apparatus of FIG. 27 is utilized with the fifth embodiment.

Although only certain embodiments have been described in detail, those having ordinary skill in the art will certainly understand that many modifications are possible without departing from the teachings hereof. All such modifications are intended to be encompassed within the scope of the following claims.

I claim:

1. An apparatus for coding image data having a plurality of pixels, comprising:
   means for limiting a level of pixels of original image data to generate limited data, the limited data including a most significant bits portion of the original image data;
   means for correcting the limited data to generate corrected data;
   means for predicting the original image data in accordance with the corrected data and for generating predicted data having a plurality of predicted pixels;
   means for calculating, with respect to the original image data, a predictive error of the predicted data; and
   means for determining suitability of the corrected data as coded data based upon the predictive error.

2. The apparatus of claim 1, wherein the means for predicting comprises:
   means for generating class information of the corrected data; and
   means for generating the predicted pixels in accordance with the class information.

3. The apparatus of claim 1, wherein the means for predicting, comprises:
   means for generating predictive coefficients based upon the corrected data; and
   means for generating the predicted pixels based upon the corrected data and the predictive coefficients.

4. The apparatus of claim 1, wherein the means for predicting comprises:
   means for generating class information based upon a plurality of pixels of the corrected data;
   means for generating predictive coefficients for each class based upon the original image data and the corrected data; and
   means for generating the plurality of predicted pixels based upon the predictive coefficients corresponding to information of each class and the corrected data.

5. The apparatus of claim 4, further comprising:
   means for outputting the corrected data as coded data of the original image data based upon the determined suitability, wherein the means for outputting outputs the coded data with the predictive coefficients for each class.

6. The apparatus of claim 1, wherein the means for predicting comprises:
   a memory for storing predictive coefficients for each class;
   means for generating class information based upon a plurality of pixels of the corrected data; and
   means for reading from the memory the predictive coefficients corresponding to the information of each class and for generating the predicted pixels based upon the read predictive coefficients and the corrected data.

7. The apparatus of claim 6, further comprising:
   means for outputting the corrected data as coded data of the original image data based upon the determined suitability, wherein the means for outputting outputs the coded data with the predictive coefficients for each class.

8. The apparatus of claim 1, wherein the means for correcting comprises:
   a memory for storing correction values, wherein the means for correcting corrects the compressed data using the correction values.

9. The apparatus of claim 1, further comprising:
   means for outputting the corrected data as coded data of the original image data based upon the determined suitability, wherein
   the means for determining determines suitability of the corrected data by detecting whether the predictive error is less than a prescribed threshold value; and
   the means for outputting outputs the corrected data as the coded data if the predictive error is less than the prescribed threshold value.

10. The apparatus of claim 1, further comprising:
    means for reducing a number of pixels of the original image data to generate compressed data, wherein to generate limited data the means for limiting limits a level of pixels of compressed data instead of limiting the level of pixels of original image data.

11. The apparatus of claim 1, further comprising:
    means for outputting the corrected data as coded data of the original image data based upon the determined suitability.

12. The apparatus of claim 1, wherein operations of the means for correction, the means for predicting, the means for calculating and the means for determining are repeated unless the means for determining determines that the corrected data is suitable as coded data.

13. An apparatus for decoding coded data generated by coding image data comprising:
    means for receiving the coded data; and
    means for decoding the coded data and generating decoded image data, wherein the coded data is generated by the steps of:
        limiting a level of pixels of original image data to generate limited data, the limited data including a most significant bits portion of the original image data;
        corrected the limited data to generate corrected data;
        predicting the original image data in accordance with the corrected data and generating predicted data having a plurality of predicted pixels;
        calculating, with respect to the original image data, a predictive error of the predicted data;
        determining suitability of the corrected data as coded data based upon the predictive error; and
        repeating the step of correcting until the corrected data becomes an optimum corrected data.

14. The apparatus of claim 13, wherein the decoding means comprises:
  means for generating class information of the coded data; and
  means for producing the decoded image data in accordance with the class information.

15. The apparatus of claim 13, wherein the coded data includes predictive coefficients to produce the decoded image data, and the means for decoding comprises:
  means for generating the decoded image data based upon the predictive coefficients and the coded data.

16. The apparatus of claim 13, wherein the coded data includes predictive coefficients for each class to produce the decoded image data, and the means for decoding comprises:
  means for generating class information using a plurality of pixels of the coded data;
  means for producing the decoded image data using the predictive coefficients corresponding to the coded data.

17. The apparatus of claim 13, wherein the means for decoding comprises:
  a memory for storing predictive coefficients for each class;
  means for generating class information using a plurality of pixels of the coded data; and
  means for reading the predictive coefficients corresponding to the class information from the memory and generating the predicted pixel using the read predictive coefficients and the coded data.

18. The apparatus of claim 13, wherein the coded data is generated by the further step of:
  reducing a number of pixels of the original image data to generate compressed data, wherein to generate limited data the step of limiting is applied to a level of pixels of compressed data instead of to the level of pixels of original image data.

19. The apparatus of claim 13, wherein the coded data is generated by the further step of:
  outputting the corrected data as coded data of the original image data based upon the determined suitability.

20. The apparatus of claim 13, wherein the steps of correcting, predicting, calculating and determining are repeated unless the step of determining determines that the corrected data is suitable as coded data.

21. A method of coding image data having a plurality of pixels, comprising the steps of:
  limiting a level of pixels of the original image data to generate limited data, the limited data including a most significant bits portion of the original image data;
  correcting the limited data to generate corrected data;
  predicting the original image data in accordance with the corrected data and generating predicted data having a plurality of predicted pixels;
  calculating, with respect to the original image data, a predictive error of the predicted data; and
  determining suitability of the corrected data as coded data of the original image based upon the predictive error.

22. The method of claim 21, wherein the step of predicting comprises the steps of:
  generating class information of the corrected data; and
  generating the predicted pixels in accordance with the class information.

23. The method of claim 21, wherein the step of predicting, comprises the steps of:
  generating predictive coefficients based upon the corrected data; and
  generating the predicted pixels based upon the corrected data and the predictive coefficients.

24. The method of claim 21, wherein the step of predicting comprises the steps of:
  generating class information based upon a plurality of pixels of the corrected data;
  generating predictive coefficients for each class based upon the original image data and the corrected data; and
  generating the plurality of predicted pixels based upon the predictive coefficients corresponding to information of each class and the corrected data.

25. The method of claim 24, further comprising the step of:
  outputting the corrected data as coded data of the original image data based upon the determined suitability, wherein the coded data is output with the predictive coefficients for each class.

26. The method of claim 21, wherein the step of predicting comprises the steps of:
  storing predictive coefficients for each class;
  generating class information based upon a plurality of pixels of the corrected data; and
  reading from the memory the predictive coefficients corresponding to the information of each class and for generating the predicted pixels based upon the read predictive coefficients and the corrected data.

27. The method of claim 26, further comprising the step of:
  outputting the corrected data as coded data of the original image data based upon the determined suitability, wherein the coded data is output with the predictive coefficients for each class.

28. The method of claim 21, wherein the step of correcting comprises the step of:
  storing correction values, wherein the compressed data is corrected using the correction values.

29. The method of claim 21, wherein the step of determining suitability comprises the steps of:
  detecting whether the predictive error is less than a prescribed threshold value; and
  outputting the corrected data as the coded data if the predictive error is less than the prescribed threshold value.

30. The method of claim 21, further comprising the step of:
  reducing a number of pixels of the original image data to generate compressed data, wherein to generate limited data the step of limiting is applied to a level of pixels of compressed data instead of to the level of pixels of original image data.

31. The method of claim 21, further comprising the step of:
  outputting the corrected data as coded data of the original image data based upon the determined suitability.

32. The method of claim 21, wherein the steps of correcting, predicting, calculating and determining are repeated unless the step of determining determines that the corrected data is suitable as coded data.

33. A method for decoding coded data generated by coding image data, comprising the steps of:
  receiving the coded data; and
  decoding the coded data and generating decoding image data, wherein the coded data is generated by the steps of:

limiting a level of pixels of original image data to generate limited data, the limited data including a most significant bits portion of the original image data;

correcting the limited data to generated corrected data;

predicting the original image data in accordance with the corrected data and for generating predicted data having a plurality of predicted pixels;

calculating, with respect to the original image data, a predictive error of the predicted data; and determining suitability of the corrected data as coded data based upon the predictive error.

34. The method of claim 33, wherein the step of decoding the coded data comprises the steps of:

generating class information of the coded data; and producing the decoded image data in accordance with the class information.

35. The method of claim 33, wherein the coded data includes predictive coefficients to produce the decoded image data, and the step of decoding the coded data comprises the step of:

generating the decoded image data based upon the predictive coefficients and the coded data.

36. The method of claim 33, wherein the coded data includes predictive coefficients for each class to produce the decoded image data, and the step of decoding the coded data comprises the steps of:

generating class information using a plurality of pixels of the coded data;

producing the decoded image data using the predictive coefficients corresponding to the coded data.

37. The method of claim 33, wherein the step of decoding the coded data comprises the steps of:

storing predictive coefficients for each class;

generating class information using a plurality of pixels of the coded data; and reading the predictive coefficients corresponding to the class information from the memory and generating the predicted pixel using the read predictive coefficients and the coded data.

38. The method of claim 33, wherein the coded data is generated by the further step of:

reducing a number of pixels of the original image data to generate compressed data, wherein to generate limited data the step of limiting is applied to a level of pixels of compressed data instead of to the level of pixels of original image data.

39. The method of claim 33, wherein the coded data is generated by the further step of:

outputting the corrected data as coded data of the original image data based upon the determined suitability.

40. The apparatus of claim 33, wherein the steps of correcting, predicting, calculating and determining are repeated unless the step of determining determines that the corrected data is suitable as coded data.

41. An apparatus for coding image data having a plurality of pixels, comprising:

a limiting circuit for limiting a level of pixels of original image data to generate limited data;

a correcting circuit for correcting the limited data to generate corrected data, the limited data including a most significant bits portion of the original image data;

a predicting circuit for predicting the original image data in accordance with the corrected data and for generating predicted data having a plurality of predicted pixels;

a calculator for calculating, with respect to the original image data, a predictive error of the predicted data; and a determining circuit for determining suitability of the corrected data as coded data based upon the predictive error.

42. The apparatus of claim 41, wherein the predicting circuit comprises:

a circuit for generating class information of the corrected data; and a circuit for generating the predicted pixels in accordance with the class information.

43. The apparatus of claim 41, wherein the predicting circuit, comprises:

a circuit for generating predictive coefficients based upon the corrected data; and a circuit for generating the predicted pixels based upon the corrected data and the predictive coefficients.

44. The apparatus of claim 41, wherein the predicting circuit comprises:

a circuit for generating class information based upon a plurality of pixels of the corrected data;

a circuit for generating predictive coefficients for each class based upon the original image data and the corrected data; and a circuit for generating the plurality of predicted pixels based upon the predictive coefficients corresponding to information of each class and the corrected data.

45. The apparatus of claim 44, further comprising:

an output circuit for outputting the corrected data as coded data of the original image data based upon the determined suitability, wherein the output circuit outputs the coded data with the predictive coefficients for each class.

46. The apparatus of claim 41, wherein the predicting circuit comprises:

a memory for storing predictive coefficients for each class;

a circuit for generating class information based upon a plurality of pixels of the corrected data; and a circuit for reading from the memory the predictive coefficients corresponding to the information of each class and for generating the predicted pixels based upon the read predictive coefficients and the corrected data.

47. The apparatus of claim 46, further comprising:

an output circuit for outputting the corrected data as coded data of the original image data based upon the determined suitability, wherein the output circuit outputs the coded data with the predictive coefficients for each class.

48. The apparatus of claim 41, wherein the correcting circuit comprises:

a memory for storing correction values, wherein the correcting circuit corrects the compressed data using the correction values.

49. The apparatus of claim 41, further comprising:

an output circuit for outputting the corrected data as coded data of the original image data based upon the determined suitability, wherein the determining circuit determines suitability of the corrected data by detecting whether the predictive error is less than a prescribed threshold value; and the output circuit outputs the corrected data as the coded data if the predictive error is less than the prescribed threshold value.

50. The apparatus of claim 41, further comprising:

a subsampling circuit for reducing a number of pixels of the original image data to generate compressed data, wherein to generate limited data the limiting circuit limits a level of pixels of compressed data instead of limiting the level of pixels of original image data.

51. The apparatus of claim 41, further comprising:

an output circuit for outputting the corrected data as coded data of the original image data based upon the determined suitability.

52. The apparatus of claim 41, wherein operations of the correcting circuit, the predicting circuit, calculator and the determining circuit are repeated unless the determining circuit determines that the corrected data is suitable as coded data.

53. An apparatus for decoding coded data generated by coding image data, comprising:

a circuit for receiving the coded data; and a decoder for decoding the coded data and generating decoding image data, wherein the coded data is generated by the steps of:

limiting a level of pixels of original image data to generate limited data, the limited data including a most significant bits portion of the original image data;

correcting the limited data to generate corrected data;

predicting the original image data in accordance with the corrected data and for generating predicted data having a plurality of predicted pixels;

calculating, with respect to the original image data, a predictive error of the predicted data; and determining suitability of the corrected data as coded data based upon the predictive error.

54. The apparatus of claim 53, wherein the decoder comprises:

a circuit for generating class information of the coded data; and a circuit for producing the decoded image data in accordance with the class information.

55. The apparatus of claim 53, wherein the coded data includes predictive coefficients to produce the decoded image data, and the decoder comprises:

a circuit for generating the decoded image data based upon the predictive coefficients and the coded data.

56. The apparatus of claim 53, wherein the coded data includes predictive coefficients for each class to produce the decoded image data, and the decoder comprises:

a circuit for generating class information using a plurality of pixels of the coded data;

a circuit for producing the decoded image data using the predictive coefficients corresponding to the coded data.

57. The apparatus of claim 53, wherein the decoder comprises:

a memory for storing predictive coefficients for each class;

a circuit for generating class information using a plurality of pixels of the coded data; and a circuit for reading the predictive coefficients corresponding to the class information from the memory and generating the predicted pixel using the read predictive coefficients and the coded data.

58. The apparatus of claim 53, wherein the coded data is generated by the further step of:

reducing a number of pixels of the original image data to generate compressed data, wherein to generate limited data the step of limiting is applied to a level of pixels of compressed data instead of to the level of pixels of original image data.

59. The apparatus of claim 53, wherein the coded data is generated by the further step of:

outputting the corrected data as coded data of the original image data based upon the determined suitability.

60. The apparatus of claim 53, wherein the steps of correcting, predicting, calculating and determining are repeated unless the step of determining determines that the corrected data is suitable as coded data.

61. A method for transmitting image data having a plurality of pixels, comprising the steps of:

limiting a level of original image data to generate limited data, the limited data including a most significant bits portion of the original image data;

correcting the limited data to generate corrected data;

predicting the original image data in accordance with the corrected data and for generating predicted data having a plurality of predicted pixels;

calculating, with respect to the original image data, a predictive error of the predicted data; and determining suitability of the corrected data as coded data based upon the predicted error;

coding the corrected data to generate coded data of the original image data based upon the determined suitability; and transmitting the coded data.

62. The method of claim 61, wherein the step of predicting comprises the steps of:

generating class information of the corrected data; and generating the predicted pixels in accordance with the class information.

63. The method of claim 61, wherein the step of predicting, comprises the steps of:

generating predictive coefficients based upon the corrected data; and generating the predicted pixels based upon the corrected data and the predictive coefficients.

64. The method of claim 61, wherein the step of predicting comprises the steps of:

generating class information based upon a plurality of pixels of the corrected data;

generating predictive coefficients for each class based upon the original image data and the corrected data; and generating the plurality of predicted pixels based upon the predictive coefficients corresponding to information of each class and the corrected data.

65. The method of claim 64, further comprising the step of:

outputting the coded data for transmission, wherein the coded data is output with the predictive coefficients for each class.

66. The method of claim 61, wherein the step of predicting comprises the steps of:

storing predictive coefficients for each class;

generating class information based upon a plurality of pixels of the corrected data; and reading from the memory the predictive coefficients corresponding to the information of each class and for generating the predicted pixels based upon the read predictive coefficients and the corrected data.

67. The method of claim 66, further comprising the step of:
outputting the coded data for transmission, wherein the coded data is output with the predictive coefficients for each class.

68. The method of claim 61, wherein the step of correcting comprises the step of:
storing correction values, wherein the compressed data is corrected using the correction values.

69. The method of claim 61, wherein the step of determining suitability comprises the steps of:
detecting whether the predictive error is less than a prescribed threshold value; and
outputting the corrected data as the coded data if the predictive error is less than the prescribed threshold value.

70. The method of claim 69, further comprising the step of:
outputting the coded data for transmission, wherein the coded data is output with the predictive coefficients for each class.

71. The method of claim 61, further comprising the step of:
reducing a number of pixels of the original image data to generate compressed data, wherein to generate limited data the step of limiting is applied to a level of pixels of compressed data instead of to the level of pixels of original image data.

72. The method of claim 61, further comprising the step of:
outputting the coded data for transmission.

73. The method of claim 61, wherein the steps of correcting, predicting, calculating and determining are repeated unless the step of determining determines that the corrected data is suitable as coded data.

74. A recording medium having an encoded digital signal recorded thereon, the recording medium being prepared by the steps of:
limiting a level of pixels of original image data to generate limited data, the limited data including a most significant bits portion of the original image data;
correcting the limited data to generated corrected data;
predicting the original image data in accordance with the corrected data and for generating predicted data having a plurality of predicted pixels;
calculating, with respect to the original image data, a predictive error of the predicted data;
determining suitability of the corrected data as coded data based upon the predictive error;
coding the corrected data to generate coded data of the original image data based upon the determined suitability; and
recording the coded data on the recording medium.

75. The recording medium of claim 74, wherein the step of predicting comprises the steps of:
generating class information of the corrected data; and
generating the predicted pixels in accordance with the class information.

76. The recording medium of claim 74, wherein the step of predicting, comprises the steps of:
generating predictive coefficients based upon the corrected data; and
generating the predicted pixels based upon the corrected data and the predictive coefficients.

77. The recording medium of claim 74, wherein the step of predicting comprises the steps of:
generating class information based upon a plurality of pixels of the corrected data;
generating predictive coefficients for each class based upon the original image data and the corrected data; and
generating the plurality of predicted pixels based upon the predictive coefficients corresponding to information of each class and the corrected data.

78. The recording medium of claim 74, further comprising the step of:
outputting the coded data for recording, wherein
the coded data is output with the predictive coefficients for each class.

79. The recording medium of claim 74, wherein the step of predicting comprises the steps of:
storing predictive coefficients for each class;
generating class information based upon a plurality of pixels of the corrected data; and
reading from the memory the predictive coefficients corresponding to the information of each class and for generating the predicted pixels based upon the read predictive coefficients and the corrected data.

80. The recording medium of claim 79, further comprising the step of:
outputting the coded data for recording, wherein the coded data is output with the predictive coefficients for each class.

81. The recording medium of claim 74, wherein the step of correcting comprises the step of:
storing correction values, wherein the compressed data is corrected using the correction values.

82. The recording medium of claim 74, wherein the step of determining suitability comprises the steps of:
detecting whether the predictive error is less than a prescribed threshold value; and
outputting the corrected data as the coded data if the predictive error is less than the prescribed threshold value.

83. The recording medium of claim 74, further comprising the step of:
reducing a number of pixels of the original image data to generate compressed data, wherein to generate limited data the step of limiting is applied to a level of pixels of compressed data instead of to the level of pixels of original image data.

84. The recording medium of claim 74, further comprising the step of:
outputting the coded data for recording.

85. The recording medium of claim 74, wherein the steps of correcting, predicting, calculating and determining are repeated unless the step of determining determines that the corrected data is suitable as coded data.

86. A method for coding data having a plurality of samples, comprising the steps of:
limiting a level of samples of the original image data to generate limited data, the limited data including a most significant bits portion of the original image data;
correcting the limited data to generate corrected data;
predicting the original image data in accordance with the corrected data and generating predicted data having a plurality of predicted samples;
calculating, with respect to the original image data, a predictive error of the predicted data; and determining suitability of the corrected data as coded data of the original image data based upon the predictive error.

87. The method of claim 86, wherein the step of predicting comprises the steps of:
generating class information of the corrected data; and
generating the predicted samples in accordance with the class information.

88. The method of claim 86, wherein the step of predicting, comprises the steps of:
generating predictive coefficients based upon the corrected data; and
generating the predicted samples based upon the corrected data and the predictive coefficients.

89. The method of claim 86, wherein the step of predicting comprises the steps of:
generating class information based upon a plurality of samples of the corrected data;
generating predictive coefficients for each class based upon the original data and the corrected data; and
generating the plurality of predicted samples based upon the predictive coefficients corresponding to information of each class and the corrected data.

90. The method of claim 89, further comprising the step of:
outputting the coded data for transmission, wherein the coded data is output with the predictive coefficients for each class.

91. The method of claim 86, wherein the step of predicting comprises the steps of:
storing predictive coefficients for each class;
generating class information based upon a plurality of samples of the corrected data; and
reading from the memory the predictive coefficients corresponding to the information of each class and for generating the predicted samples based upon the read predictive coefficients and the corrected data.

92. The method of claim 91, further comprising the step of:
outputting the coded data for transmission, wherein the coded data is output with the predictive coefficients for each class.

93. The method of claim 86, wherein the step of correcting comprises the step of:
storing correction values, wherein the compressed data is corrected using the correction values.

94. The method of claim 86, wherein the step of determining suitability comprises the steps of:
detecting whether the predictive error is less than a prescribed threshold value; and
outputting the corrected data as the coded data if the predictive error is less than the prescribed threshold value.

95. The method of claim 86, further comprising the step of:
reducing a number of samples of the original image data to generate compressed data, wherein to generate limited data the step of limiting is applied to a level of samples of compressed data instead of to the level of samples of original image data.

96. The method of claim 86, further comprising the step of:
outputting the corrected data as coded data of the original image data based upon the determined suitability.

97. The method of claim 86, wherein the steps of correcting, predicting, calculating and determining are repeated unless the step of determining determines that the corrected data is suitable as coded data.

98. A method for decoding coded data generated by coding data, comprising the steps of:
receiving the coded data; and
decoding the coded data and generating decoding data, wherein the coded data is generated by the steps of:
limiting a level of samples of original image data to generated limited data, the limited data including a most significant bits portion of the original image data;
correcting the limited data to generate corrected data;
predicting the original image data in accordance with the corrected data and for generating predicted data having a plurality of predicted samples;
calculating, with respect to the original image data, a predictive error of the predicted data; and
determining suitability of the corrected data as coded data based upon the predictive error.

99. The method of claim 98, wherein the step of decoding the coded data comprises the steps of:
generating class information of the coded data; and
producing the decoded data in accordance with the class information.

100. The method of claim 98, wherein the coded data includes predictive coefficients to produce the decoded data, and the step of decoding the coded data comprises the step of:
generating the decoded data based upon the predictive coefficients and the coded data.

101. The method of claim 98, wherein the coded data includes predictive coefficients for each class to produce the decoded data, and the step of decoding the coded data comprises the steps of:
generating class information using a plurality of samples of the coded data;
producing the decoded data using the predictive coefficients corresponding to the coded data.

102. The method of claim 98, wherein the step of decoding the coded data comprises the steps of:
storing predictive coefficients for each class;
generating class information using a plurality of samples of the coded data; and
reading the predictive coefficients corresponding to the class information from the memory and generating the predicted sample using the read predictive coefficients and the coded data.

103. The method of claim 98, wherein the coded data is generated by the further step of:
reducing a number of samples of the original image data to generate compressed data, wherein to generate limited data the step of limiting is applied to a level of samples of compressed data instead of to the level of samples of original image data.

104. The method of claim 98, wherein the coded data is generated by the further step of:
outputting the corrected data as coded data of the original image data based upon the determined suitability.

105. The method of claim 98, wherein the steps of correcting, predicting, calculating and determining are repeated unless the step of determining determines that the corrected data is suitable as coded data.

106. An apparatus for coding data having a plurality of samples, comprising:

a limiting circuit for limiting a level of samples of original image data to generate limited data, the limited data including a most significant bits portion of the original image data;

a correcting circuit for correcting the limited data to generated corrected data;

a predicting circuit for predicting the original image data in accordance with the corrected data and for generating predicted data having a plurality of predicted samples;

a calculator for calculating, with respect to the original image data, a predictive error of the predicted data; and a determining circuit for determining suitability of the corrected data as coded data based upon the predictive error.

107. The apparatus of claim 106, wherein the predicting circuit comprises:

a circuit for generating class information of the corrected data; and a circuit for generating the predicted samples in accordance with the class information.

108. The apparatus of claim 106, wherein the predicting circuit, comprises:

a circuit for generating predictive coefficients based upon the corrected data; and a circuit for generating the predicted samples based upon the corrected data and the predictive coefficients.

109. The apparatus of claim 106, wherein the predicting circuit comprises:

a circuit for generating class information based upon a plurality of samples of the corrected data;

a circuit for generating predictive coefficients for each class based upon the original data and the corrected data; and a circuit for generating the plurality of predicted samples based upon the predictive coefficients corresponding to information of each class and the corrected data.

110. The apparatus of claim 109, further comprising:

an output circuit for outputting the corrected data as coded data of the original image data based upon the determined suitability, wherein the output circuit outputs the coded data with the predictive coefficients for each class.

111. The apparatus of claim 106, wherein the predicting circuit comprises:

a memory for storing predictive coefficients for each class;

a circuit for generating class information based upon a plurality of samples of the corrected data; and a circuit for reading from the memory the predictive coefficients corresponding to the information of each class and for generating the predicted samples based upon the read predictive coefficients and the corrected data.

112. The apparatus of claim 111, further comprising:

an output circuit for outputting the corrected data as coded data of the original image data based upon the determined suitability, wherein the output circuit outputs the coded data with the predictive coefficients for each class.

113. The apparatus of claim 106, wherein the correcting circuit comprises:

a memory for storing correction values, wherein the correcting circuit corrects the compressed data using the correction values.

114. The apparatus of claim 106, further comprising:

an output circuit for outputting the corrected data as coded data of the original image data based upon the determined suitability, wherein the determining circuit determines suitability of the corrected data by detecting whether the predictive error is less than a prescribed threshold value; and the output circuit outputs the corrected data as the coded data if the predictive error is less than the prescribed threshold value.

115. The apparatus of claim 106, further comprising:

a subsampling circuit for reducing a number of samples of the original image data to generate compressed data, wherein to generate limited data the limiting circuit limits a level of samples of compressed data instead of limiting the level of samples of original image data.

116. The apparatus of claim 106, further comprising:

an output circuit for outputting the corrected data as coded data of the original image data based upon the determined suitability.

117. The apparatus of claim 106, wherein operations of the correcting circuit, the predicting circuit, calculator and the determining circuit are repeated unless the determining circuit determines that the corrected data is suitable as coded data.

118. An apparatus for decoding coded data generated by coding data, comprising:

a circuit for receiving the coded data; and a decoder for decoding the coded data and generating decoding data, wherein the coded data is generated by the steps of:

correcting limited data to generate corrected data, wherein a level of pixels of original image data is limited to generate the limited data, and the limited data includes a most significant bits portion of the original image data;

predicting the original image data in accordance with the corrected data and for generating predicted data having a plurality of predicted samples;

calculating, with respect to the original image data, a predictive error of the predicted data; and determining suitability of the corrected data as coded data based upon the predictive error.

119. The apparatus of claim 118, wherein the decoder comprises:

a circuit for generating class information of the coded data; and a circuit for producing the decoded data in accordance with the class information.

120. The apparatus of claim 118, wherein the coded data includes predictive coefficients to produce the decoded data, and the decoder comprises:

a circuit for generating the decoded data based upon the predictive coefficients and the coded data.

121. The apparatus of claim 118, wherein the coded data includes predictive coefficients for each class to produce the decoded data, and the decoder comprises:

a circuit for generating class information using a plurality of samples of the coded data;

a circuit for producing the decoded data using the predictive coefficients corresponding to the coded data.

122. The apparatus of claim 118, wherein the decoder comprises:

a memory for storing predictive coefficients for each class;

a circuit for generating class information using a plurality of samples of the coded data; and a circuit for reading the predictive coefficients corresponding to the class information from the memory and generating the predicted sample using the read predictive coefficients and the coded data.

123. The apparatus of claim 118, wherein the coded data is generated by the further step of:

reducing a number of samples of the original image data to generate compressed data, wherein to generate limited data the step of limiting is applied to a level of samples of compressed data instead of to the level of samples of original image data.

124. The apparatus of claim 118, wherein the coded data is generated by the further step of:

outputting the corrected data as coded data of the original image data based upon the determined suitability.

125. The apparatus of claim 118, wherein the steps of correcting, predicting, calculating and determining are repeated unless the step of determining determines that the corrected data is suitable as coded data.

126. A method for transmitting coded image data, comprising the steps of:

receiving the coded image data; and transmitting the coded image data, wherein the coded image data is generated by the following steps:

limiting a level of pixels of original image data to generate limited data, the limited data including a most significant bits portion of the original image data;

correcting the limited data to generate corrected data;

predicting the original image data in accordance with the corrected data and for generating predicted data having a plurality of predicted pixels;

calculating, with respect to the original image data, a predictive error of the predicted data;

determining suitability of the corrected data as coded data based upon the predictive error;

coding the corrected data to generate coded data of the original image data based upon the determined suitability; and transmitting the coded data.

127. The method of claim 126, wherein the step of predicting comprises the steps of:

generating class information of the corrected data; and generating the predicted pixels in accordance with the class information.

128. The method of claim 126, wherein the step of predicting, comprises the steps of:

generating predictive coefficients based upon the corrected data; and generating the predicted pixels based upon the corrected data and the predictive coefficients.

129. The method of claim 126, wherein the step of predicting comprises the steps of:

generating class information based upon a plurality of pixels of the corrected data;

generating predictive coefficients for each class based upon the original image data and the corrected data; and generating the plurality of predicted pixels based upon the predictive coefficients corresponding to information of each class and the corrected data.

130. The method of claim 129, further comprising the step of:

outputting the coded data for transmission, wherein the coded data is output with the predictive coefficients for each class.

131. The method of claim 126, wherein the step of predicting comprises the steps of:

storing predictive coefficients for each class;

generating class information based upon a plurality of pixels of the corrected data; and reading from the memory the predictive coefficients corresponding to the information of each class and for generating the predicted pixels based upon the read predictive coefficients and the corrected data.

132. The method of claim 131, further comprising the step of:

outputting the coded data for transmission, wherein the coded data is output with the predictive coefficients for each class.

133. The method of claim 126, wherein the step of correcting comprises the step of:

storing correction values, wherein the compressed data is corrected using the correction values.

134. The method of claim 126, wherein the step of determining suitability comprises the steps of:

detecting whether the predictive error is less than a prescribed threshold value; and outputting the corrected data as the coded data if the predictive error is less than the prescribed threshold value.

135. The method of claim 126, wherein the coded data is generated by the further step of:

reducing a number of pixels of the original image data to generate compressed data, wherein to generate limited data the step of limiting is applied to a level of pixels of compressed data instead of to the level of pixels of original image data.

136. The method of claim 126, wherein the coded data is generated by the further step of:

outputting the coded data for transmission.

137. The method of claim 126, wherein the steps of correcting, predicting, calculating and determining are repeated unless the step of determining determines that the corrected data is suitable as coded data.

* * * * *